(12) United States Patent
Kawazome et al.

(10) Patent No.: US 6,356,656 B1
(45) Date of Patent: *Mar. 12, 2002

(54) CONTOUR-INFORMATION EXTRACTION APPARATUS AND METHOD

(75) Inventors: Takeshi Kawazome, Yokohama; Yoshihiro Ishida; Nobuyuki Shigeeda, both of Kawasaki; Toshiaki Minami, Atsugi, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/491,603

(22) Filed: Jun. 16, 1995

(30) Foreign Application Priority Data

Jun. 17, 1994 (JP) .............................................. 6-135883
Mar. 17, 1995 (JP) .............................................. 7-058470

(51) Int. Cl.$^7$ ................................................. G06K 9/48
(52) U.S. Cl. ....................................... 382/197; 382/199
(58) Field of Search ................................ 382/199, 197, 382/242

(56) References Cited

U.S. PATENT DOCUMENTS

| | | | |
|---|---|---|---|
| 4,956,869 A | 9/1990 | Miyatake et al. ............. | 382/22 |
| 4,961,231 A | * 10/1990 | Nakayama et al. .......... | 382/197 |
| 5,379,350 A | * 1/1995 | Shimazu et al. ............. | 382/199 |
| 5,590,220 A | * 12/1996 | Takahashi .................... | 382/203 |
| 5,703,963 A | * 12/1997 | Kojima et al. ............... | 382/197 |

FOREIGN PATENT DOCUMENTS

| | | |
|---|---|---|
| EP | 0167838 | 1/1986 |
| EP | 0053762 | 8/1993 |
| FR | 2507419 | 12/1982 |

* cited by examiner

Primary Examiner—Jon Chang
(74) Attorney, Agent, or Firm—Fitzpatrick, Cella, Harper & Scinto

(57) ABSTRACT

A contour-information extraction system which includes performing raster scanning of a document, detemining a position of an interpixel grid of image data in the document, detecting contour vectors for the interpixel grid in a main scanning direction, and detecting contour vectors for the interpixel grid in a sub-scanning direction. The contour vectors are detected based on a state of a group of pixels in a vicinity of the position of the interpixel grid. The system further includes determining a connection state of the detected contour vectors and extracting contour information for the interpixel grid based on the connection state of the contour vectors.

18 Claims, 51 Drawing Sheets

CASE 11

CASE 12

CASE 13

CASE 14

CASE 15

CONTOUR-INFORMATION EXTRACTION APPARATUS AND METHOD

BACKGROUND OF THE INVENTION

1. Field of the Invention

This invention relates to a contour-information extraction apparatus and method, and more particularly, to an apparatus and method for extracting contour vectors of a binary image input in a sequence of raster scanning.

2. Description of the Related Art

The assignee of the present application has proposed, in U.S. application Ser. No. 08/161,082, filed Dec. 3, 1993, a contour-forming apparatus the contents of which are hereby incorporated by reference into the present invention.

In this application target pixel (picture element) is selected, and it is determined if the target pixel is a contour pixel, in accordance with a state of the target pixel and a plurality of pixels in the vicinity thereof. When the target pixel is determined to be a contour pixel, a horizontal vector and a vertical vector are extracted around the target pixel in accordance with the state of the target pixel and the pixels in the vicinity thereof based on the relationship between the target pixel and the pixels in the vicinity thereof.

In this approach, since all contour lines within an image can be extracted in a single raster scanning operation, it is unnecessary to provide an image memory for storing all input image data. As a result, the capacity of a memory for storing input image data is reduced. Furthermore, by extracting contour vectors connecting adjacent interpixel grids, instead of in central positions of pixels (i.e., by assuming that each pixel has the shape of a square having vectors at four sides thereof), contour lines having a significant width can be extracted, even for a fine line having a width of one pixel.

There is also a description in U.S. application Ser. No. 08/161,082 of extracting contour points in a 9-pixel region comprising 3×3 pixels in an original image.

In this case, each of two contour points connecting two black pixels positioned in an oblique direction are defined every time one of the two black pixels is selected as a target pixel. According to this approach, extraction of contour pixels around a target pixel can be performed independently of the state of other surrounding pixels.

However, the above-described invention has the following problems:

(1) In order to realize extraction of contour points in a 9-pixel region comprising 3×3 pixels, it is necessary to determine whether each of the 3×3 pixels around a target pixel within a 9-pixel region is a black pixel or a white pixel. At that time, since the contents of processing are determined for each pixel-state pattern, it is desirable that the number of pixel-state patterns be as small as possible.

(2) There are four positions where a contour point can be present for a target pixel within a 9-pixel region comprising 3×3 pixels. As a result, processing for each pixel state is complicated, and therefore it is difficult to create a processing module.

(3) A stack method is adopted in which in order to hold a number of each vector having an undetermined connection relationship, each vector number is registered in a table in the sequence of extraction, and registered vector numbers are retrieved in an upstream direction starting with the last registered vector number. Hence, a memory having a large capacity must be used, and as a result, a great deal of time is required for retrieval.

SUMMARY OF THE INVENTION

It is an object of the present invention to provide a contour-information extraction system having a simplified configuration and simplified processing procedures for extracting contour vectors from image data. It is a further object of the invention to provide a contour-information extraction system having a decreased size and cost and an increased processing speed.

It is another object of the present invention to provide a contour-information extraction apparatus and a method in which processing speed is increased by reducing the scale and the cost of processing circuitry and by reducing unnecessary memory accessing operations.

It is still another object of the present invention to provide a contour-information extraction apparatus and method in which the capacity of a memory for storing extracted contour vector data is reduced, and in which the cost of the apparatus is correspondingly reduced.

According to one aspect, the present invention is a contour-information extraction apparatus which includes detection means for performing raster scanning of a document, for determining a position of an interpixel grid of image data in the document, for detecting contour vectors for the interpixel grid in a main scanning direction and for detecting contour vectors for the interpixel grid in a sub-scanning direction. Contour vectors being detected based on a state of a group of pixels in a vicinity of the position of the interpixel grid. Determination means determines a connection state of the detected contour vectors, and extraction means extracts contour information for the interpixel grid of image data based on the connection state of the contour vectors.

According to another aspect, the present invention is a contour-information extraction method which includes performing raster scanning of a document, determining a position of an interpixel grid of image data in the document, detecting contour vectors for the interpixel grid in a main scanning direction, and detecting contour vectors in a sub-scanning direction for the interpixel grid based on a state of a group of pixels in a vicinity of the position of the interpixel grid. The contour vectors are detected based on a state of a group of pixels in a vicinity of the interpixel grid. A connection state of the detected contour vectors is determined, and contour information for the interpixel grid is extracted based on the connection state of the contour vectors.

According to another aspect, the present invention is a contour-information extraction apparatus which includes detection means for performing raster scanning of a document, for determining a position of an interpixel grid of image data in the document, and for detecting one of contour vectors for the interpixel grid in a main scanning direction and contour vectors in a sub-scanning direction for the interpixel grid. The contour vectors are detected based on a state of a group of pixels in a vicinity of the position of the interpixel grid. Determination means determines a connection state of the detected contour vectors, and extraction means extracts contour information for the image data based on the connection state of the contour vectors.

According to another aspect, the present invention is a contour-information extraction method which includes performing raster scanning of a document, determining a position of an interpixel grid of image data in the document, detecting contour vectors for the interpixel grid in one of a main scanning direction and a sub-scanning direction. The contour vectors are detected based on a state of a group of pixels in a vicinity of the position of the interpixel grid. A connection state of the detected contour vectors is determined, and contour information for the image data is extracted based on the connection state of the contour vectors.

The foregoing and other objects, advantages and features of the present invention will become more apparent from the following description of the preferred embodiments taken in conjunction with the accompanying drawings.

DESCRIPTION OF THE PREFERRED EMBODIMENTS

First Embodiment

A first embodiment of the present invention will now be described in detail with reference to the drawings.

Figure 1:
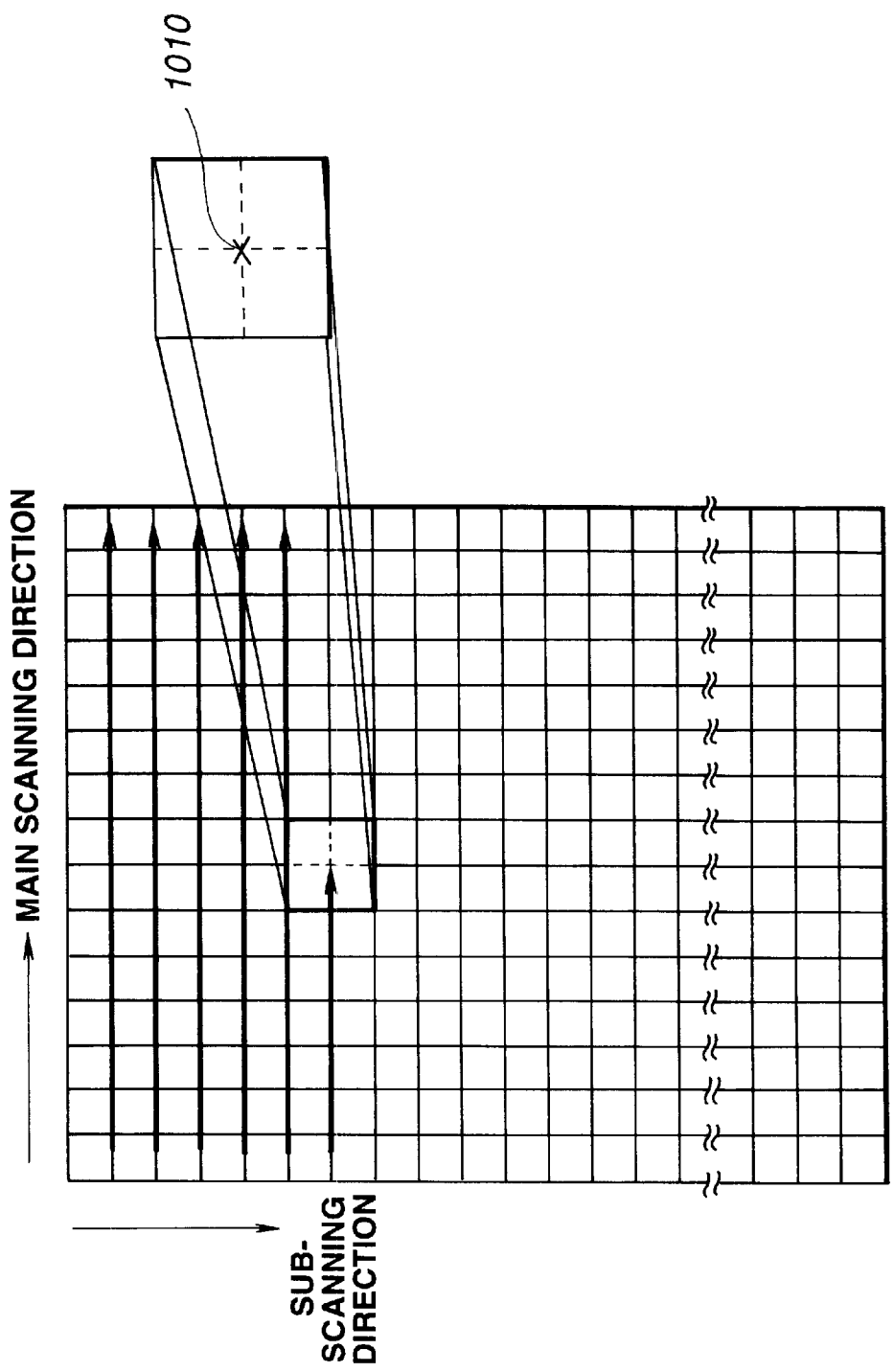
FIG. 1 is a diagram illustrating scanning directions of an image and the relationship between a target point and pixels in a vicinity thereof.

In the present embodiment, as shown in FIG. 1, contour vectors are extracted by performing processing in accordance with a state of pixels within a 4-pixel region in an interpixel grid of image data in a document, and sequentially processing the image data while shifting the processing by one pixel in the direction of raster scanning. A mark "x", having reference numeral 1010 as shown in FIG. 1, represents a point on an interpixel grid within the 4-pixel region, and indicates a location where a contour point may be present. This point is hereinafter termed a "target point".

Figure 2:
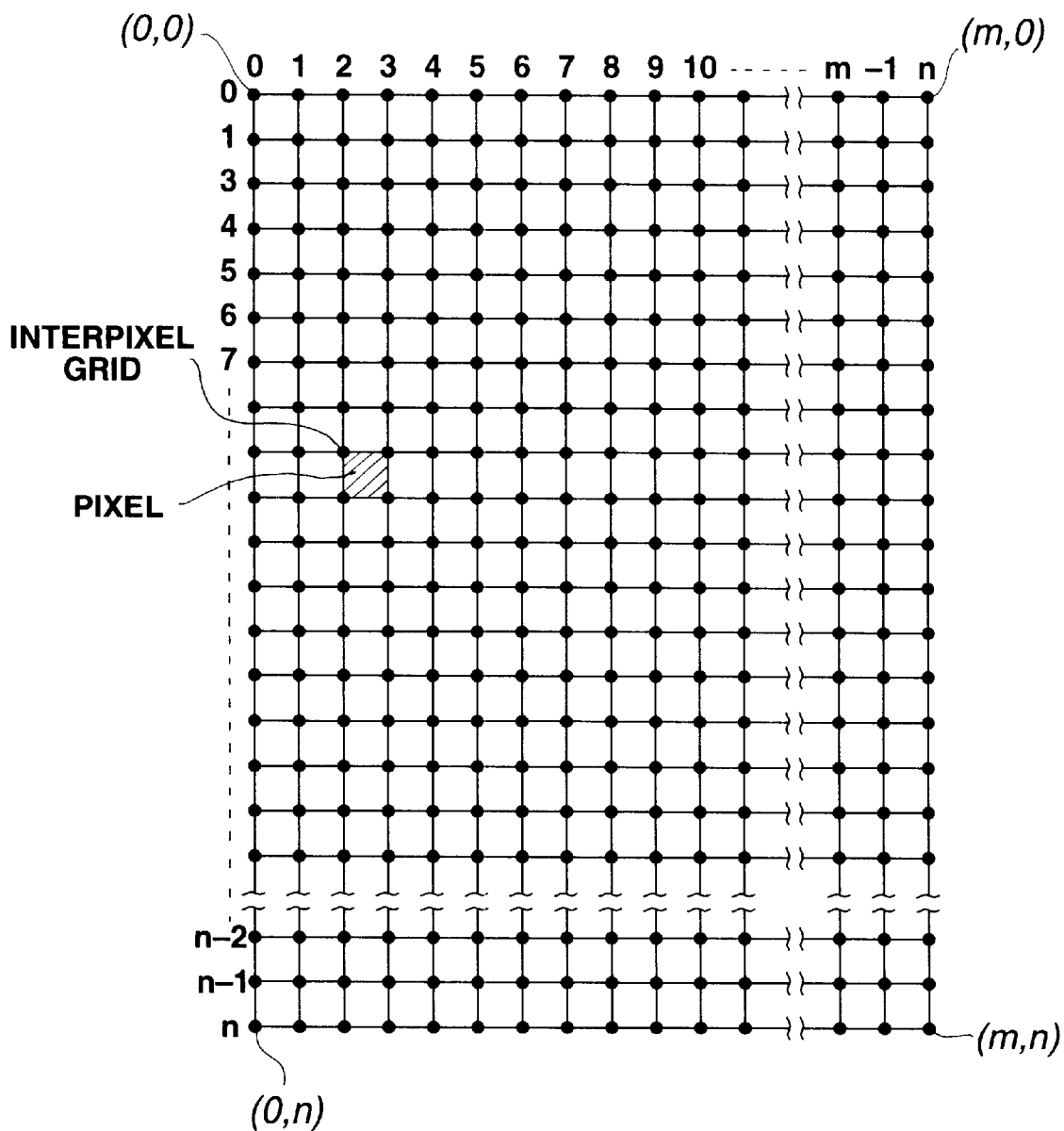
FIG. 2 is a diagram illustrating coordinates for indicating the position of a target point.

The position of a target point on an image processing apparatus is represented as shown in FIG. 2. For example, in the case of an image comprising m×n pixels, a point on an interpixel grid is represented as (0,0), (m,0), (0,n) and (m,n) for the upper left point, the upper right point, the lower left point and the lower right point, respectively.

In the present embodiment, classifications in case 00 through case 15 in an embodiment of U.S. application Ser. No. 08/161,082 correspond to classifications shown in FIG. 10 through FIG. 25, respectively. In FIGS. 10 through 25, a square represents a window of a 4-pixel region comprising 2×2 pixels. Marks ○ and Δ and an arrow within each window indicate the same items as defined in U.S. application Ser. No. 08/161,082, i.e., ○ represents a start point of a horizontal vector (which is also a terminal point of a vertical vector), and Δ represents a start point of a vertical vector (which is also a terminal point of a horizontal vector). An arrow represents a direction of a vector, as well as a direction of contour tracking (in U.S. application Ser. No. 08/161,082, a tracking is performed so that a black pixel is present at a right side of a tracking direction).

When extracting vectors in the above-described manner, horizontal vectors and vertical vectors are always alternately generated from a contour of a binary image, although the length of each vector may differ.

Figure 48:
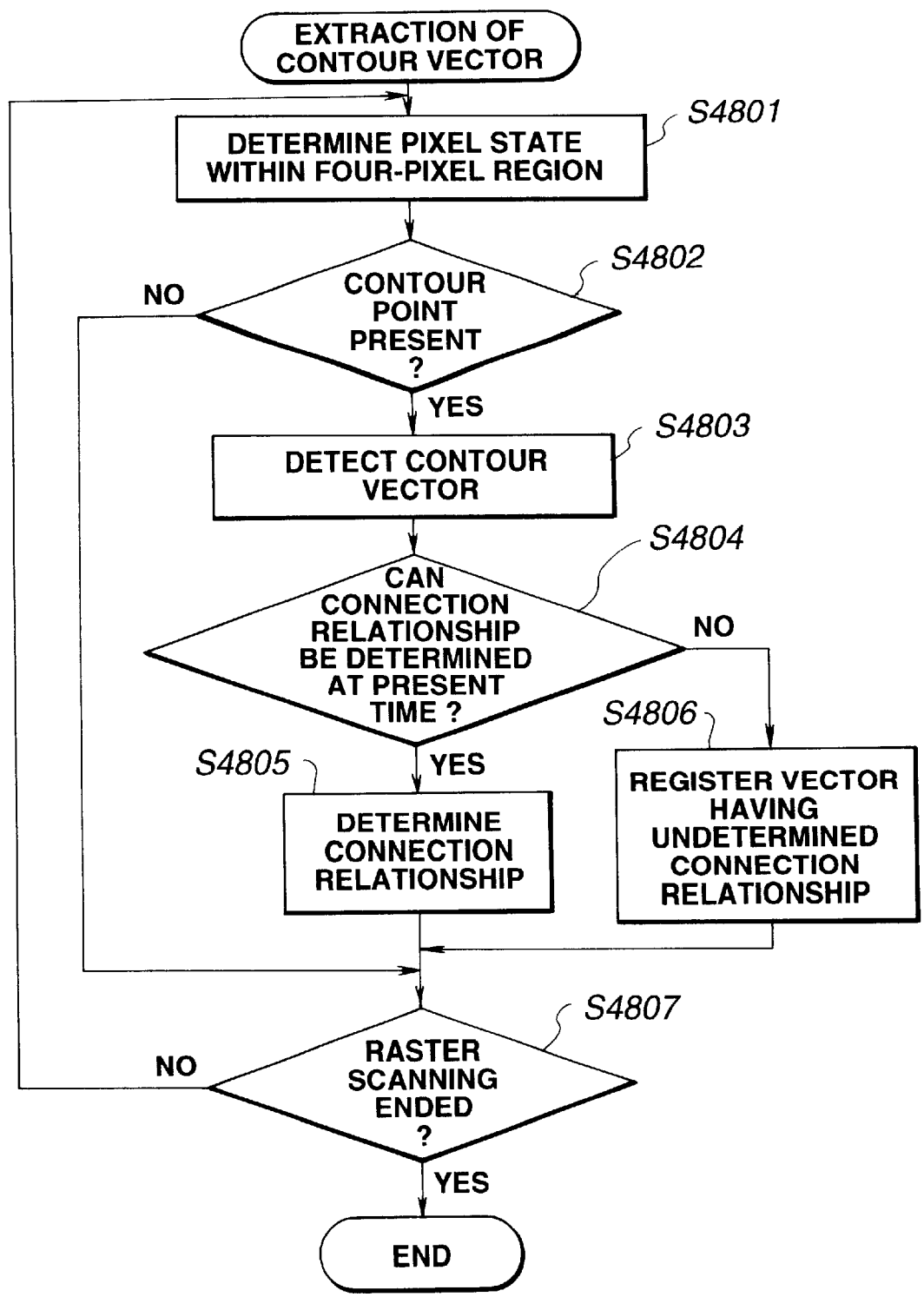
FIG. 48 is a flowchart illustrating the flow of contour vector extraction processing.
Figure 49:
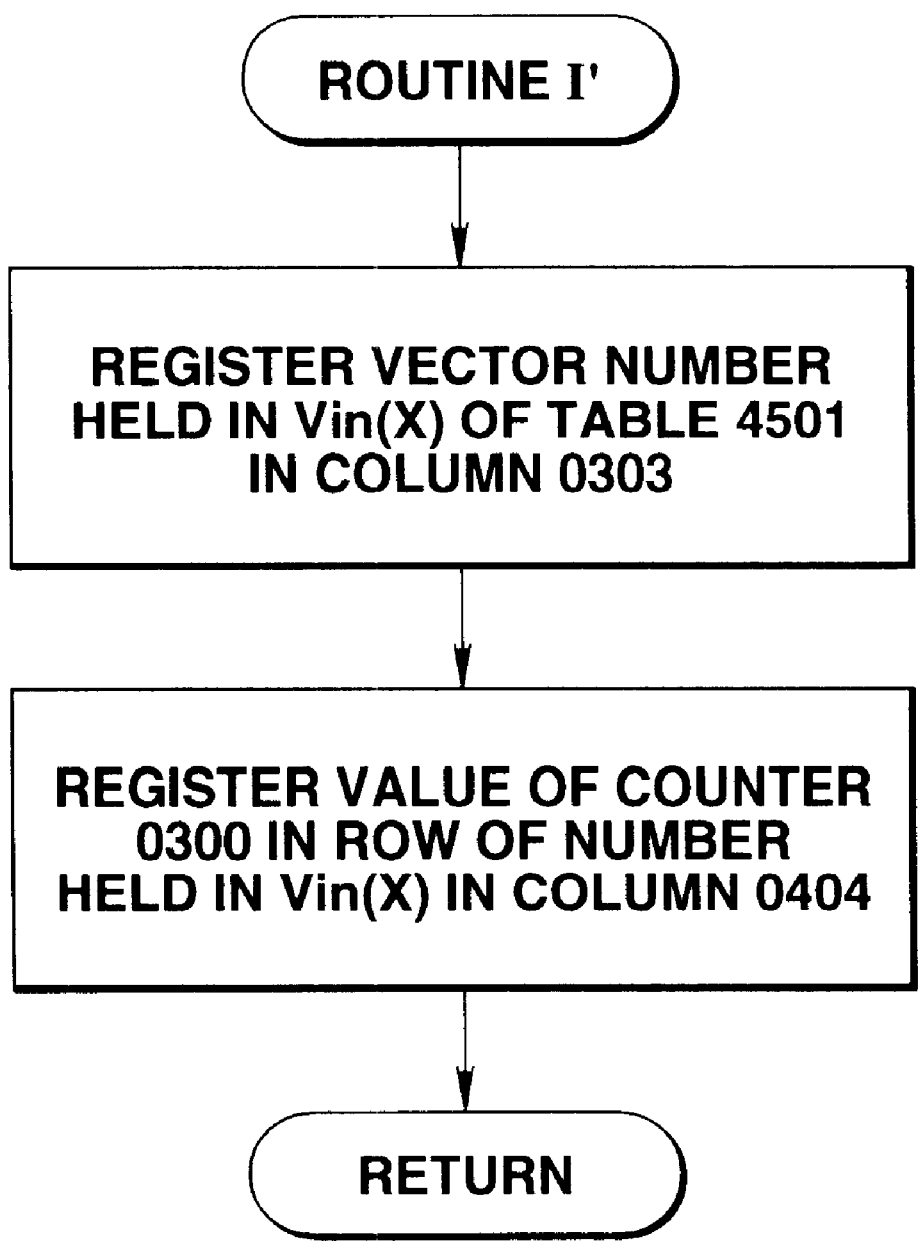
FIG. 49 is a flowchart illustrating processing steps for processing routine I'.
Figure 50:
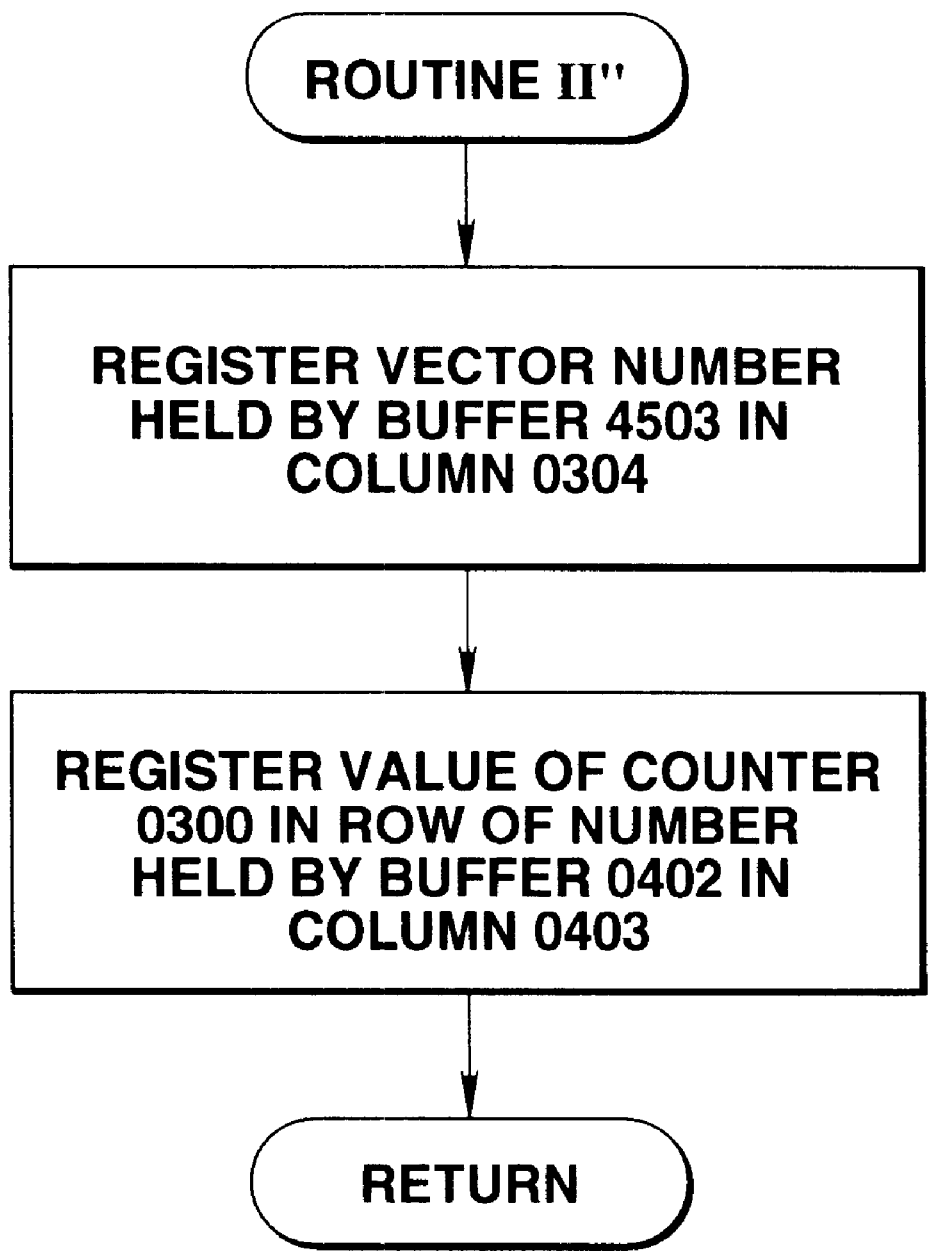
FIG. 50 is a flowchart illustrating processing steps for processing routine II'.
Figure 51:
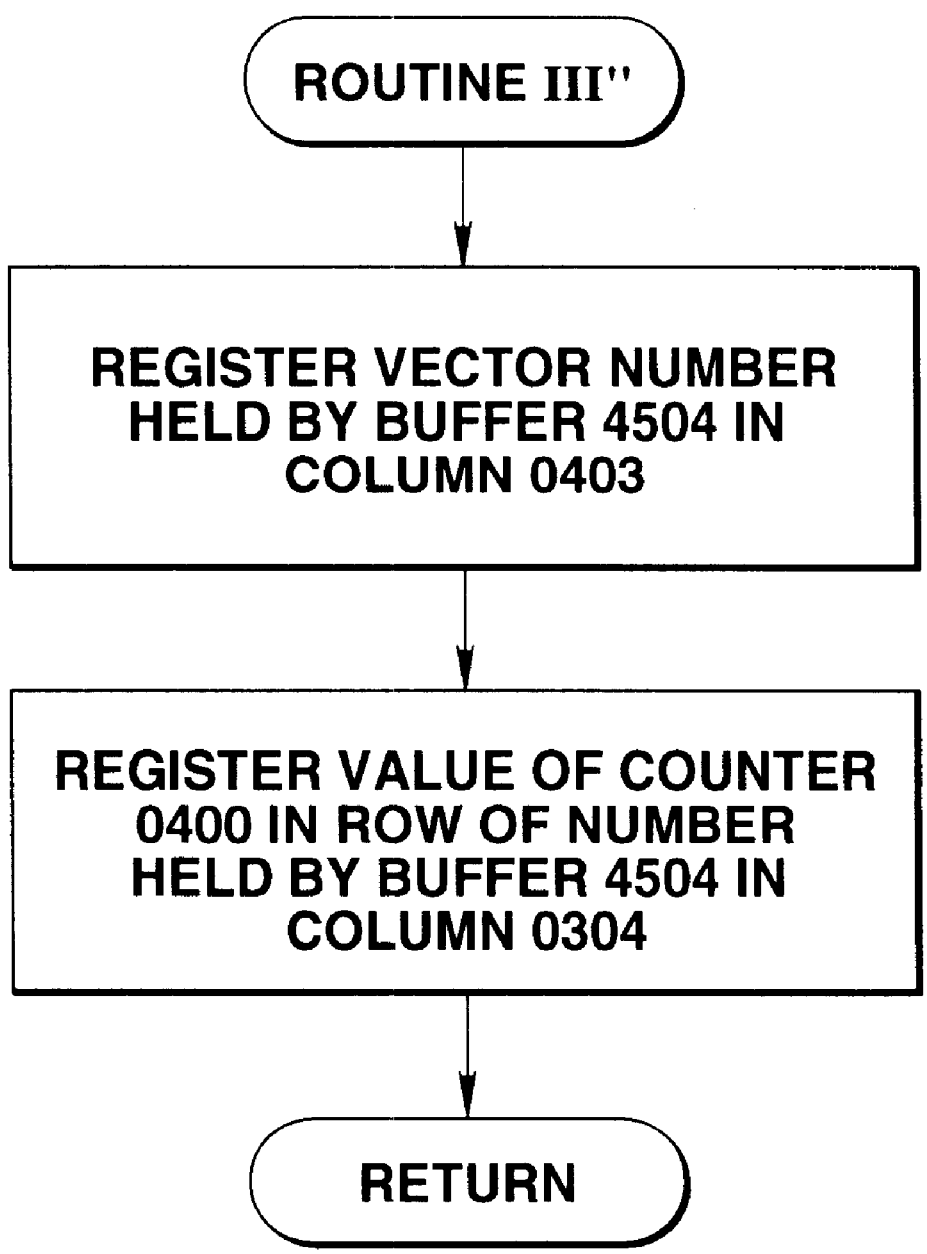
FIG. 51 is a flowchart illustrating processing steps for processing routine III'.
Figure 52:
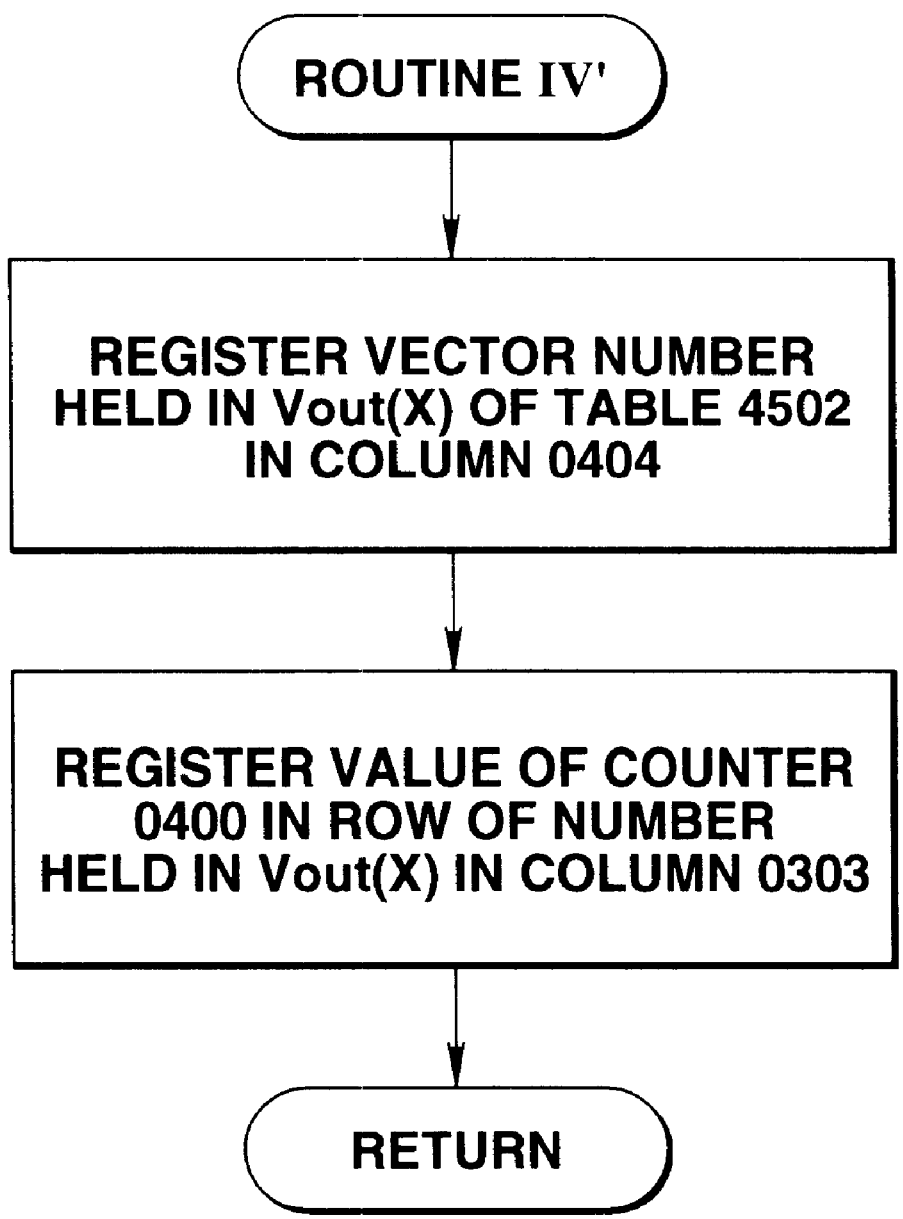
FIG. 52 is a flowchart illustrating processing steps for processing routine IV'.
Figure 53:
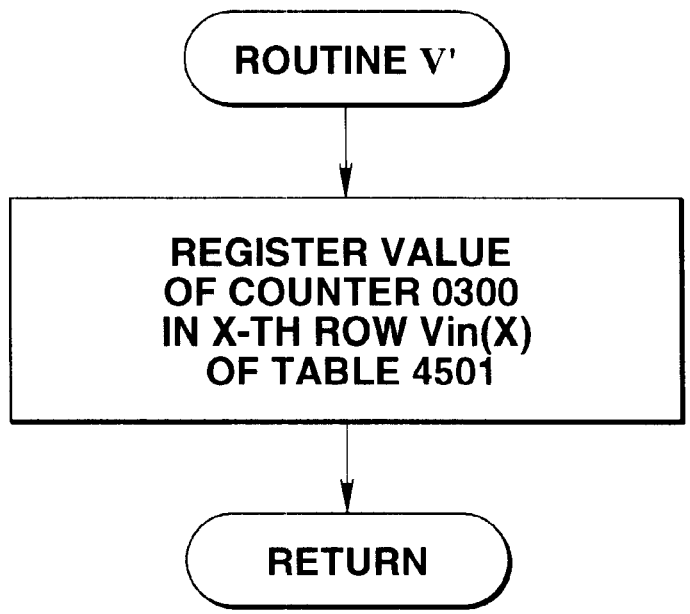
FIG. 53 is a flowchart illustrating processing steps for processing routine V'.
Figure 54:
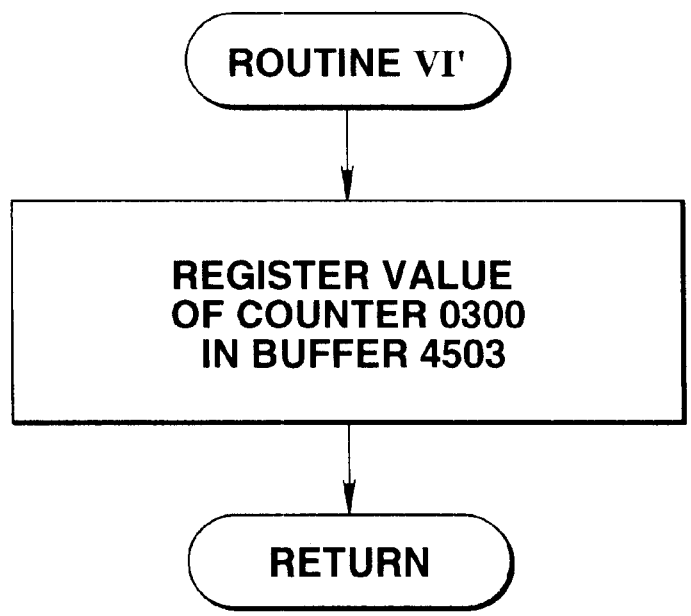
FIG. 54 is a flowchart illustrating processing steps for processing routine VI'.
Figure 55:
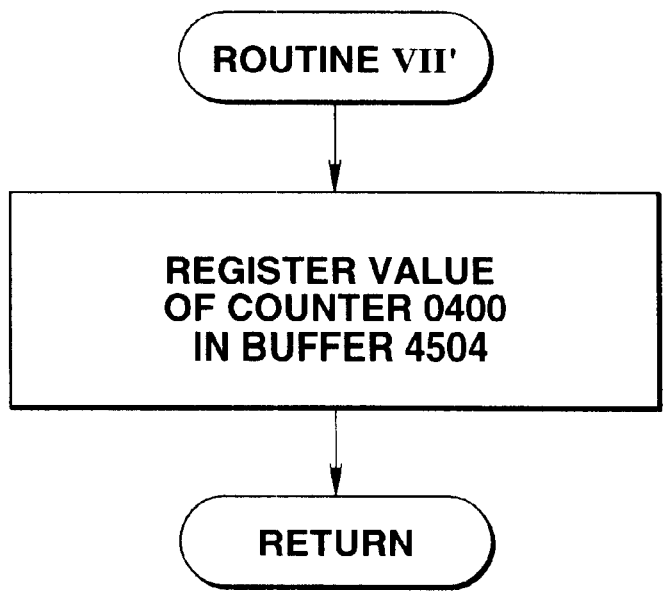
FIG. 55 is a flowchart illustrating processing steps for processing routine VII'.
Figure 56:
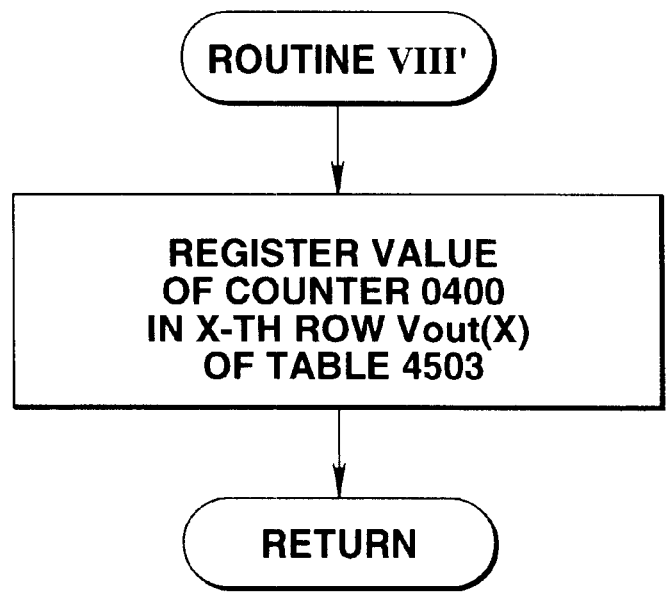
FIG. 56 is a flowchart illustrating processing steps for processing routine VIII'.

Processing for each pixel pattern is performed according to the flowchart shown in FIG. 48. In the present embodiment, processing from step S4802 to step S4806 is determined for respective pixel patterns (cases), as shown in FIGS. 26 through 35.

A description will now be provided of processing for each case. Before starting processing, a table for storing results of the processing is prepared on a hard disk or in a RAM (random access memory).

Figure 3:
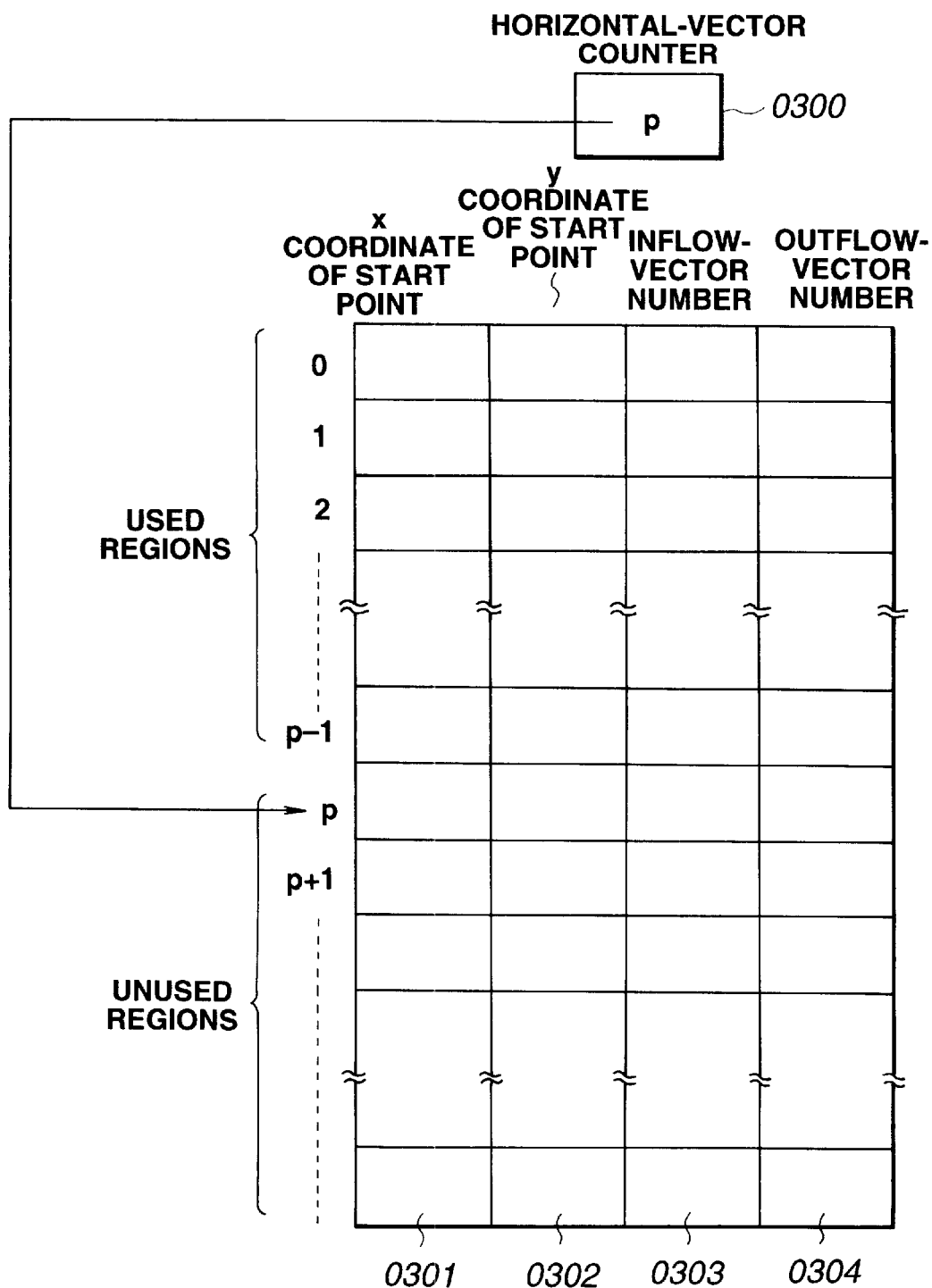
FIG. 3 is a diagram illustrating a horizontal-vector table.
Figure 4:
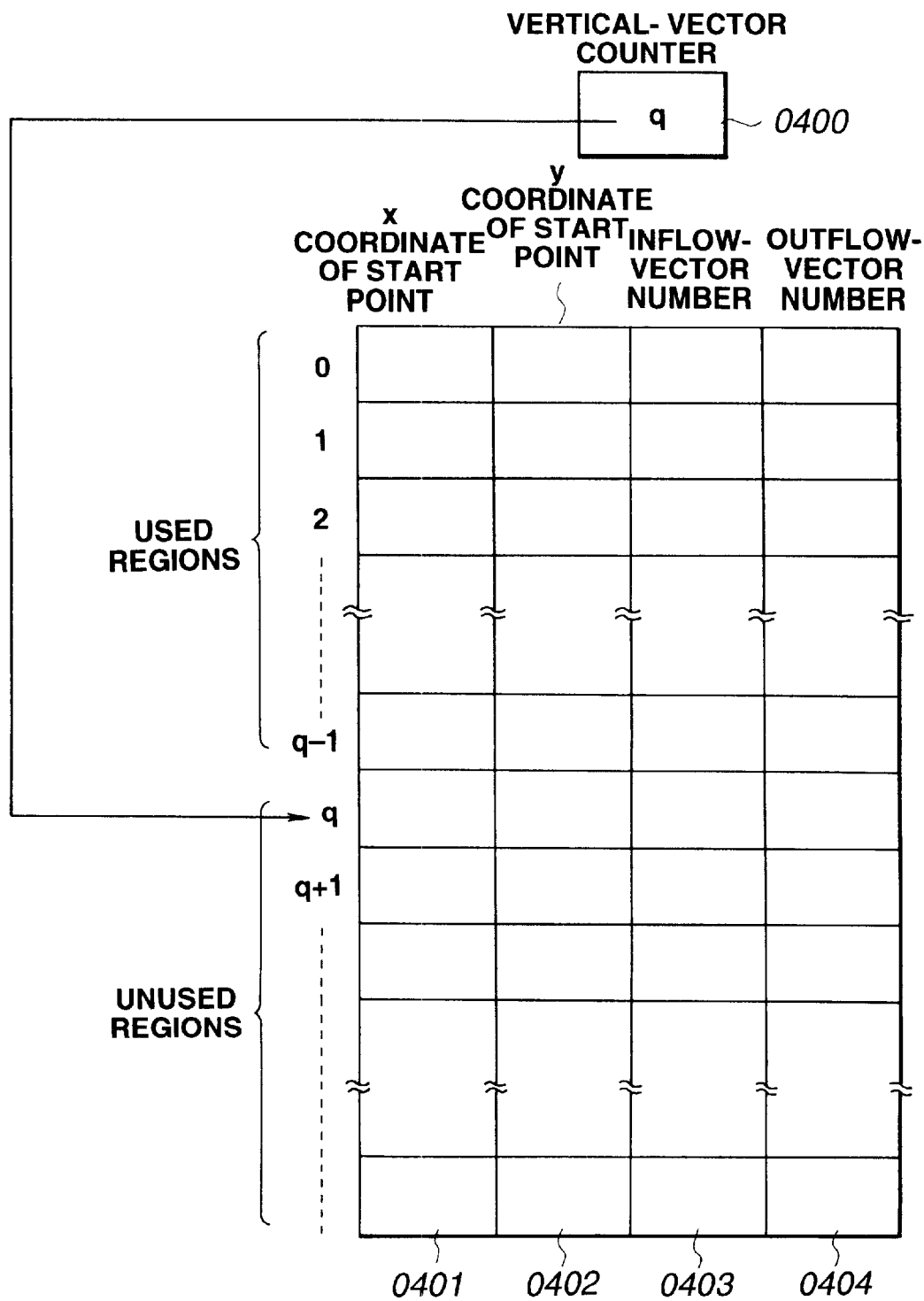
FIG. 4 is a diagram illustrating a vertical-vector table.

First, in order to register extracted vectors, two tables as shown in FIGS. 3 and 4 are prepared.

When a contour point is present at a target point, it is determined whether the contour point is a start point of a horizontal vector or a start point of a vertical vector. When it has been determined that the contour point is the start point of a horizontal vector, the x coordinate and the y coordinate of the contour point are registered in a row designated by horizontal-vector counter 0300 in columns 0301 and 0302, respectively, of the table shown in FIG. 3. At that time, in order to store the next vector, the value of counter 0300 is incremented by one.

On the other hand, when it has been determined that the contour vector is the start point of a vertical vector, the vertical vector is registered in the table shown in FIG. 4. More specifically, the x coordinate and the y coordinate of the contour vector are registered in a row designated by vertical-vector counter 0400 in columns 0401 and 0402, respectively, and the value of counter 0400 is incremented by one in order to store the next vector.

Figure 5:
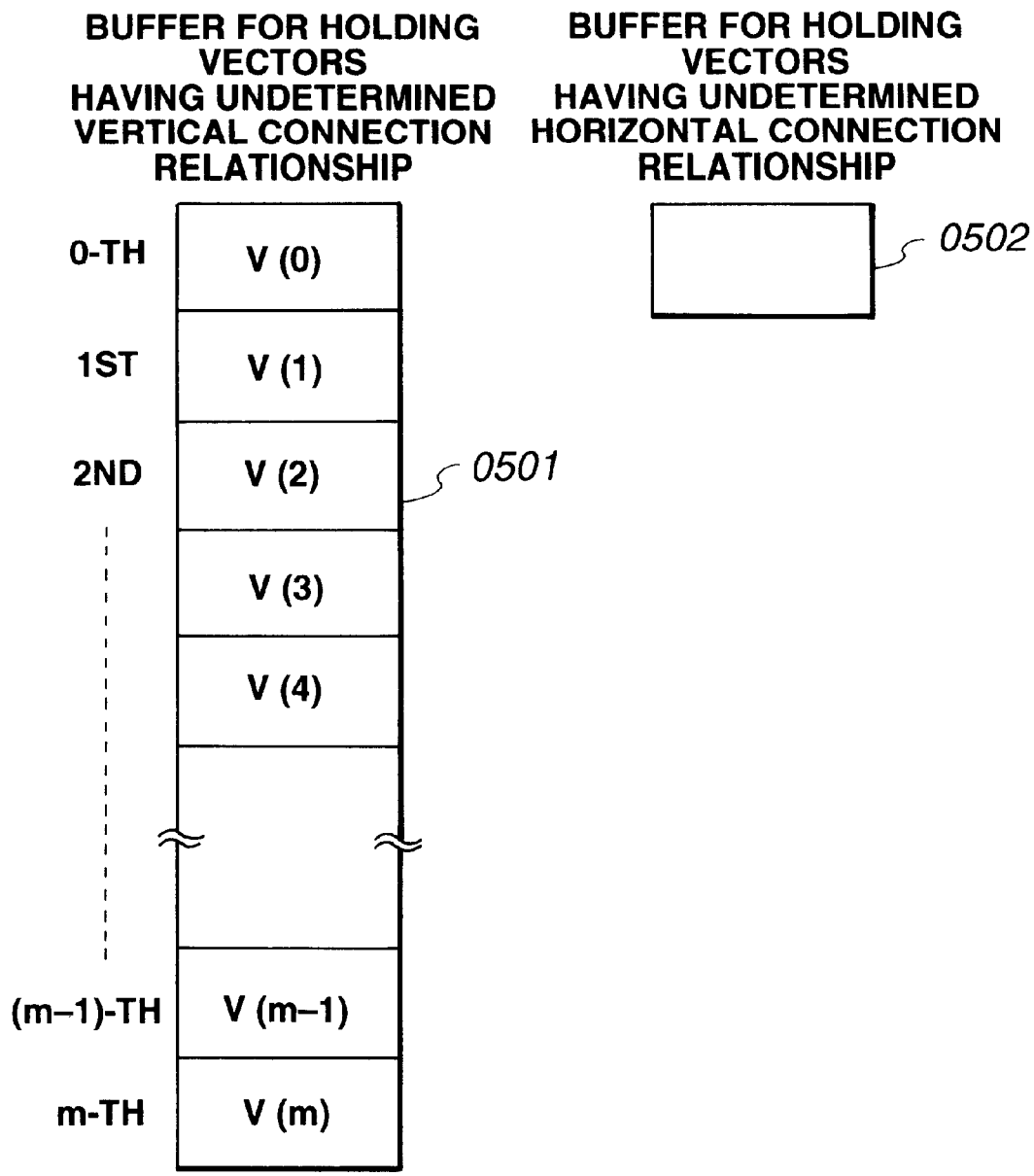
FIG. 5 illustrates a table for holding a number for each vector having an undetermined vertical connection relationship, and a buffer for holding a number of each vector having an undetermined horizontal connection relationship.
Figure 6:
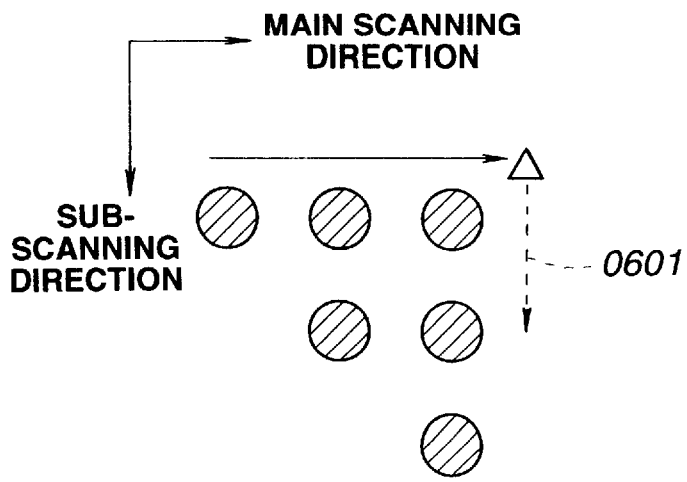
FIG. 6 is a diagram illustrating a case in which a terminal point of a flowing-out vertical vector is undetermined.
Figure 7:
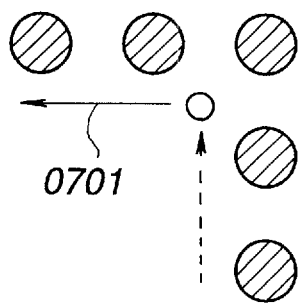
FIG. 7 is a diagram illustrating a case in which a start point of a flowing-in vertical vector is undetermined.

In the course of performing the above-described processing, a number of each vector having an undetermined vertical connection relationship is held in buffer 0501, shown in FIG. 5. This is done in order to hold number of vertical vector 0601, shown in FIG. 6, when the terminal point of the vector 0601 is undetermined, or to hold a number of horizontal vector 0701, shown in FIG. 7, when the start point of a vertical vector flowing into vector 0701 is undetermined. If the coordinates of a vector to be held are (x,y), a number of the vector is registered in the x-th row of buffer 0501, shown in FIG. 5. This indicates that if a number of pixels in the main scanning direction of the image equals m, buffer 0501 may have a size sufficient for holding at least (m+1) vector numbers; i.e., from the 0-th coordinate to the m-th coordinate.

Figure 8:
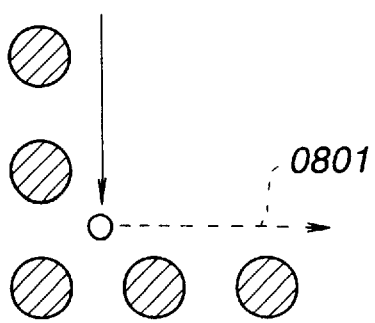
FIG. 8 is a diagram illustrating a case in which a terminal point of a flowing-out horizontal vector is undetermined.
Figure 9:
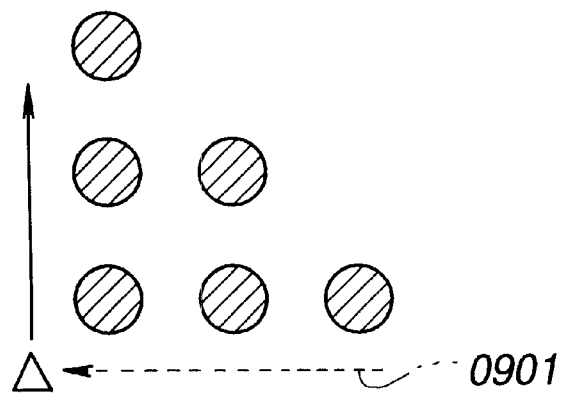
FIG. 9 is a diagram illustrating a case in which a start point of a flowing-in horizontal vector is undetermined.

Buffer 0502, shown in FIG. 5, for holding a number of a vector having an undetermined horizontal connection relationship, is also provided. Buffer 0502 is used for holding a number of horizontal vector 0801, shown in FIG. 8, when the terminal point of horizontal vector 0801 is undetermined, or for holding a number of vertical vector 0901, shown in FIG. 9, when the start point of a horizontal vector flowing into vector 0901 is undetermined. This buffer may have the size for holding only one vector number.

Next, a description will be provided of each case of vector extraction processing in the present embodiment. Since, in the present embodiment, processing is performed in units of a region comprising 2×2 pixels, there are 16 (i.e., $2^4$) cases (cases 0–15) in total.

Case 0

Figure 10:
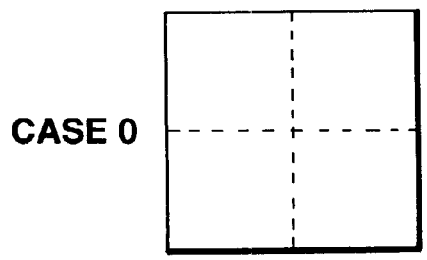
FIG. 10 is a diagram illustrating a state of case 0 in contour-vector extraction processing in a first embodiment of the present invention.

FIG. 10 illustrates a state in which all pixels within a 4-pixel region are white pixels (case 0). In this case, since a target point cannot be a contour point, processing is not performed. The target region is then shifted to the next raster scanning position.

Case 1

Figure 11:
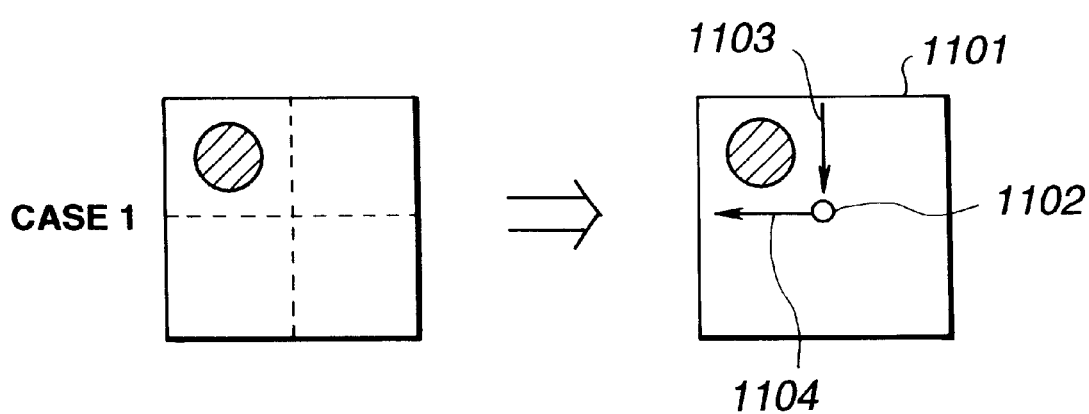
FIG. 11 is a diagram illustrating a state of case 1 in contour-vector extraction processing in the first embodiment.
Figure 26:
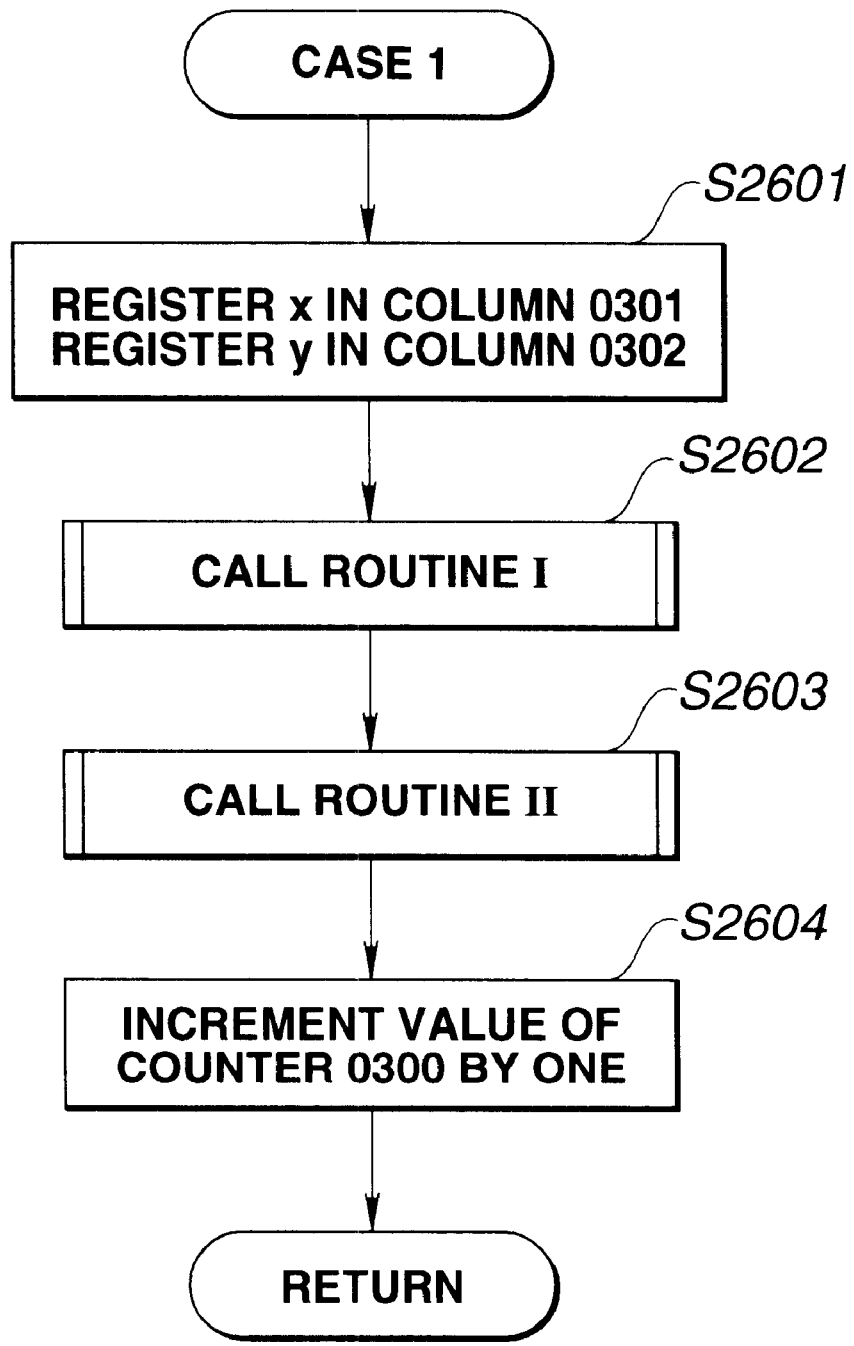
FIG. 26 is a flowchart illustrating processing steps for processing case 1 in the first embodiment.

FIG. 11 illustrates a state in which only a pixel at the upper left position of a 4-pixel region is a black pixel, and in which the remaining pixels in the 4-pixel region are white pixels (case 1). In this case, target point o 1102, within region 1101, is a contour point, and is a start point of a horizontal vector. FIG. 26 is a flowchart for processing the 4-pixel region in this case.

In step S2601, the coordinates (x,y) of the target point are designated as the start point of the horizontal vector, and the values x and y are registered in columns 0301 and 0302, respectively, of the table shown in FIG. 3.

Since the start point of vertical vector 1103 flowing into this contour point is present within a region which has already been subjected to raster scanning, this vector is already registered in the x-th row v(x) of buffer 0501, shown in FIG. 5.

Figure 36:
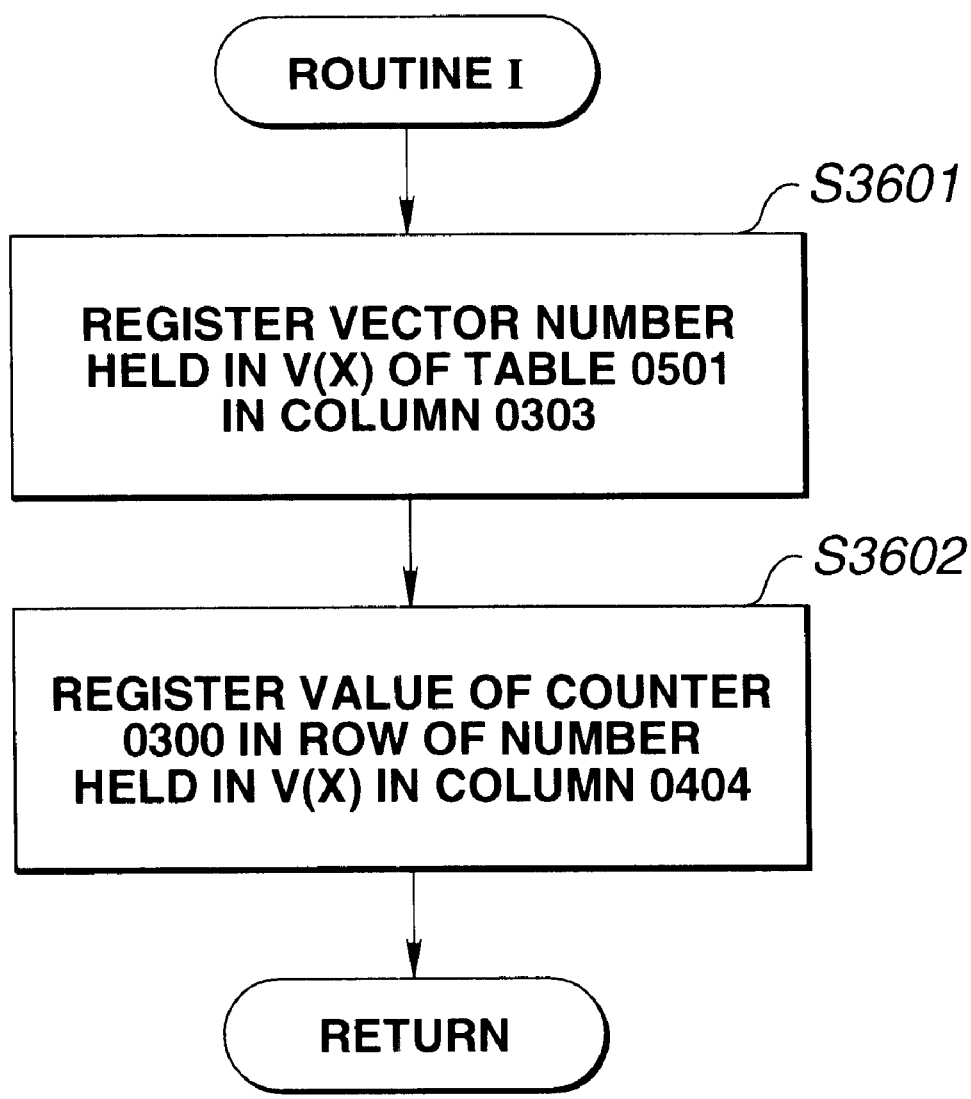
FIG. 36 is a flowchart illustrating processing steps for processing routine I.

Therefore, in step S2602, routine I, depicted by the flowchart shown in FIG. 36, is called in order to clarify the connection relationship of the vertical vector. First, in step S3601, the number registered in v(x) is registered in a row corresponding to the target point, in column 0303 of the target point, shown in FIG. 3. It is thereby possible to determine a vertical vector having its terminal point at the position of the start point of the target horizontal vector.

In the next step S3602, in order to perform the same processing for the vertical-vector table, the value of counter 0300, shown in FIG. 3, is registered in a row corresponding to v(x) in a column 0404 of the table shown in FIG. 4. Thus, a position of the terminal point of the vertical vector and the horizontal vector flowing out therefrom are determined.

Figure 37:
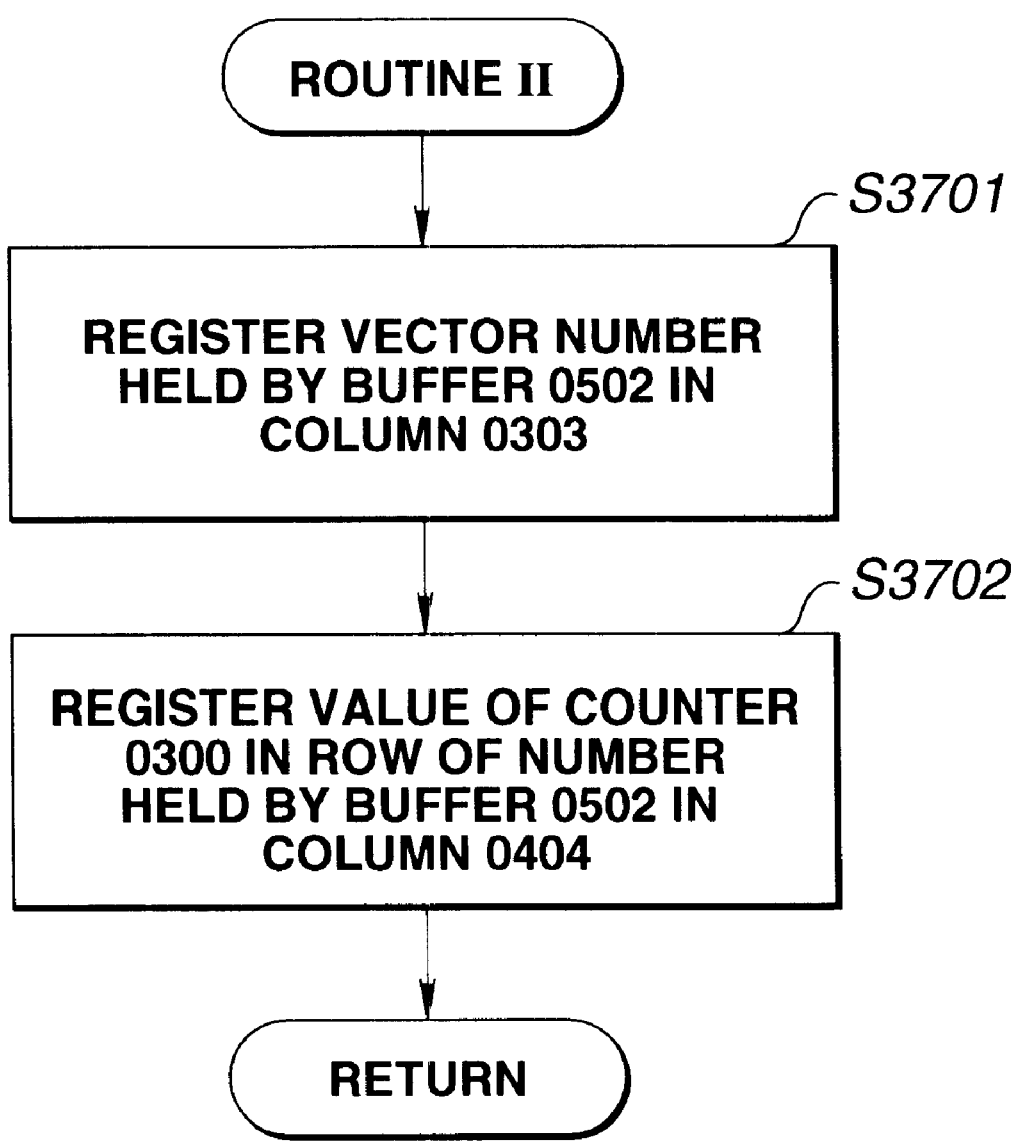
FIG. 37 is a flowchart illustrating processing steps for processing routine II.

Returning again to FIG. 26, when the process proceeds to step S2603, the terminal point of horizonal vector 1104, shown in FIG. 11, flowing out from this contour point is retrieved. Since the terminal point of this horizontal vector is a contour point which has already been scanned (in the present embodiment, a binary image is scanned from left to right, and upon completion of scanning, the same scanning is performed while shifting the scanning line in the downward direction), a number of horizontal vector 1104 is already held in buffer 0502, which holds a vector having an undetermined horizontal connection relationship. Hence, in step S2603, routine II, depicted by the flowchart shown in FIG. 37, is called to clarify the connection relationship of horizontal vector 1104.

First, in step S3701, a number registered in buffer 0502, shown in FIG. 5, is registered in the column 0303 of the table shown in FIG. 3. In step S3702, the value of the counter 0300 is registered in a row corresponding to the number registered in buffer 0502, in column 0404 of the table shown in FIG. 4.

The process then proceeds to step S2604, shown in FIG. 26, where the value of counter 0300 is incremented by one, and the processing of case I is terminated. The target region is then shifted to the next raster scanning position.

Case 2

Figure 12:
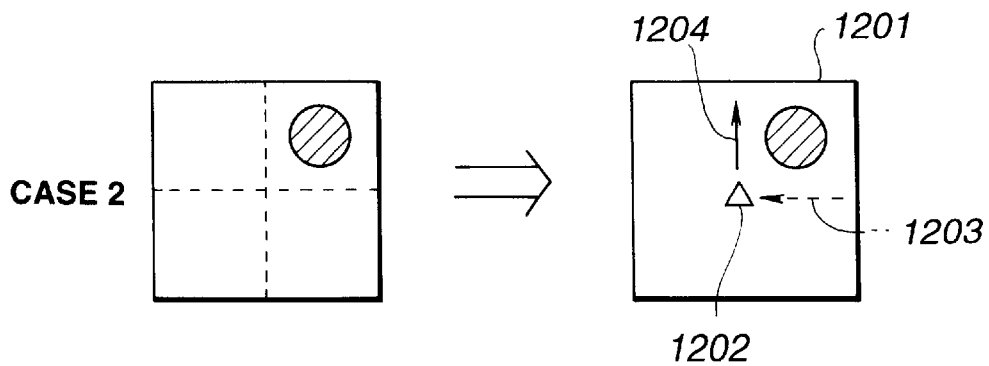
FIG. 12 is a diagram illustrating a state of case 2 in contour-vector extraction processing in the first embodiment.
Figure 27:
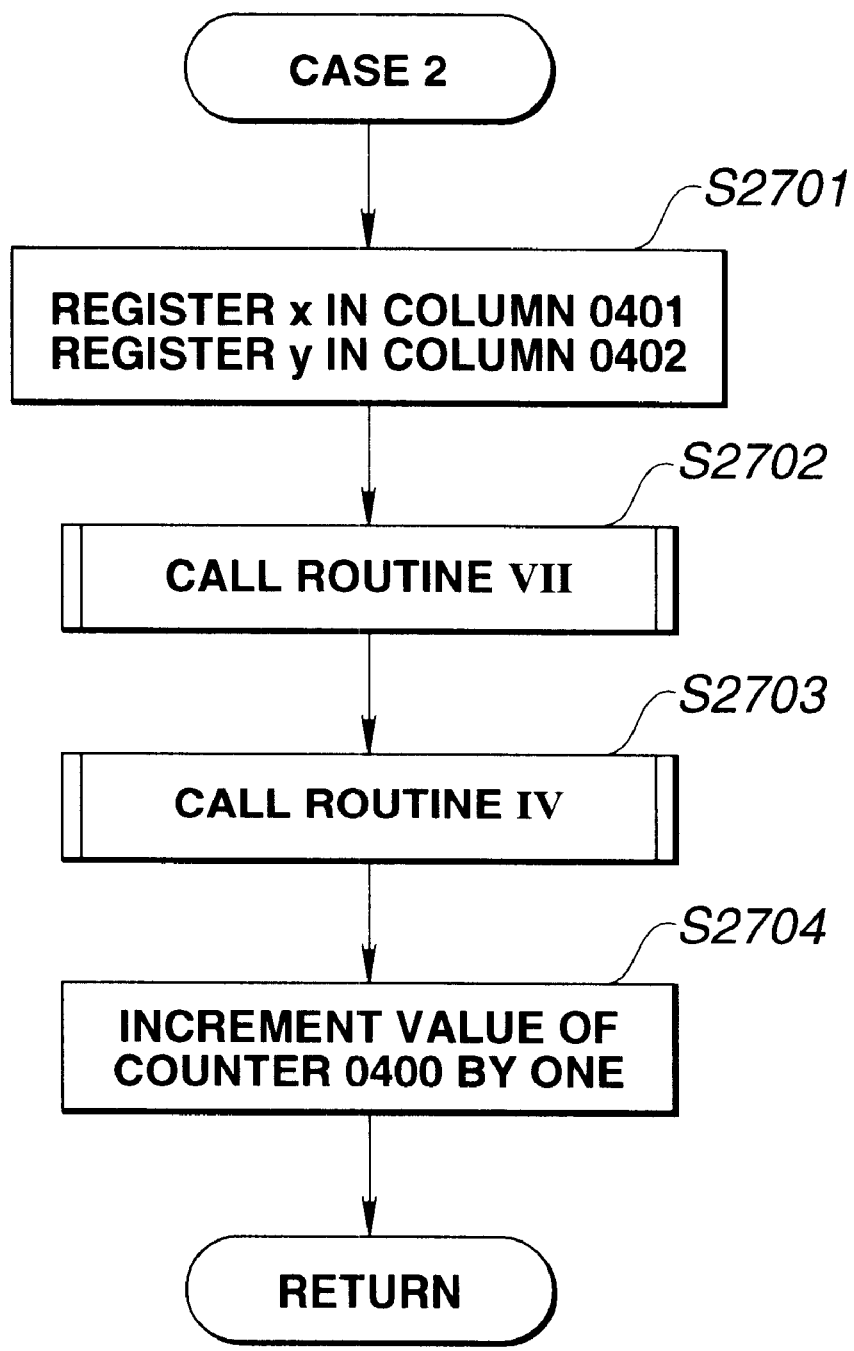
FIG. 27 is a flowchart illustrating processing steps for processing case 2 in the first embodiment.

FIG. 12 illustrates a state in which only a pixel at the upper right position of a 4-pixel region is a black pixel, and in which the remaining pixels are white pixels (case 2). In this case, target point a 1202, within region 1201, is a contour point, and is a start point of a vertical vector. FIG. 27 is a flowchart for processing the 4-pixel region in this case.

In step S2701, the coordinates (x,y) of the target point are designated as the start point of the vertical vector, and the values x and y are registered in columns 0401 and 0402, respectively, of the table shown in FIG. 4.

Figure 42:
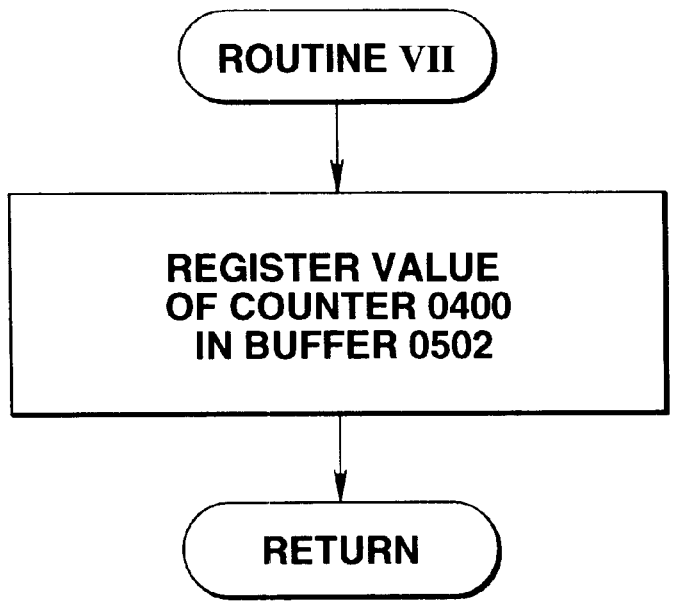
FIG. 42 is a flowchart illustrating processing steps for processing routine VII.

Since the start point of horizontal vector 1203, shown in FIG. 12, flowing into this contour point is within an unscanned region, in step S2702, routine VII, depicted in the flowchart shown in FIG. 42, is called, and the value of counter 0400 is registered in buffer 0502.

Figure 39:
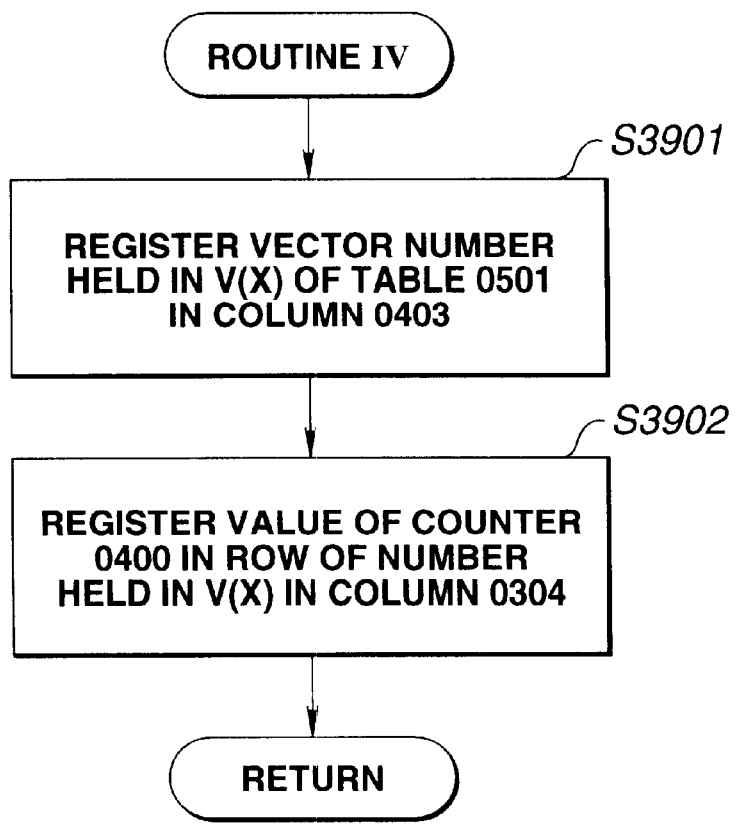
FIG. 39 is a flowchart illustrating processing steps for processing routine IV.

In step S2703, the terminal point of vertical vector 1204, shown in FIG. 12, flowing out from the contour point is retrieved. Since the terminal point of this vertical vector is a contour point which has already been scanned, vertical vector 1204 is already registered in the x-th row v(x) of table 0501, shown in FIG. 5. Hence, in step S2703, routine IV, depicted in the flowchart shown in FIG. 39, is called to clarify the connection relationship of vertical vector 1204.

First, in step S3901, the number registered in v(x) is registered in column 0403 of the table shown in FIG. 4. In the next step S3902, the value of counter 0400 is registered in a row corresponding to v(x) in column 0304 of the table shown in FIG. 3.

Returning again to FIG. 27, in the final step S2704, the value of counter 0400 is incremented by one, and the processing of case 2 is terminated. The target region is then shifted to the next raster scanning position.

Case 3

Figure 13:
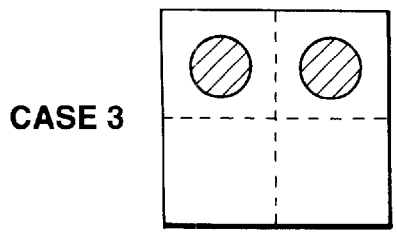
FIG. 13 is a diagram illustrating a state of case 3 in contour-vector extraction processing in the first embodiment.

FIG. 13 illustrates a state in which the upper two pixels, in a 4-pixel region, are black pixels and in which the lower two pixels in the 4-pixel region are white pixels (case 3). In this case, a target point is not a contour point, since the target point is a midpoint of a horizontal vector having an undetermined start point and an undetermined terminal point. Therefore, processing is not performed, and the target region is then shifted to the next raster scanning position.

Case 4

Figure 14:
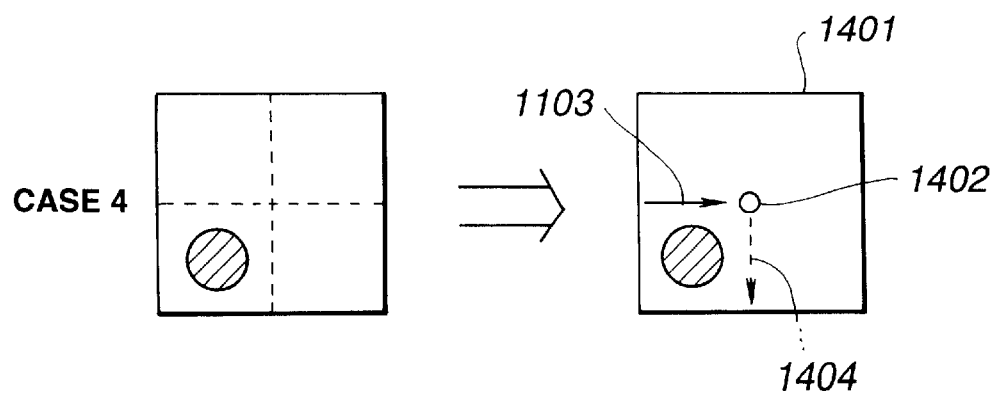
FIG. 14 is a diagram illustrating a state of case 4 in contour-vector extraction processing in the first embodiment.
Figure 28:
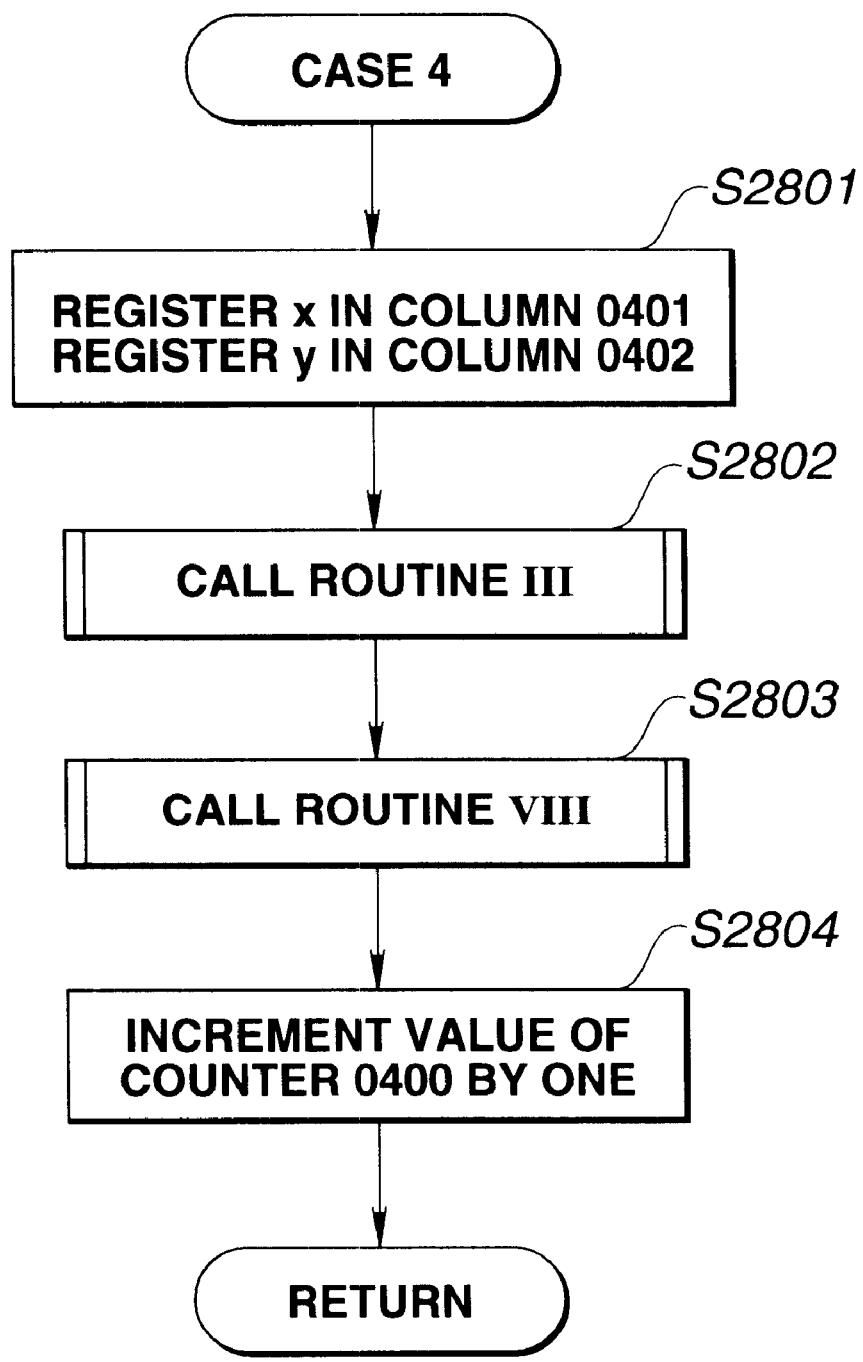
FIG. 28 is a flowchart illustrating processing steps for processing case 4 in the first embodiment.
Figure 29:
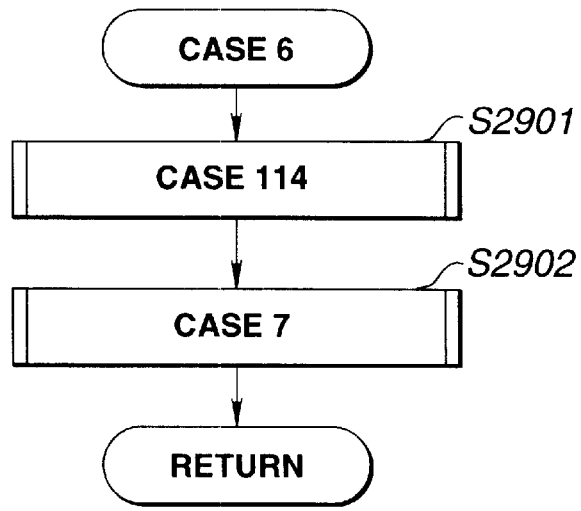
FIG. 29 is a flowchart illustrating processing steps for processing case 6 in the first embodiment.

FIG. 14 illustrates a state in which only a pixel in the lower left position of a 4-pixel region is a black pixel, and in which the remaining pixels are white pixels (case 4). In this case, target point Δ 1402, within region 1401, is a contour point, and is the start point of a vertical vector. FIG. 28 is a flowchart for processing the 4-pixel region in this case.

In step S2801, the coordinates (x,y) of the target point are designated as the start point of the vertical vector, and the values x and y are registered in a row indicated by counter 044 in columns 0401 and 0402, respectively, of the table 0400 shown in FIG. 4.

Figure 38:
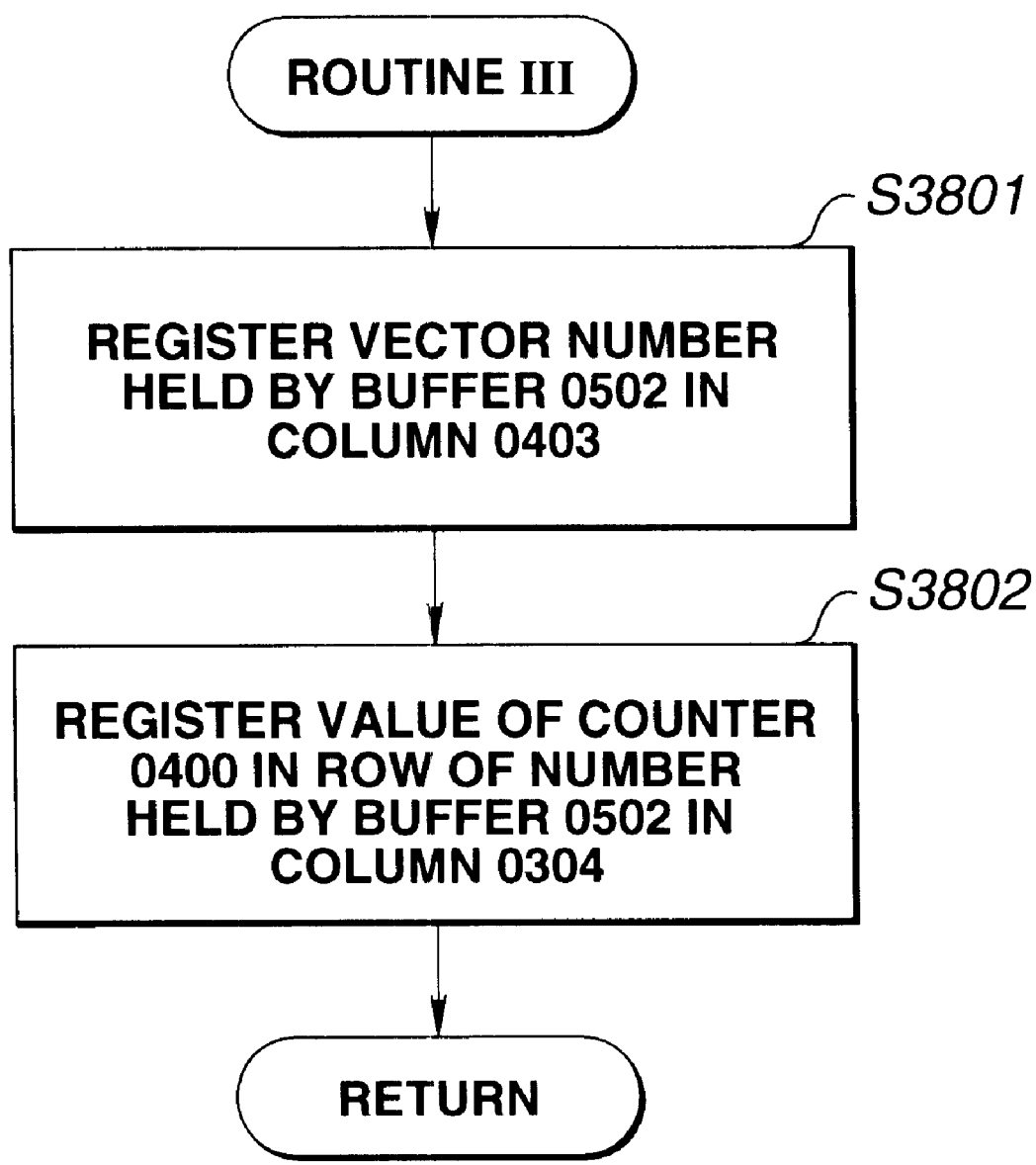
FIG. 38 is a flowchart illustrating processing steps for processing routine III.

In step S2802, the start point of a horizontal vector 1403 flowing into this contour point is retrieved. Since the start point of this horizontal vector is a contour point which has already been scanned, the number of the horizontal vector is already held in buffer 0502, shown in FIG. 5. Hence, in step S2802, routine III, depicted in the flowchart shown in FIG. 38, is called in order to clarify the connection relationship of the horizontal vector.

First, in step S3801, the number registered in buffer 0502 is registered in a row indicated by counter 0400 in column 0403. In step S3802, the value of counter 0400 is registered in a row corresponding to the number registered in buffer 0502 in the column 0304.

Figure 43:
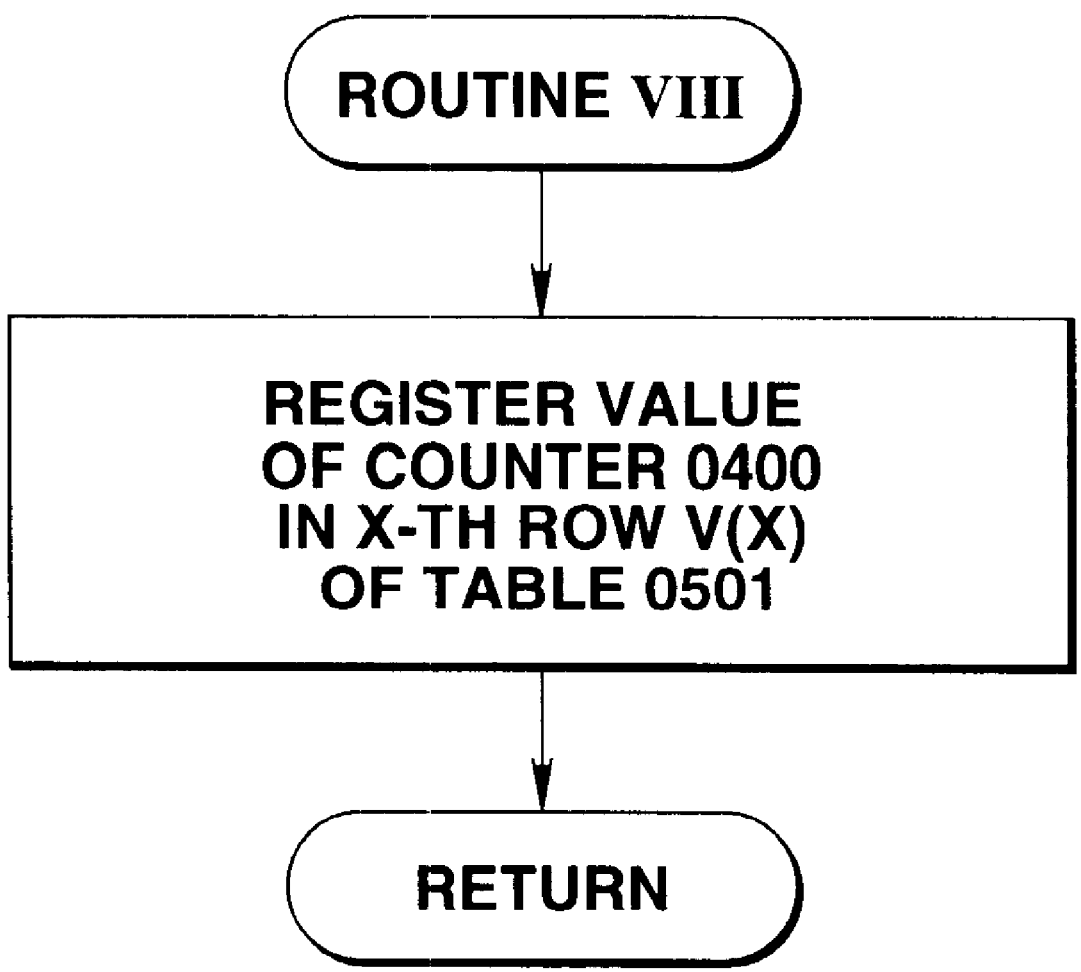
FIG. 43 is a flowchart illustrating processing steps for processing routine VIII.

Since the terminal point of vertical vector 1404 flowing out from the contour point is in an unscanned region, in step S2803, routine VIII, depicted in the flowchart shown in FIG. 43, is called, and the value of the counter 0400 is registered in the x-th row v(x) of buffer 0501, shown in FIG. 5.

In step S2804, shown in FIG. 28, the value of counter 0400 is incremented by one, and the processing of case 4 is terminated. The target region is then shifted to the next raster scanning position.

Case 5

Figure 15:
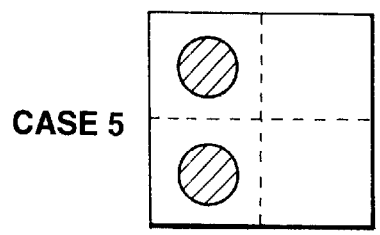
FIG. 15 is a diagram illustrating a state of case 5 in contour-vector extraction processing in the first embodiment.

FIG. 15 illustrates a state in which the two pixels in the left half of a 4-pixel region are black pixels and in which the two pixels in the right half of the 4-pixel region are white pixels (case 5). In this case, since a target point is not a contour point, processing is not performed and the target region is then shifted to the next raster scanning position.

Case 6

Figure 16:
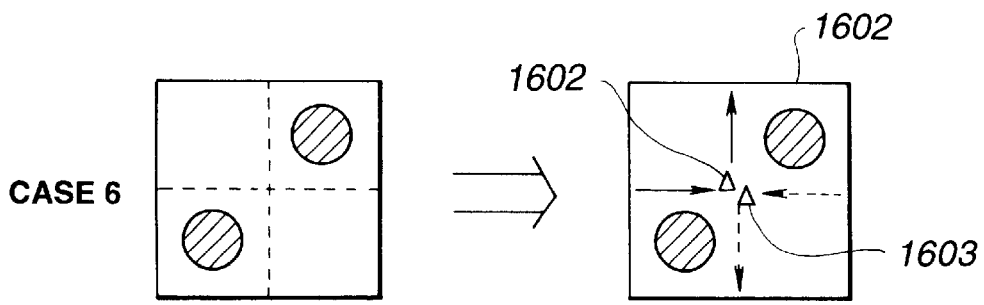
FIG. 16 is a diagram illustrating a state of case 6 in contour-vector extraction processing in the first embodiment.

FIG. 16 illustrates a state in which pixels at the upper right position and the lower left position of a 4-pixel region are black pixels and in which the remaining pixels are white pixels (case 6). In this case, two contour points are present at a target point in region 1601. Each of the two contour points present is considered to be a start point of a vertical vector. A point 1602 is processed by the same routine as in case 14 (to be described later). A point 1603 is processed by the same routine as in case 7 (to be described later). Accordingly, the processing of case 6 is indicated by the flowchart shown in FIG. 29. The target region is then shifted to the next raster scanning position.

Case 7

Figure 17:
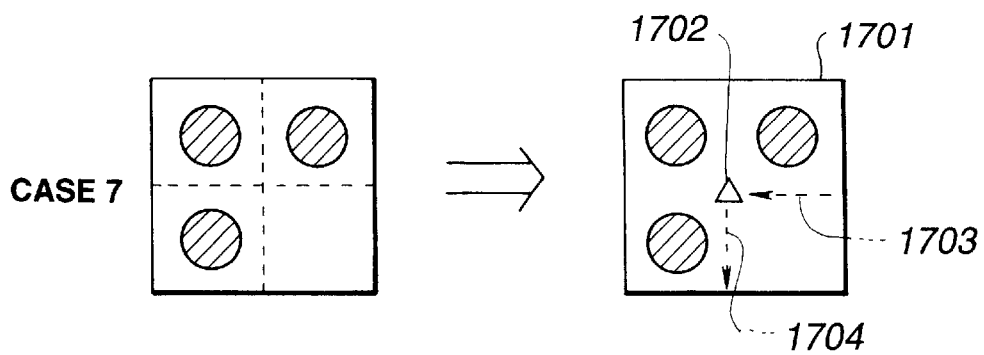
FIG. 17 is a diagram illustrating a state of case 7 in contour-vector extraction processing in the first embodiment.
Figure 30:
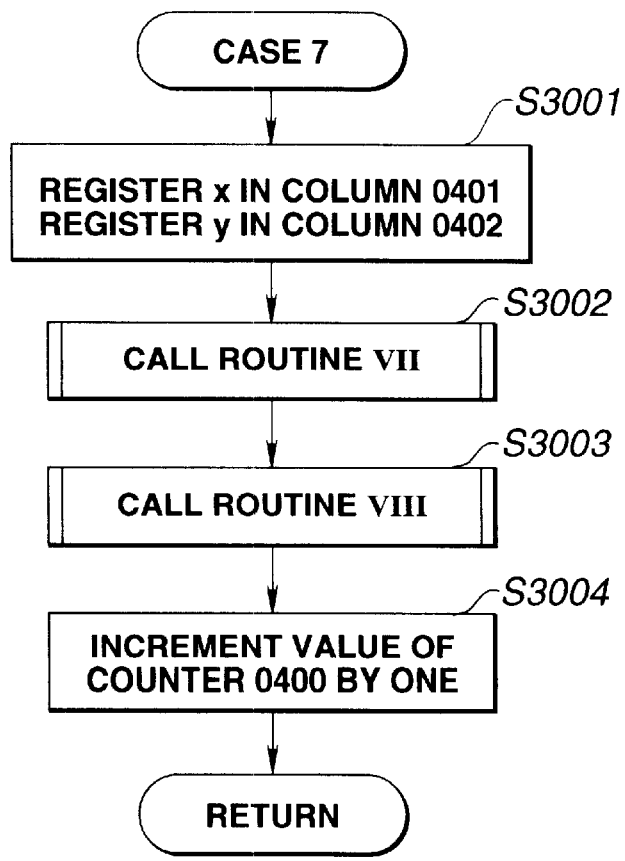
FIG. 30 is a flowchart illustrating processing steps for processing case 7 in the first embodiment.

FIG. 17 illustrates a state in which only a pixel at the lower right position in a 4-pixel region is a white pixel and in which the remaining pixels are black pixels (case 7). In this case, target point Δ 1702, within region 1701, is a contour point, and is the start point of a vertical vector. FIG. 30 illustrates the flowchart for processing the 4-pixel region in this case.

In step S3001, the coordinates (x,y) of the target point are designated as the start point of the vertical vector, and the values x and y are registered in a row indicated by counter 0400 in columns 0401 and 0402, respectively, of the table shown in FIG. 4.

Since the start point of horizontal vector 1703, shown in FIG. 17, flowing into the contour point is within an unscanned region, routine VII, shown in FIG. 42, is called in step S3002.

Since the terminal point of vertical vector 1704, shown in FIG. 17, flowing out from contour point is within an uscanned region, routine VIII, shown in FIG. 43, is called in step S3003.

In step S3304, the value of counter 0400 is incremented by one, and processing of case 7 is terminated. The target region is then shifted to the next raster scanning position.

Case 8

Figure 18:
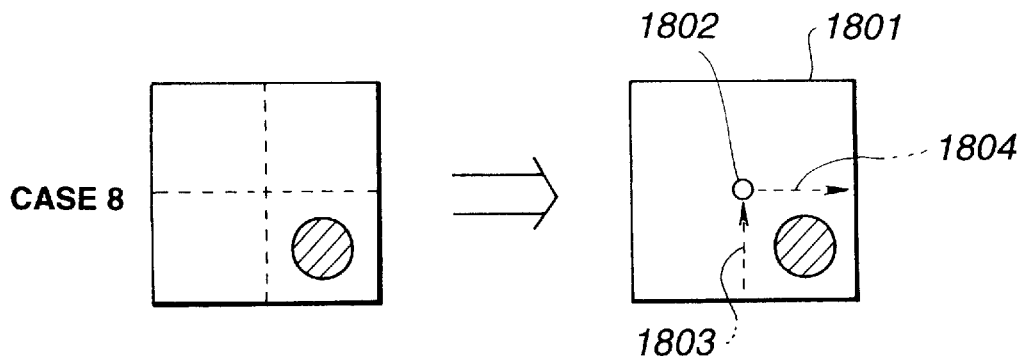
FIG. 18 is a diagram illustrating a state of case 8 in contour-vector extraction processing in the first embodiment.
Figure 31:
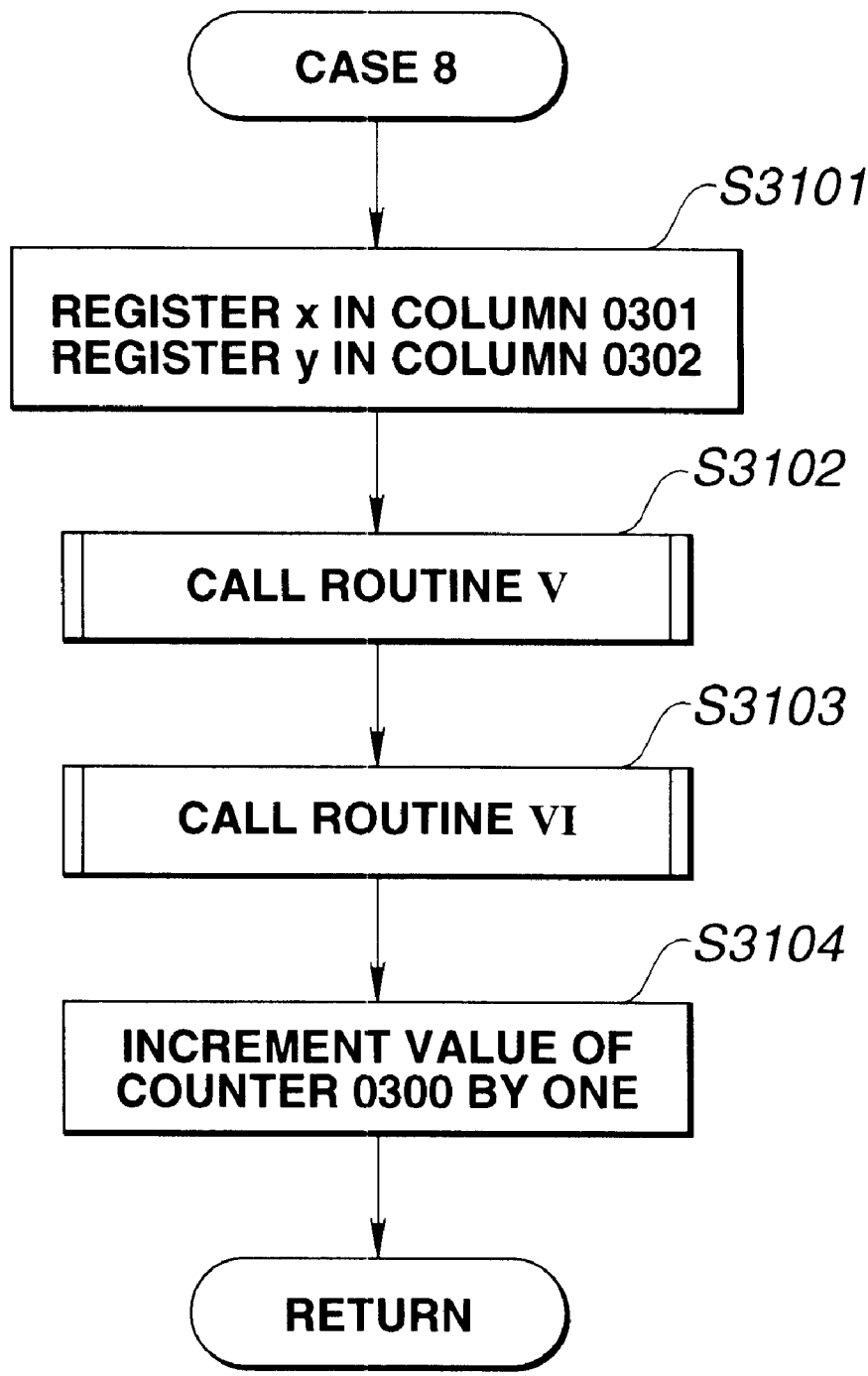
FIG. 31 is a flowchart illustrating processing steps for processing case 8 in the first embodiment.
Figure 32:
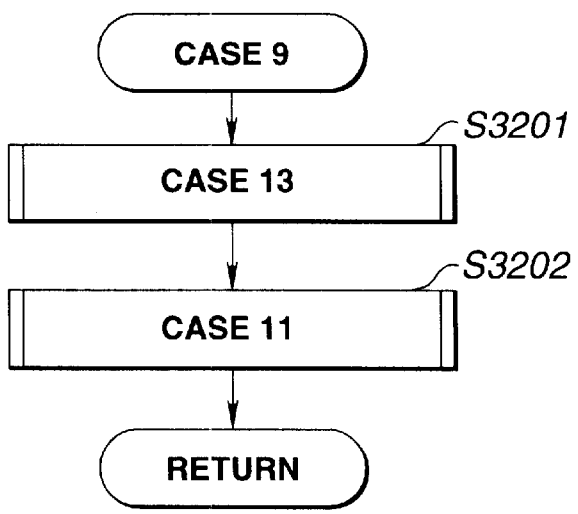
FIG. 32 is a flowchart illustrating processing steps for processing case 9 in the first embodiment.

FIG. 18 illustrates a state in which only a pixel at the lower right position of a 4-pixel region is a black pixel and in which the remaining pixels are white pixels (case 8). In this case, target point 1802, within region 1801, is a contour point, and is the start point of a horizontal vector. FIG. 31 is a flowchart illustrating processing for the 4-pixel region in this case.

In step S3101, the values x and y are registered in a row indicated by counter 300 in columns 0301 and 0302, respectively, of the table shown in FIG. 3.

Figure 40:
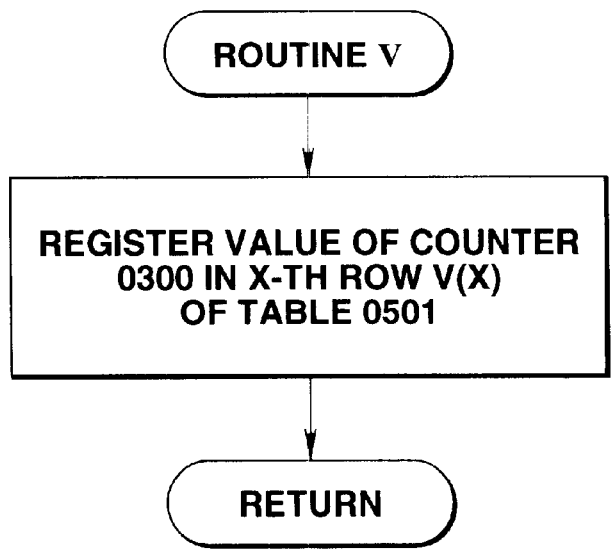
FIG. 40 is a flowchart illustrating processing steps for processing routine V.

Since the start point of vertical vector 1804, shown in FIG. 18, flowing into this contour point is within an unscanned region, routine V, depicted in the flowchart shown in FIG. 40, is called in step S3102, and the value of counter 0300 is registered in the x-th row v(x) of buffer 0501, shown in FIG. 5.

Figure 41:
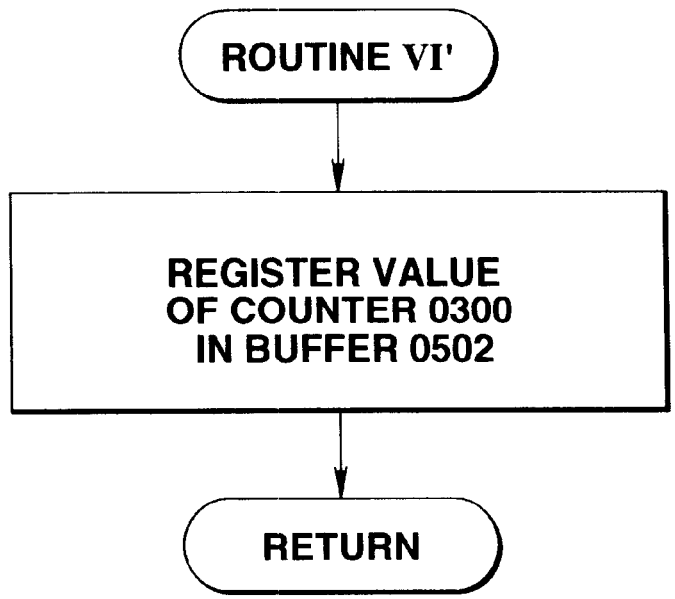
FIG. 41 is a flowchart illustrating processing steps for processing routine VI.

Since the terminal point of horizontal vector 1803 flowing out from this contour point is within an unscanned region, routine VI, depicted in the flowchart shown in FIG. 41, is called, and the value of counter 0300 is registered in buffer 0502 shown in FIG. 5.

In step S3104, the value of counter 0300 is incremented by one, and processing of case 8 is terminated. The target region is then shifted to the next raster scanning position.

Case 9

Figure 19:
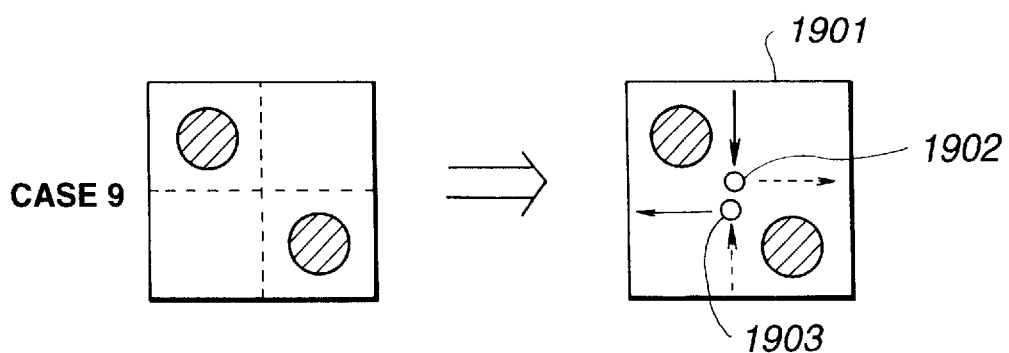
FIG. 19 is a diagram illustrating a state of case 9 in contour-vector extraction processing in the first embodiment.

FIG. 19 illustrates a state in which pixels at the upper left and the lower right of a 4-pixel region are black pixels, and in which the remaining pixels are white pixels (case 9). In this case, two contour points are present at a target point of a region 1901, and each of the two contour points is considered to be the start point of a horizontal vector. Contour point 1902 is processed by the same routine as case 13 (to be described later), and contour point 1903 is processed by the same routine as case 11 (to be described later). Accordingly, processing of case 9 is illustrated by the flowchart shown in FIG. 32. The target region is then shifted to the next raster scanning position.

Case 10

Figure 20:
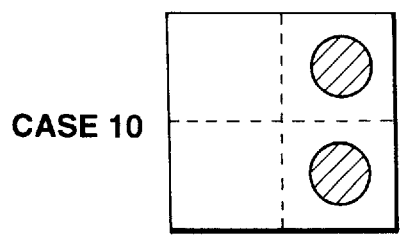
FIG. 20 is a diagram illustrating a state of case 10 in contour-vector extraction processing in the first embodiment.

FIG. 20 illustrates a state in which the two pixels in the right half of a 4-pixel region are black pixels and in which the remaining pixels are white pixels (case 10). In this case, since a target point does not become a contour point, processing is not performed. The target region is then shifted to the next raster scanning position.

Case 11

Figure 21:
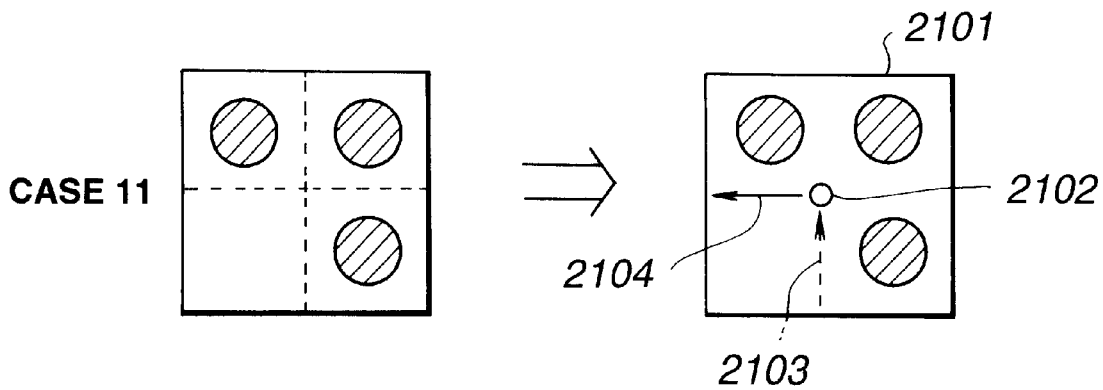
FIG. 21 is a diagram illustrating a state of case 11 in contour-vector extraction processing in the first embodiment.
Figure 33:
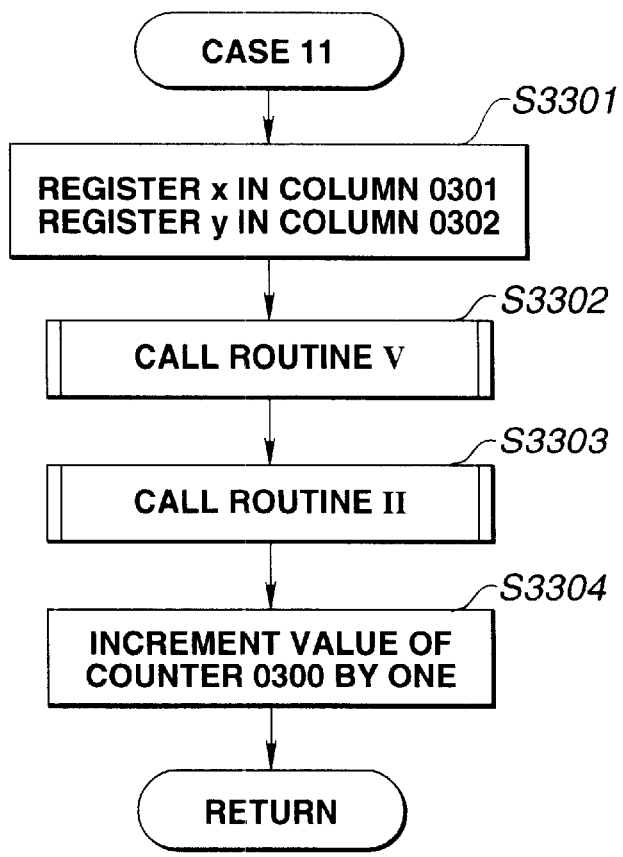
FIG. 33 is a flowchart illustrating processing steps for processing case 11 in the first embodiment.

FIG. 21 illustrates a state in which only a pixel at the lower left position of a 4-pixel region is a white pixel and in which the remaining pixels are black pixels (case 11). In this case, target point 2102, within region 2101, is a contour point, and is the start point of a horizontal vector. FIG. 33 is a flowchart illustrating processing of the 4-pixel region in this case.

In step S3301, the coordinates (x,y) of the target point are designated as the start point of the horizontal vector, and the values x and y are registered in columns 0301 and 0302, respectively, of the table shown in FIG. 3.

Since the start point of vertical vector 2103, shown in FIG. 21, flowing into this contour point is present within an unscanned region, routine V is called in step S3302.

In step S3303, since the terminal point of a horizontal vector 2104, shown in FIG. 21, is a contour point which has already been scanned, routine II is called.

In step S3304, the value of counter 0300 is incremented by one, and processing of case 11 is terminated. The target region is then shifted to the next raster scanning position.

Case 12

Figure 22:
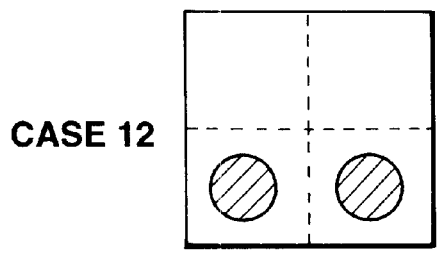
FIG. 22 is a diagram illustrating a state of case 12 in contour-vector extraction processing in the first embodiment.

FIG. 22 illustrates a state in which the two pixels in the lower half of a 4-pixel region are black pixels and in which the two pixels in the upper half of the 4-pixel region are white pixels (case 12). In this case, since a target point is not a contour point, processing is not performed. The target region is then shifted to the next raster scanning position.

Case 13

Figure 23:
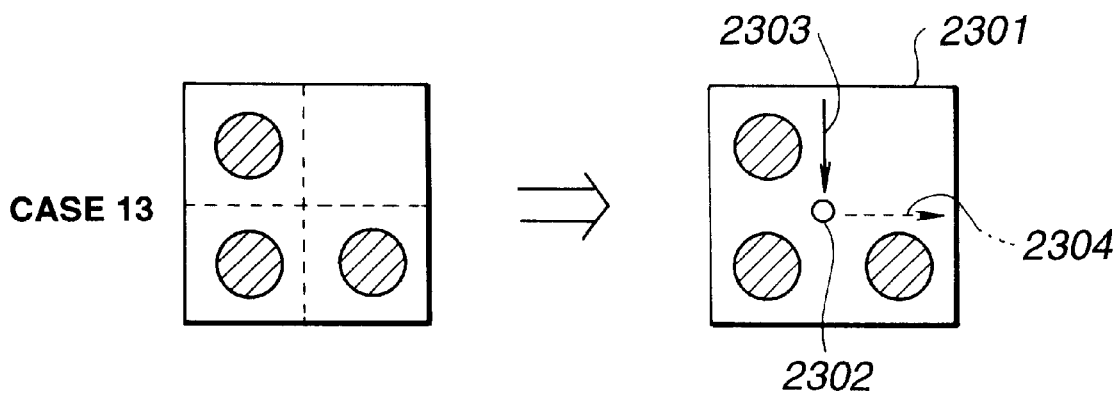
FIG. 23 is a diagram illustrating a state of case 13 in contour-vector extraction processing in the first embodiment.
Figure 34:
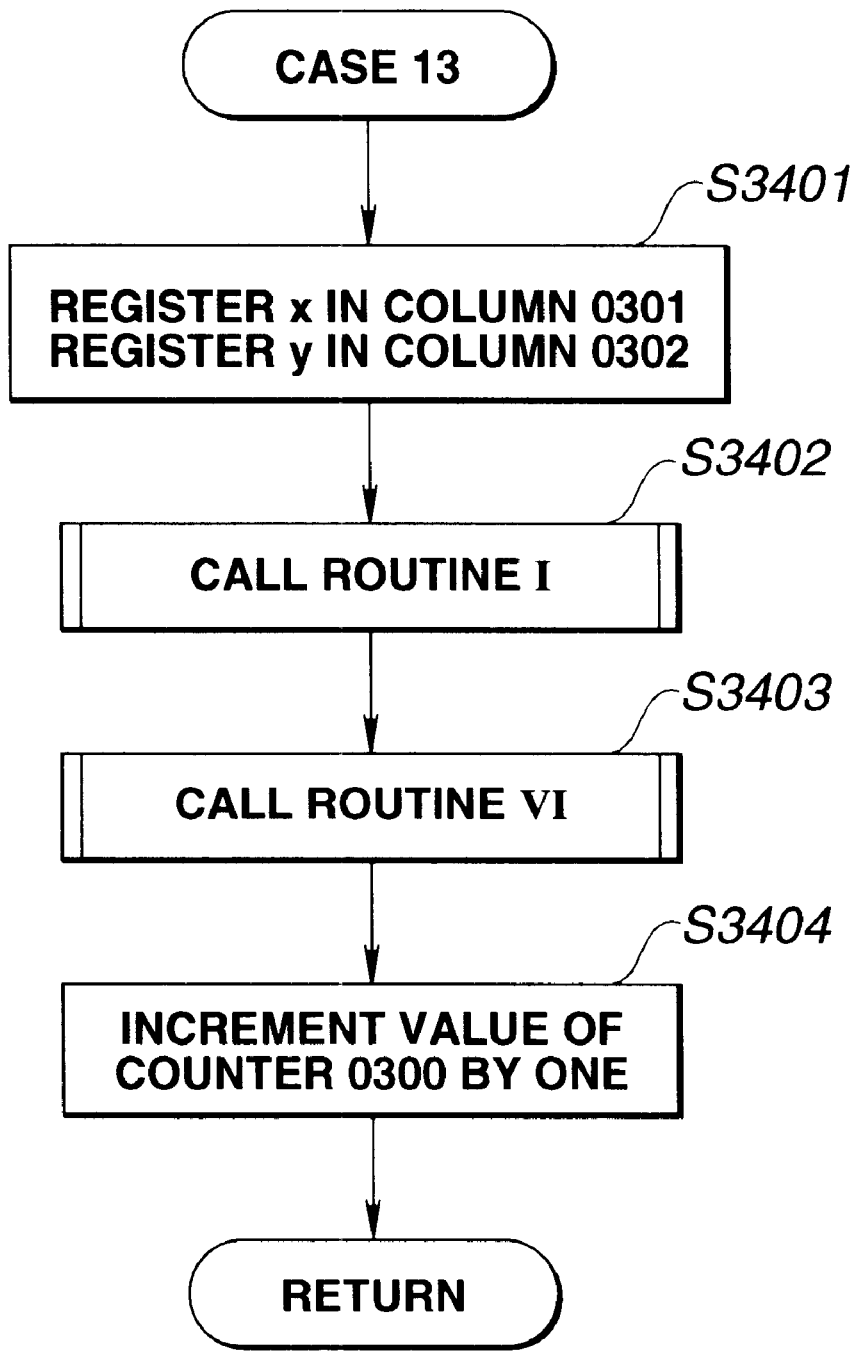
FIG. 34 is a flowchart illustrating processing steps for processing case 13 in the first embodiment.

FIG. 23 illustrates a state in which only a pixel at the upper right position of a 4-pixel region is a white pixel, and in which the remaining pixels are black pixels (case 13). In this case, target point 2302, within region 2301, is a contour point, and is the start point of a horizontal vector. FIG. 34 is a flowchart illustrating processing of the 4-pixel region in this case.

In step S3401, the coordinates (x,y) of the target point are designated as the start point of the horizontal vector, and the values x and y are registered in the columns 0301 and 0302, respectively, of the table shown in FIG. 3.

Since the start point of vertical vector 2303, shown in FIG. 23, flowing into this contour point is a contour point which has already been scanned, routine I is called in step S3402.

In step S3403, since the terminal point of horizontal vector 2304, shown in FIG. 23, is within an unscanned region, routine VI is called.

In step S3404, the value of counter 0300 is incremented by one, and processing of case 13 is terminated. The target region is then shifted to the next raster scanning position.

Case 14

Figure 24:
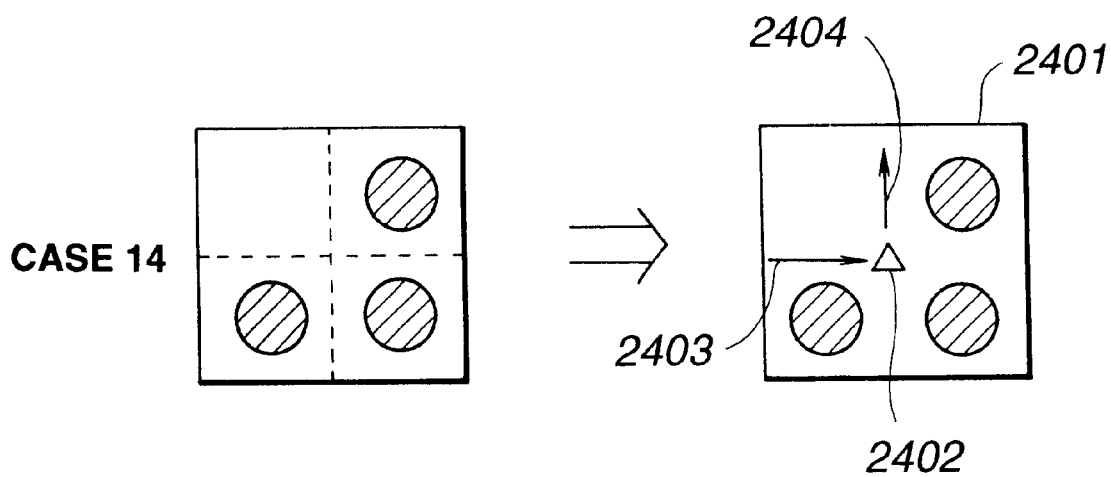
FIG. 24 is a diagram illustrating a state of case 14 in contour-vector extraction processing in the first embodiment.
Figure 35:
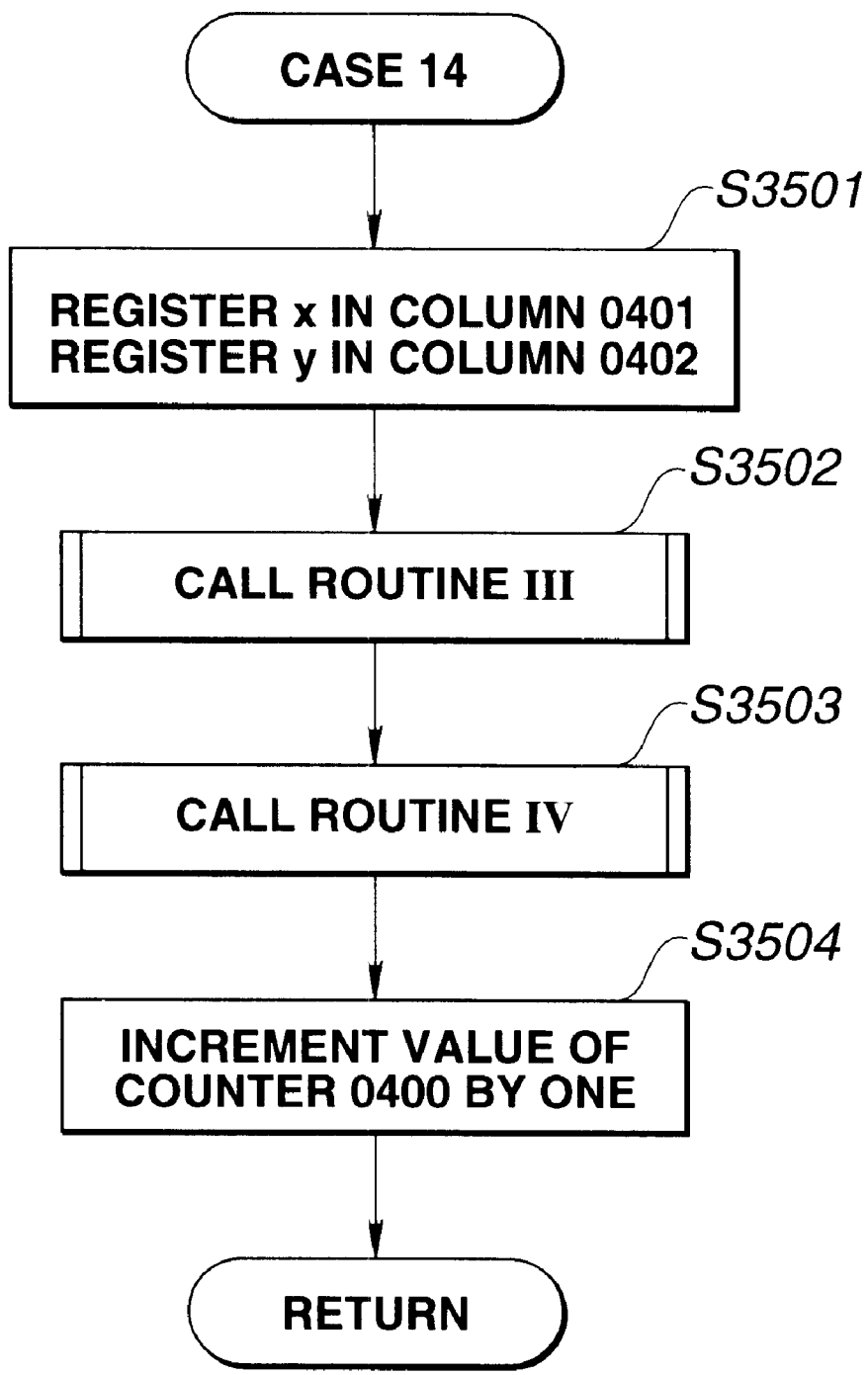
FIG. 35 is a flowchart illustrating processing steps for processing case 14 in the first embodiment.

FIG. 24 illustrates a state in which only a pixel at the upper left position of a 4-pixel region is a white pixel, and in which the remaining pixels are black pixels (case 14). In this case, target point Δ 2402, within region 2401, is a contour point, and is the start point of a vertical vector. FIG. 35 is a flowchart illustrating processing of the 4-pixel region in this case.

In step S3501, the coordinates (x,y) of a target point are made to be the start point of the vertical vector, and the values x and y are registered in columns 0401 and 0402, respectively, of the table shown in FIG. 4.

Since the start point of horizontal vector 2403, shown in FIG. 24, flowing into this contour point is a contour point which has already been scanned, routine III is called in step S3502.

Since the start point of vertical vector 2404, shown in FIG. 24, flowing out from this contour point is a contour point which has already been scanned, routine IV is called in step S3503.

In step S3504, the value of counter 0400 is incremented by one, and the processing of case 14 is terminated. The target region is then shifted to the next raster scanning position.

Case 15

Figure 25:
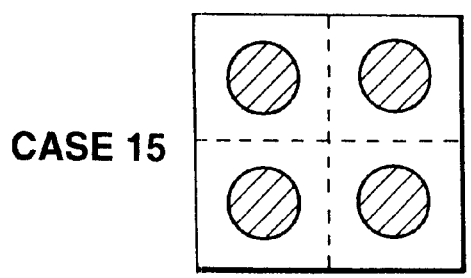
FIG. 25 is a diagram illustrating a state of case 15 in contour-vector extraction processing in the first embodiment.

FIG. 25 illustrates a state in which all pixels within a 4-pixel region are black pixels (case 15). In this case, since a target point is not a contour point, processing is not performed. The target region is then shifted to the next raster scanning position.

According to the above-described procedures, processing for each 4-pixel region for each case 0 to 15 is performed. FIG. 48 shows processing steps S4801–S4807 for processing for the entire input binary image. In this regard, the processing shown in FIG. 48 is repeated for each binary image until it is determined that the entire input binary image has been processed.

Figure 44:
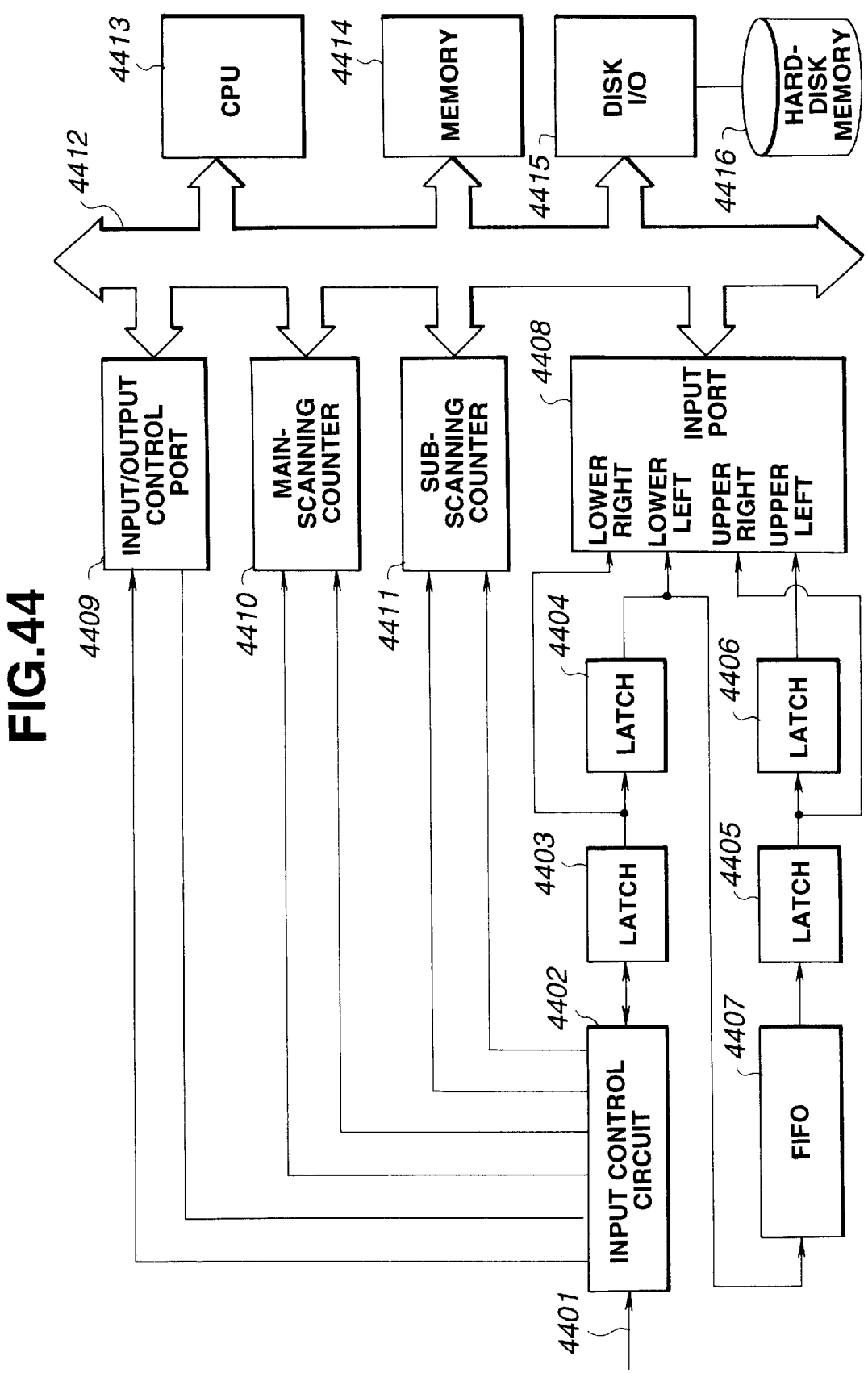
FIG. 44 is a block diagram illustrating the configuration of an apparatus according to the first embodiment.

FIG. 44 is a block diagram illustrating the hardware configuration for performing contour vector extraction of the present embodiment. Programs corresponding to all of the above-described flowcharts are stored in a memory 4414, and are executed by CPU (central processing unit) 4413, both of which are shown in FIG. 44.

In FIG. 44, an input control circuit 4402 controls binary image data sequentially input from signal line 4401 of raster scanning. Latch 4403 holds data input via the input control circuit 4402, while sequentially updating data for each pixel with a pixel synchronizing clock signal (not shown). Latch 4403 receives data for the next pixel from the input control circuit 4402 at the next pixel synchronizing clock signal. At that time, image data which is already held in latch 4403 is held in latch 4404 in synchronization with the pixel synchronizing clock signal.

FIFO (first-in first-out) memory 4407 holds pixel data for one raster. FIFO 4407 sequentially receives the output of latch 4404 in synchronization with the pixel synchronizing clock signal, and outputs data of the preceding raster to latch 4405.

Latches 4405 and 4406 have the same function as latches 4403 and 4404.

Data of four pixels stored in latches 4403, 4404, 4405 and 4406 correspond to pixel data of the 4-pixel region shown in FIG. 1.

A predetermined apparatus, such as an image scanner, a facsimile apparatus, or an image processing apparatus such as a personal computer, is connected to the signal line 4401. Image data for each line in the main scanning direction is sequentially transferred from the apparatus, as shown in FIG. 1.

Input port 4408 of CPU 4413 receives data from latches 4403, 4404, 4405 and 4406. Main scanning counter 4410 indicates the position of each interpixel grid in the main scanning direction, and is set by a sub-scanning synchronizing signal (not shown). The value of main scanning counter 4410 is incremented by a pixel synchronizing signal. Sub-scanning counter 4411 indicates the position of each interpixel grid in the sub-scanning direction, and is set by a page synchronizing signal (not shown). The value of sub-scanning counter 4410 is incremented by a sub-scanning synchronizing signal. Input/output control port 4409 holds a signal instructing execution and holding of input pixel data in input control circuit 4402, a signal from input control circuit 4402 for notifying CPU 4413 of updating of pixel data, and the like. Reference numeral 4415 represents an input/output device for hard disk memory 4416 (used for storing finally extracted contour information). Input/output control port 4409, main scanning counter 4410, sub-scanning counter 4411, input port 4408, memory 4414 and disk I/O 4415 are all connected to CPU 4413 via bus 4412.

Thus, CPU 4413 can update pixel data via input/output control port 4409, know the position of a window of a 4-pixel region via main scanning counter 4410 and sub-scanning counter 4411, and know the state of pixels within the window via input port 4408.

After completing one processing operation, CPU 4413 instructs updating of pixel data stored in the four latches (4403 to 4406) via input/output control port 4409, and also resets a signal indicating that updating of the pixel data has been completed. The input/output control port 4409 clears the signal instructing updating of pixel data, and updates image data to be latched in the following stage. Upon completion of this updating, a signal indicating completion of updating is output to input/output control port 4409.

After instructing updating, CPU 4413 monitors input of a signal indicating completion of updating from input/output control port 4409. When this signal indicating completion of updating has been input, CPU 4413 executes processing relating to pixel data newly stored in the four latches by repeating the above-described processing. Upon completion of processing of the final 4-pixel region, an end signal is output to input/output control port 4409.

As described above, in the present embodiment, by using a window of a 4-pixel region comprising 2×2 pixels in the vertical and horizontal directions as a unit of raster scanning, the number of positions where a contour point can be present within the window is limited to only one. Thus, the number of patterns of pixel states within the window is reduced, and therefore the number of processing modules is reduced. Furthermore, since processing for each state is simplified, the scale of the hardware required to perform the processing can also be reduced.

Explanation of Second Embodiment

In a second embodiment of the present invention, the sequence of the second and third steps (the steps of calling routine I through VIII) is inverted in the processing of case 1, case 2, case 4, case 7, case 8, case 11, case 13 and case 14.

However, the processing sequence of case 6 and case 9 is not inverted.

Third Embodiment

The first embodiment of the present invention is a method for determining a connection relationship in which a single buffer for holding the number of a vector having an undetermined horizontal connection relationship is provided, and in which a table for holding a number of each vector having an undetermined vertical connection relationship is provided in a stacked form. In contrast, the third embodiment is a method for determining a connection relationship by making an x coordinate of a start point of a vector coincide with a number of a row in a table, combined with a method for extracting a contour point within a 9-pixel region comprising 3×3 pixels, such as that described in U.S. application Ser. No. 08/161,082.

Figure 45:
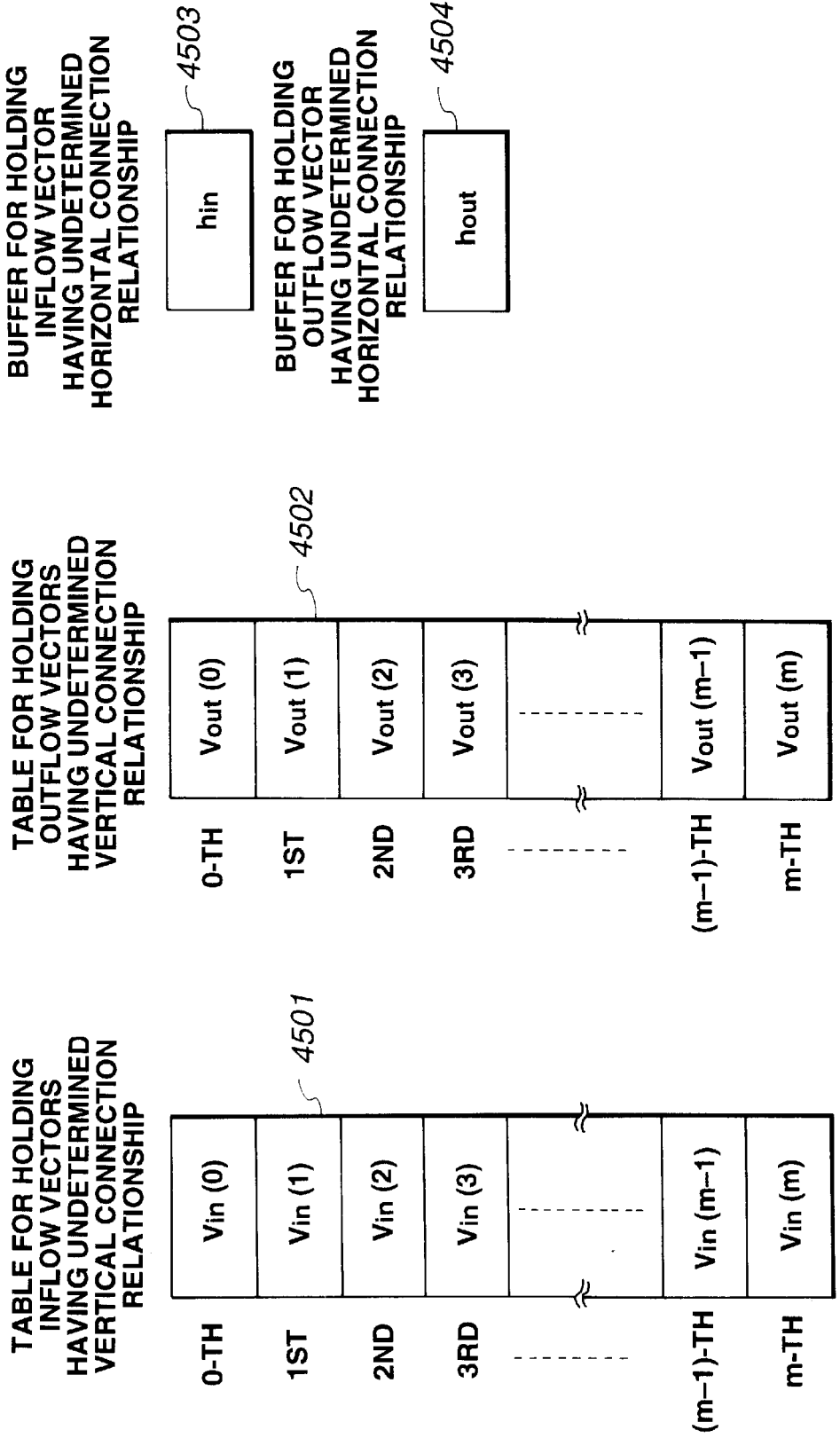
FIG. 45 illustrates tables for holding a number of each vector having an undetermined vertical connection relationship and buffers for holding a number of each vector having an undetermined horizontal connection relationship, used in a third embodiment of the present invention.

In this case, a table and a buffer are prepared for holding a number of each outflow contour vector having an undetermined connection relationship, and a table and a buffer are prepared for holding a number of each inflow contour vector having an undetermined connection relationship as shown in FIG. 45. Connection relationships for contour vectors are determined in the following manner.

In the following example, suppose that the start point of a horizontal vector is extracted within a 9-pixel region comprising 3×3 pixels. In this case, as in the first embodiment, coordinates of the start point are registered in columns 0301 and 0302 of the table shown in FIG. 3. Also suppose, in this example, that the value of counter 0300 equals p, and that the x coordinate of this vector is $x_p$. When the terminal point of this horizontal vector is within an unoperated region, and therefore cannot be determined, vector number p is held in buffer 4504 for holding an outflow vector having an undetermined horizontal connection relationship. When the terminal point of this horizontal vector is within an operated region, this vector has a connection relationship with a vertical vector having a number (assumed to be q) held by buffer 4503 for holding an inflow vector having an undetermined horizontal connection relationship. Hence, the number q is registered in a row having number p in column 0304 of the table shown in FIG. 3, and number p is registered in a row having number q in column 0403 of the table shown in FIG. 4. When the start point of a vertical vector having the terminal point at the horizontal vector having number p is within an unoperated region and is therefore not determined, number p is held in the $x_p$-th row of the table 4501 for holding inflow vectors having an undetermined vertical connection relationship. When the start point of a vertical vector having its terminal point at the horizontal vector having the number p is within an operated region, this horizontal vector is in a connection relationship with a vertical vector having a number (assumed to be q') held in the $x_p$-th row of table 4502 for holding outflow vectors having an undetermined vertical connection relationship. Hence, the number q' is registered in a row having number p in column 0303 of the table shown in FIG. 3, and number p is registered in a row having number q' in column 0404 of the table shown in FIG. 4.

Similarly, if the start point of a vertical vector has been extracted within a 9-pixel region comprising 3×3 pixels, as in the first embodiment, the coordinates of the start point of this vector are registered in columns 0401 and 0402 of the table shown in FIG. 4. Suppose, in this example, that at that time, the value of counter 0400 equals r, and the x coordinate of this vector is $x_r$. When the terminal point of this vertical vector is within an unoperated region, and is therefore not determined, number r of this vector is held in the $x_r$-th row of table 4502 for holding outflow vectors having an undetermined vertical connection relationship. When the terminal point of this vector is within an operated region, this vector is in a connection relationship with a horizontal vector having a number (assumed to be s) held in the $x_r$-th row of table 4501 for holding inflow vectors having an undetermined connection relationship. Hence, number s is registered in a row having the number r in column 0404 of the table shown in FIG. 4. When the start point of a horizontal vector having its terminal point at the vertical vector having number r is within an unoperated region, and is therefore not determined, number r is held in buffer 4503 for holding an inflow vector having an undetermined horizontal connection relationship. When the start point of a horizontal vector having its terminal point at the vertical vector having number r is within an operated region, this vector is in a connection relationship with a horizontal vector having a number (assumed to be s') held in buffer 4504 for holding outflow vectors having an undetermined horizontal connection relationship. Hence, number s' is registered in a row having number r in column 0403 of the table shown in FIG. 4, and number s is registered in a row having the number r' in column 0304 of the table shown in FIG. 3.

Fourth Embodiment

In a fourth embodiment of the present invention, a stack method is adopted in which, in the method for extracting a contour point within a 4-pixel region of the first embodiment, extracted vector numbers are sequentially registered in a table for holding a number of each vector having an undetermined vertical connection relationship, and are retrieved backwardly in reverse sequential order, starting from the bottom of the table.

Fifth Embodiment

Figure 46:
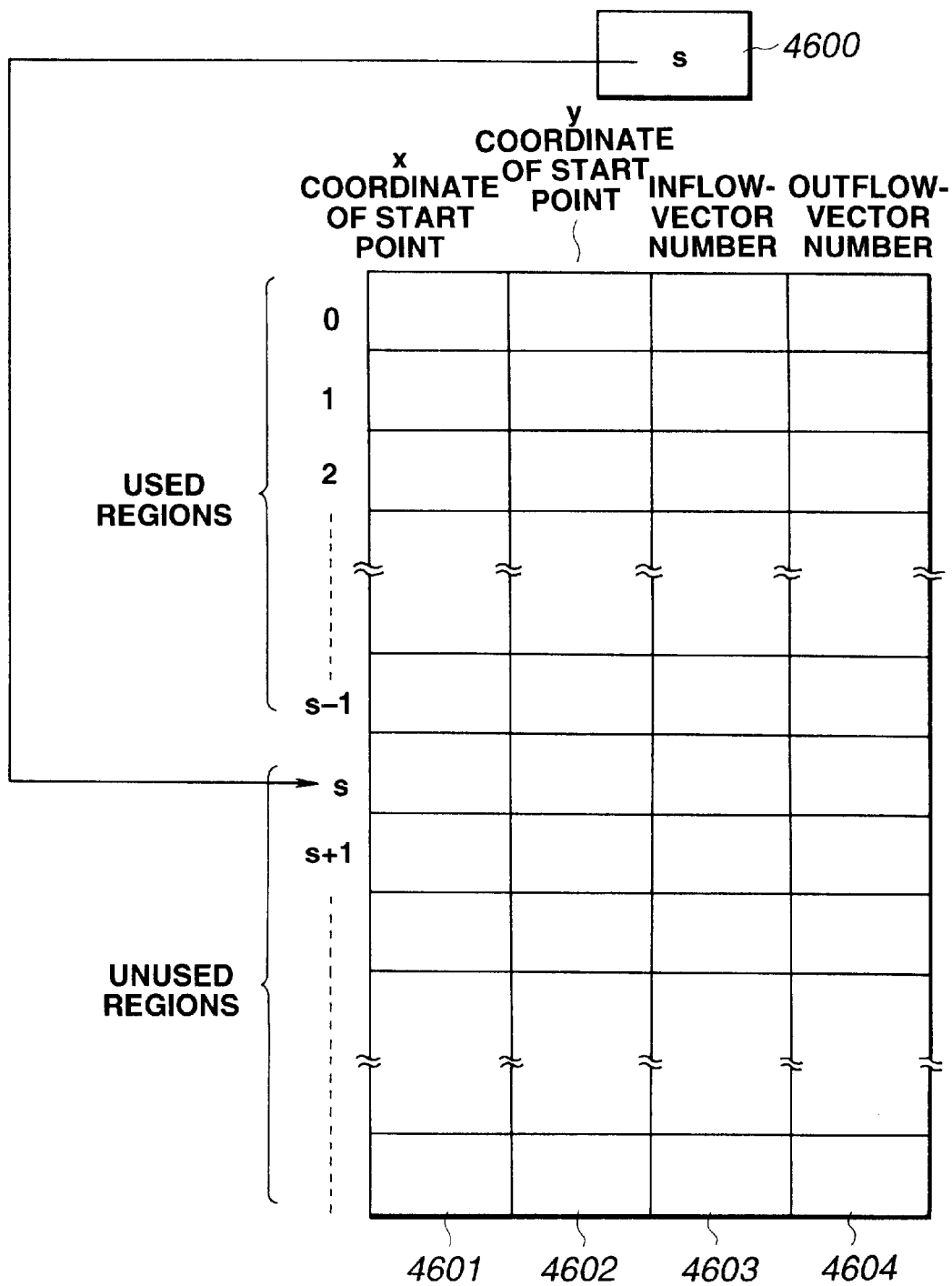
FIG. 46 is a diagram illustrating a table for registering vectors used in the third embodiment.

In a fifth embodiment of the present invention, both horizontal vectors and vertical vectors are registered in one table without discriminating whether a contour point is the start point of a horizontal vector or the start point of a vertical vector. In this case, a table shown in FIG. 46 is used instead of those showing FIGS. 3 and 4. In the present embodiment, in processing for case 1, case 2, case 4, case 7, case 8, case 11, case 13 and case 14 of the first embodiment, counters 0300 and 0400 are replaced by counter 4600, columns 0301 and 0401 are replaced by column 4601, columns 0302 and 0402 are replaced by column 4602, columns 0303 and 0403 are replaced by column 4603, and columns 0304 and 0404 are replaced by column 4606.

Figure 47:
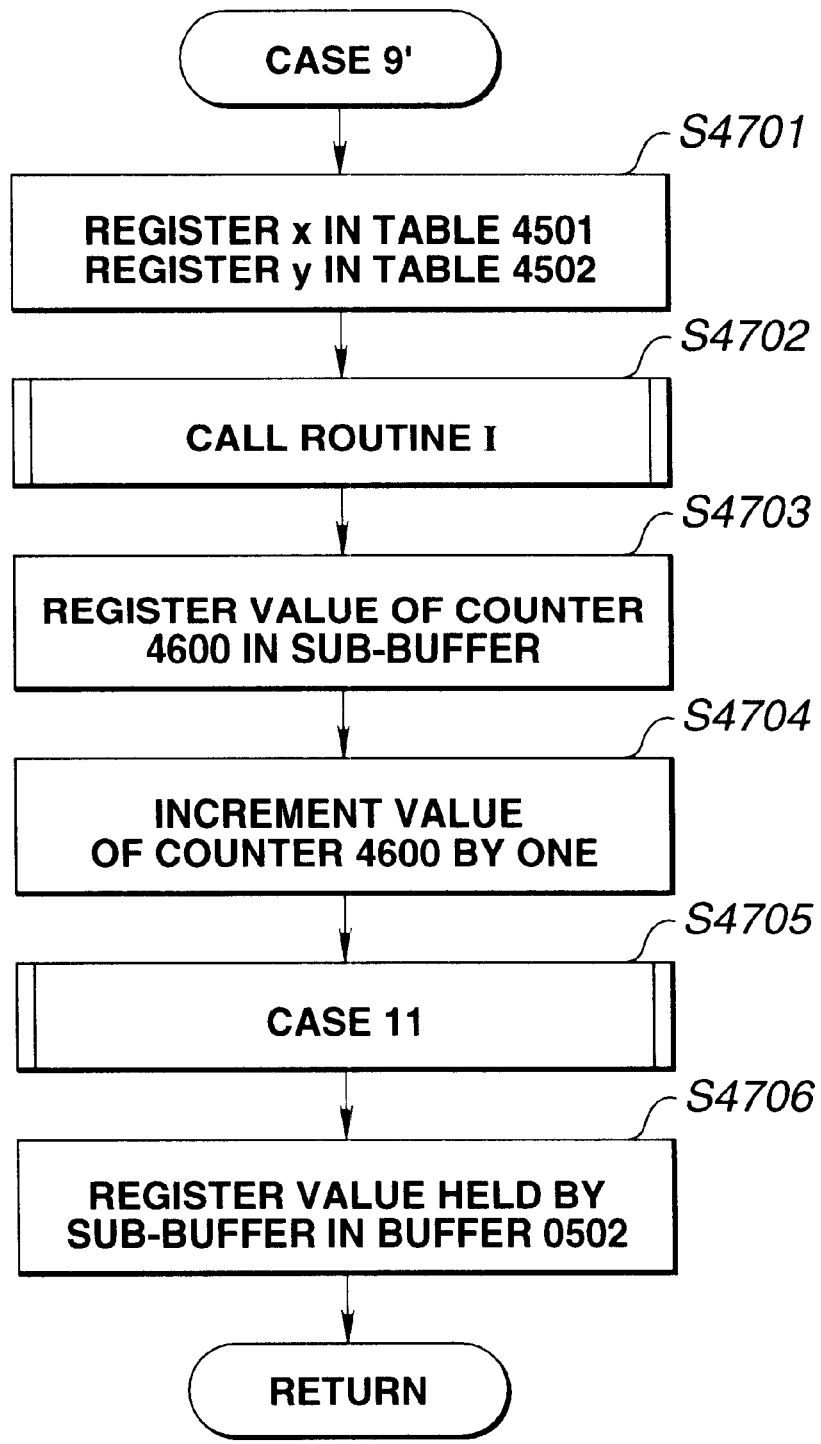
FIG. 47 is a flowchart illustrating processing steps for processing case 9'.

However, for case 9, a sub-buffer is provided, and processing for case 9', shown in FIG. 47, is performed.

In step S4701, values x and y of coordinates (x,y) of a target point are registered in columns 4601 and 4602, respectively, of the table shown in FIG. 46. In step S4702, routine I is called and in step S4703, the value of counter 4600 is first held in the sub-buffer. After incrementing the value of counter 4600 by one in step S4704, case 11 is executed, the number held by the sub-buffer is held in buffer 0502, and processing for case 9' is terminated.

As described above, in the present embodiment, by using a window of a 4-pixel region, comprising 2×2 pixels in the vertical and horizontal directions, as a unit of raster scanning, a contour point can only be present at one position within the window. Thus, the number of patterns of pixel states within the window is reduced, and therefore the number of processing modules is reduced. Furthermore, since the rule of processing for each state is simplified, the scale of the hardware to implement the invention can also be reduced.

By improving the method for holding the number of each vector having an undetermined connection relationship in the above-described manner, processing time is shortened. In the embodiment of U.S. application Ser. No. 08/161,082, tables shown in FIGS. 31 through 34 of U.S. application Ser. No. 08/161,082 are necessary for holding the number of each vector having an undetermined connection relationship. However, according to the improvement, since only the table and the buffer shown in FIG. 5 are necessary, the memory capacity is greatly reduced.

As described above, according to the present embodiment, it is possible to simplify the configuration of an apparatus, and also to simplify processing procedures when extracting contour vectors of image data, thereby decreasing the size and the cost of the apparatus, and increasing its processing speed.

Sixth Embodiment

In a sixth embodiment of the present invention, as shown in FIG. 1, contour vectors are extracted by performing processing in accordance with the state of pixels within a 4-pixel region, and the entire image is sequentially processed while shifting the processing in the direction of raster scanning (the horizontal direction) by one pixel. A mark "x" having reference numeral 1010, shown in FIG. 1, represents a point on an interpixel grid within the 4-pixel region, and indicates a location where a contour point can be present. This point is hereinafter termed a "target point".

The position of a target point on an image processing apparatus is represented in the following manner. That is, as shown in FIG. 2, in the case of an image comprising m×n pixels, a point on an interpixel grid is represented as (0,0), (m,0), (0,n) and (m,n) for the upper left point, the upper right point, the lower left point and the lower right point, respectively.

In the present embodiment, as shown in FIG. 1, processing is performed by designating a region comprising 2×2 pixels as a window. Accordingly, the number of possible states provided within the region comprising 2×2 pixels equals 2 to the 4th power, or 16. Respective states are as shown in FIGS. 10 through 25.

In FIGS. 10 through 25, a square represents a window of a 4-pixel region comprising 2×2 pixels. ○ represents a start point of a horizontal vector (also the terminal point of a vertical vector), and Δ represents the start point of a vertical vector (also the terminal point of a horizontal vector). An arrow represents the direction of a vector, as well as the direction of contour tracking (in the present embodiment, contour tracking is performed so that a black pixel is present at the right side of the tracking direction).

When extracting vectors in the above-described manner, horizontal vectors and vertical vectors are always alternately generated from a contour of a binary image although the length of each vector may differ.

Processing for each image is performed according to the flowchart shown in FIG. 48. In the present embodiment, processing from step S4802 to step S4806 is determined for respective windows (cases), as shown in FIGS. 64 through 73.

A description will now be provided of processing for each case. Before starting the processing, a table for storing results of the processing is prepared on a hard disk or in a RAM. As will be clarified in the following description, the present embodiment has a feature in that only horizontal vectors are extracted, and contours of a binary image are represented only by the horizontal vectors.

Briefly speaking, horizontal vector data comprises the x coordinate of the terminal point of a horizontal vector, the y coordinate of the horizontal vector, and the number of a horizontal vector to be subsequently connected, where the y coordinate value is constant for horizonal vectors. For example, when a horizontal vector H(n), a vertical vector V(n), a horizontal vector H(n+1), a vertical vector V(n+1), a horizontal vector H(n+2), a vertical vector V(n+) 2), are connected in this sequence, if the x coordinate and the y coordinate of the terminal point of the horizontal vector H(n) are represented by xn1 and yn1, respectively, the vector data is represented as follows:

$$H(n)=\{xn1, yn1, n+1\}.$$

Attention must be paid to the fact that the x coordinate of the start point of vector H(n+1) equals the x coordinate of the terminal point of vector H(n). In other words, the x coordinate of the start point of horizontal vector H(n) equals the x coordinate of the terminal point of horizontal vector H(n−1). Accordingly, if a series of contour vectors are closed, respective vector data can be sufficiently represented by three parameters in the above-described manner. Although in the above-described example, the x coordinate of a horizontal vector is represented by the x coordinate of the terminal point of the vector, the x coordinate of the start point may also be used. Furthermore, the same processing may also be performed if only vertical vectors are used instead of horizontal vectors.

The horizontal vector H(n+1) is connected to the horizontal vector H(n) and to the vertical vector V(n). In the present embodiment, however, attention is paid only to horizontal vectors, and vertical vectors are derived from the horizontal vectors. Hence, a vertical vector between two horizontal vectors is neglected. A description will be provided assuming that the horizontal vector H(n) and the horizontal vector H(n+1) are in a connection relationship.

The following description is provided in consideration of the above-described embodiments.

Figure 59:
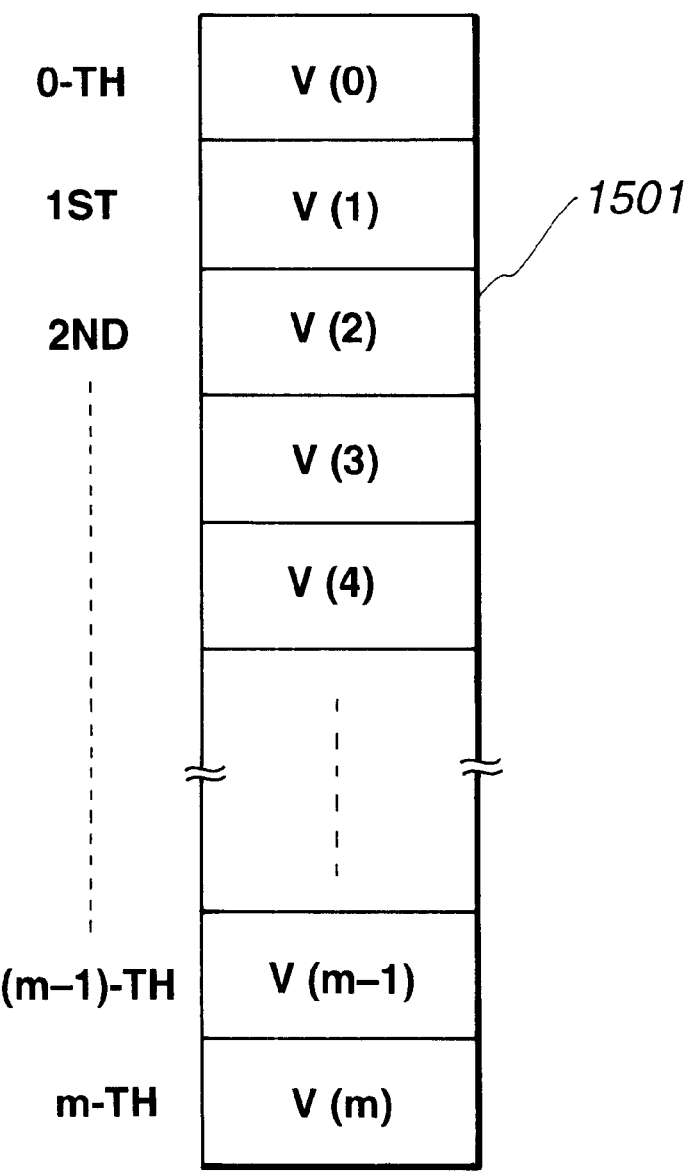
FIG. 59 is a diagram illustrating a table for holding a number of each vector having an undetermined vertical connection relationship used in the sixth embodiment.

First, in order to register horizontal vectors having undetermined connection relationship from among extracted vectors, a table, such as that shown in FIG. 59, is provided in a RAM, an external storage device or the like.

Figure 60:
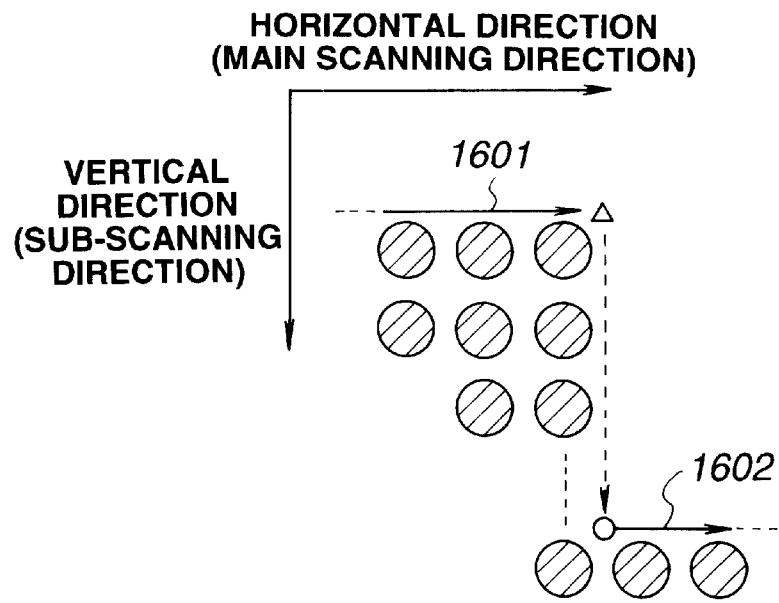
FIG. 60 is a diagram illustrating a case in which a start point of a horizontal vector which flows out is undetermined.
Figure 61:
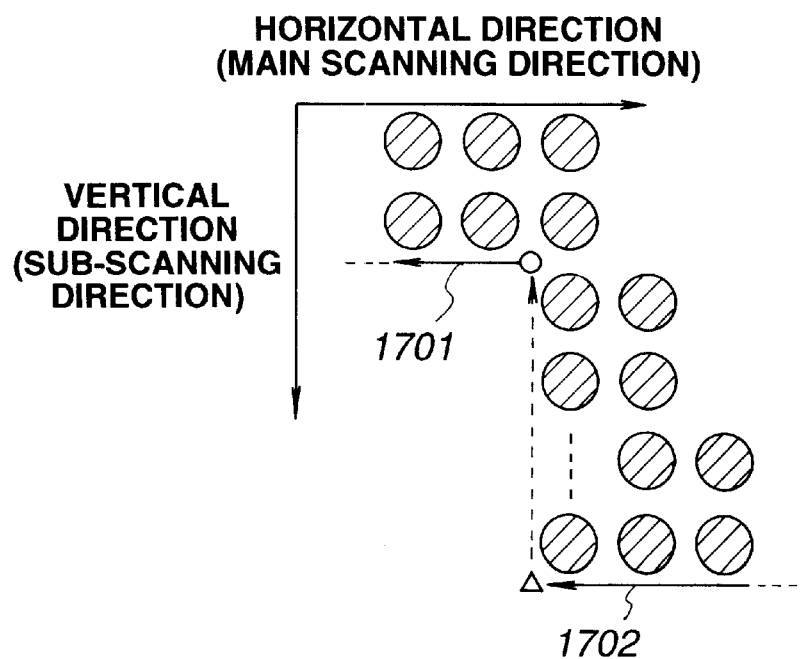
FIG. 61 is a diagram illustrating a case in which a terminal point of a flowing-in horizontal vector is undetermined.

The number (a unique number being provided for each extracted vector) of each horizontal vector having an undetermined vertical connection relationship is held in table 1501, shown in FIG. 59. For example, as shown in FIG. 60, when horizontal vector 1602 (not yet extracted at this time), which is to be connected to the terminal point of horizontal vector 1601, is undetermined, the number of horizontal vector 1601 is held. Alternatively, as shown in FIG. 61, when horizontal vector 1702, having its terminal point at the start point of a vertical vector flowing into the start point of horizontal vector 1701, is undetermined, the number of vector 1701 is held. If the coordinates of the terminal point or the start point of a horizontal vector to be held are (x,y), the number of the vector is registered in the x-th row of table 1501. The x-th information (vector number) in table 1501 is represented by v(x).

Figure 62:
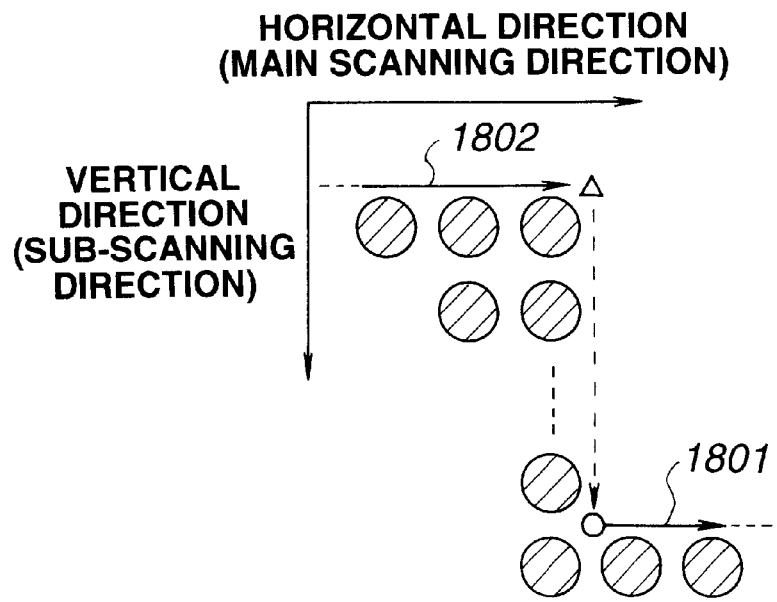
FIG. 62 is a diagram illustrating an example of determining a terminal point of a flowing-in horizontal vector.
Figure 63:
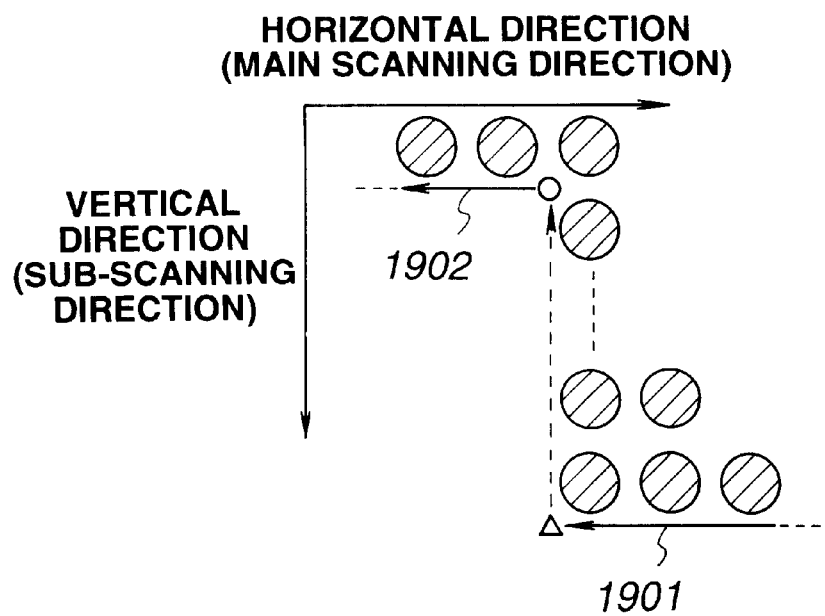
FIG. 63 is a diagram illustrating an example of determining a start point of a horizontal vector which flows out.
Figure 64:
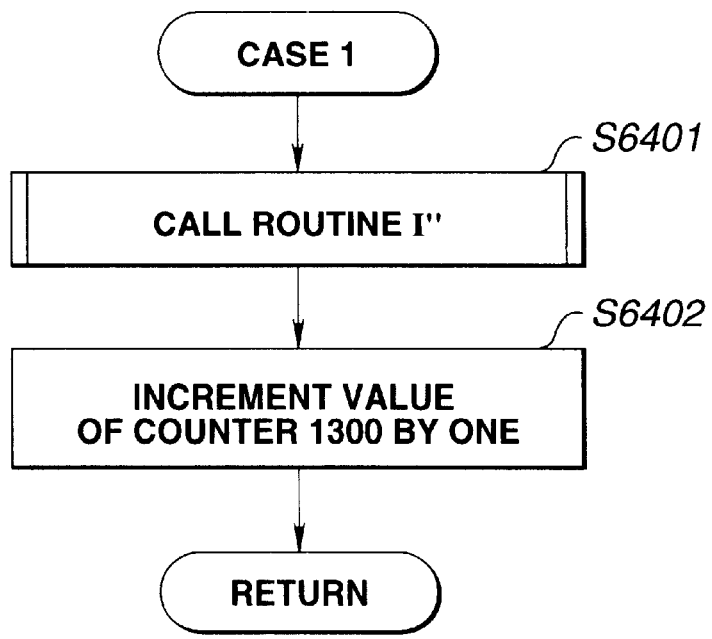
FIG. 64 is a flowchart illustrating processing steps for processing case 1 in the sixth embodiment.

Thus, table 1501, shown in FIG. 59, is provided for holding the number of horizontal vector 1802 having its terminal point at the start point of a vertical vector flowing into the start point of target horizontal vector 1801, as shown in FIG. 62, or for holding a horizontal vector having its start point at the terminal point of a vertical vector flowing out from the terminal point of horizontal vector 1901, as shown in FIG. 63.

In any case, when a target point is the start point or the terminal point of a vector, and a horizontal vector flowing into the start point or a horizontal vector flowing out from the terminal point is undetermined, the number of the target horizontal vector is registered at a position v(x) corresponding to the x coordinate of the start point or the terminal point.

Each value in table 1501, shown in FIG. 59, corresponds to the x coordinate of a start point or a terminal point to be held. When the number of pixels of an image in the main scanning direction equals m, a size for holding vector numbers from the 0-th vector to the (m+1)-th vector is sufficient for the 1501.

Figure 57:
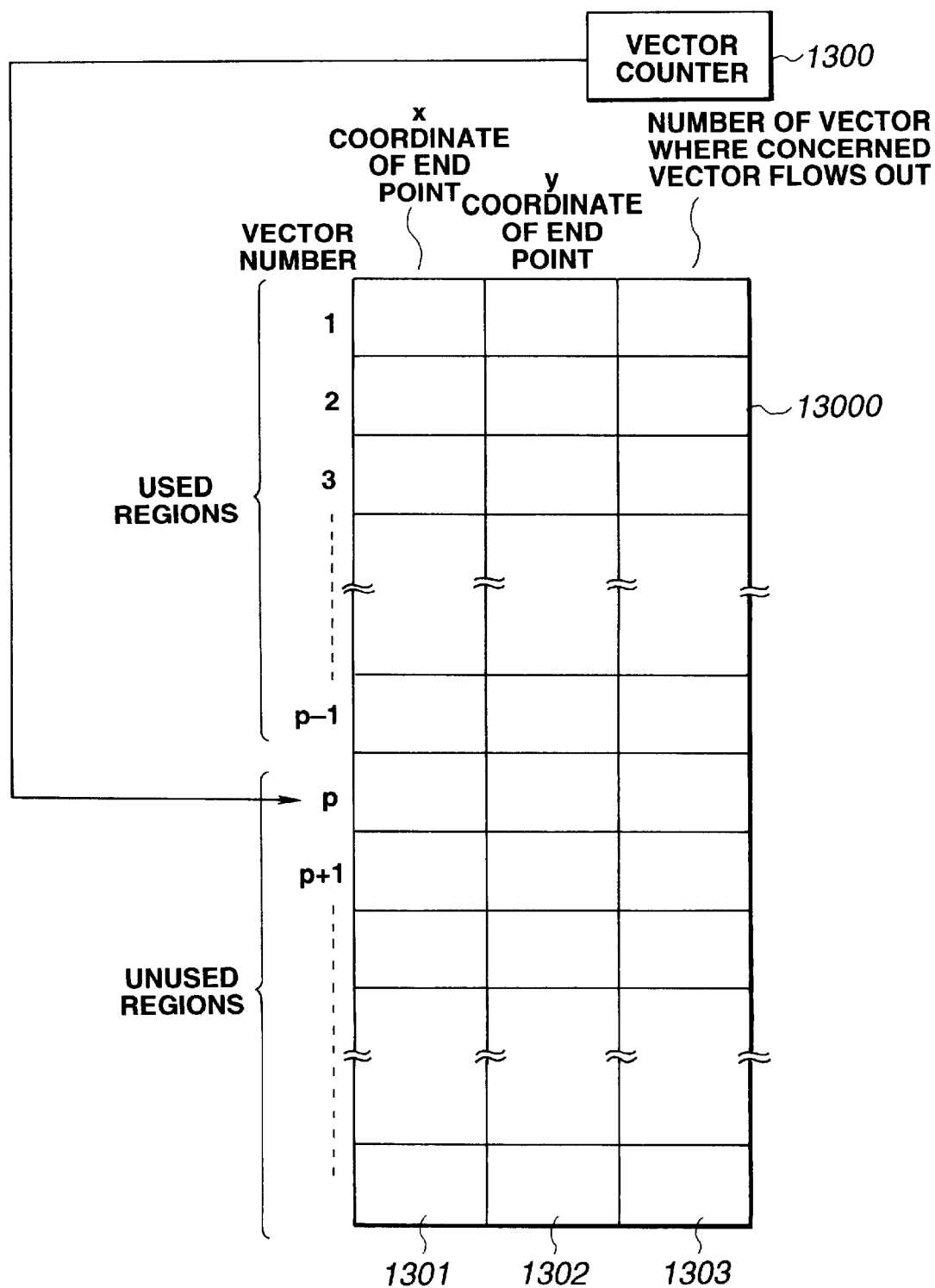
FIG. 57 is a diagram illustrating a vector-data table used in a sixth embodiment of the present invention.

In order to register extracted vectors, table 13000, shown in FIG. 57, is prepared, as described below.

In FIG. 57, vector counter 1300 holds the number of a horizontal vector to be subsequently extracted or which is currently being extracted. In table 13000, the x coordinate value of the terminal point of each horizontal vector which has been extracted or which is being extracted is held in column 1301, the y coordinate value (having the same value for the start point and the terminal point) of each horizontal vector is held in column 1302. The number of a horizontal vector to be subsequently connected to the terminal point of the target horizontal vector is held in column 1303.

That is, as described above, each contour vector is expressed in the form of the x coordinate value of the terminal point of a horizontal vector, the y coordinate of the horizontal vector, and the number of a horizontal vector where the vector flows out. In this expression, a vector string expressed by alternate connection of horizontal vectors and vertical vectors is expressed only by information relating to the horizontal vectors.

The relationship between the contents of table 13000, shown in FIG. 57, and extracted vectors will be described in detail with reference to FIG. 58.

Figure 58:
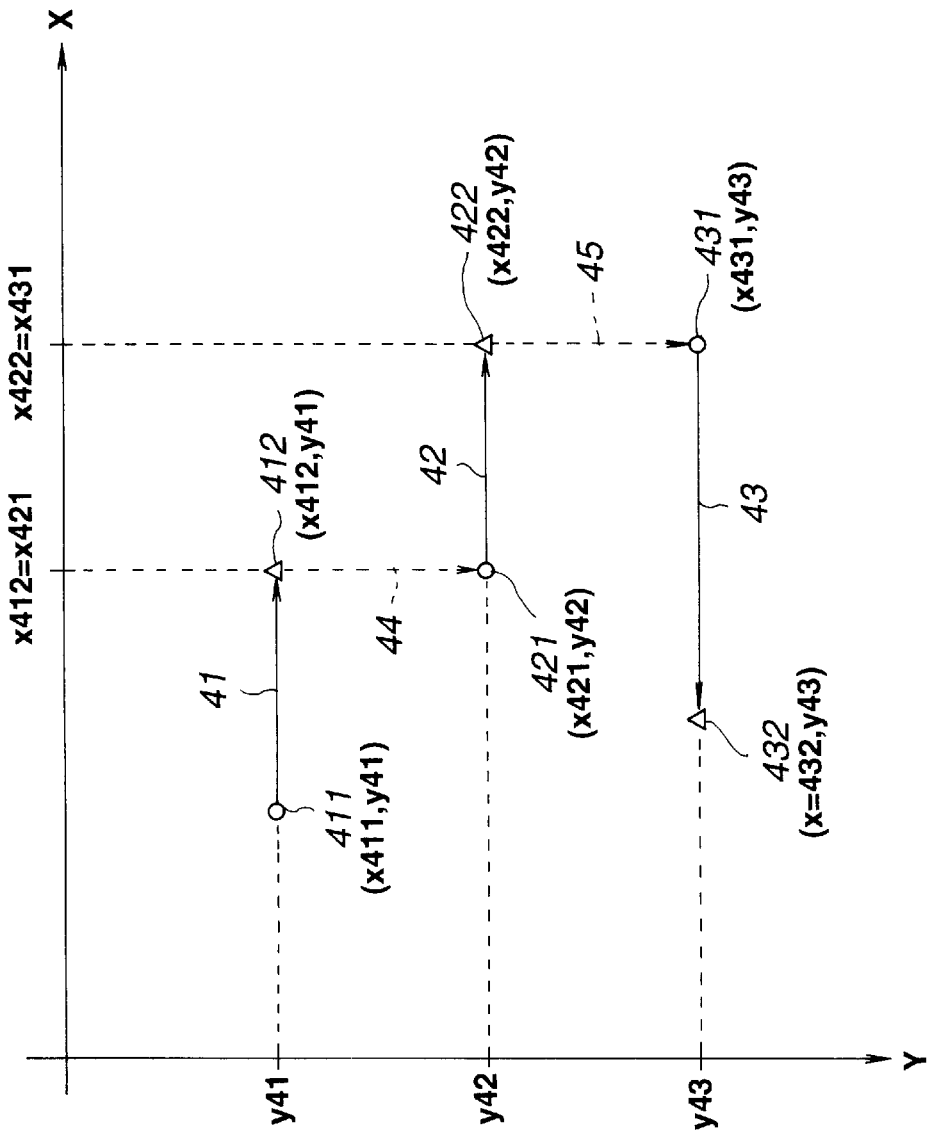
FIG. 58 is a diagram illustrating the correspondence between vector data and coordinate values of contour points.

In FIG. 58, horizontal vector 41 flows out to horizontal vector 42, stated another way, or horizontal vector 41 flows into the horizontal vector 42, and horizontal vector 42 flows out to horizontal vector 43. The numbers of the vectors 41, 42 and 43 are represented by v41, v42 and v43, respectively. The start point of vector 41 is a point 411, whose coordinate values are (x411,y41), and the terminal point of vector 41 is a point 412, whose coordinate values are (x412,y41). The start point of vector 42 is a point 421, whose coordinate values are (x421,y42), and the terminal point of vector 42 is a point 422, whose coordinate values are (x422,y42). The start point of vector 43 is a point 431, whose coordinate values are (x431,y43), and the terminal point of the vector 43 is a point 432, whose coordinate values are (x432,y43).

In this case, in table 13000, shown in FIG. 57, vector 41 is expressed as {x412,y41,v42} in a row having vector number v41, and vector 42 is expressed as {x422,y42,v43} in a row having vector number v42. It is apparent in FIG. 58, from the coordinate values of start point 412 and start point 431, that vertical vector 44 is present between these vectors and is easily and uniquely obtained from the data of the vectors 41 and 42. It is also apparent from FIG. 58 that the coordinates of the start point of horizontal vector 42, expressed as (x421,y42), are easily and uniquely obtained because the coordinate value x421 of the start point of horizontal vector 42 equals the value x412. Similarly, the start point 422 of vertical vector 45 and the start point of horizontal vector 43 are determined from the data of vector number v42 and the data of vector number v43.

Thus, data for each contour vector in table 13000, shown in FIG. 57, belongs to a data form expressing the above-described contour vector string in which horizontal vectors and vertical vectors are alternately connected.

Next, a description will be provided of each case of vector extraction processing in the present embodiment. Since, in the present embodiment, processing is performed in units of a region comprising 2×2 pixels, there are 16 cases (cases 0–15) in total.

Case 0

FIG. 10 illustrates a state in which all pixels within a 4-pixel region are white pixels (case 0). In this case, since a target point is not a contour point (i.e., the start point or the terminal point of a vertical vector), processing is not performed, and the target region (window) is shifted by one pixel to the next raster position.

Case 1

FIG. 11 illustrates a state in which only a pixel at the upper left position of a 4-pixel region is a black pixel, and in which the remaining pixels are white pixels (case 1). In this case, target point ○ 1102, within region 1101, is a contour point, and the start point of a horizontal vector. In this case, processing is performed according to the flowchart shown in FIG. 64. The coordinates of the target point are represented by (x,y).

The terminal point of a horizontal vector flowing into this contour point is within a region which has already been subjected to raster scanning. This is because, as shown in FIG. 1, processing is performed from left to right, and processing shifts downward to scan the next line after completing scanning of one line. Accordingly, a horizontal vector having its start point at the target point is already registered in the x-th column v(x) of table 1501 shown in FIG. 59. Thus, the positions of the start point and the terminal point of target horizontal vector 1104 (already known to point left, as shown in FIG. 1) are determined.

Figure 74:
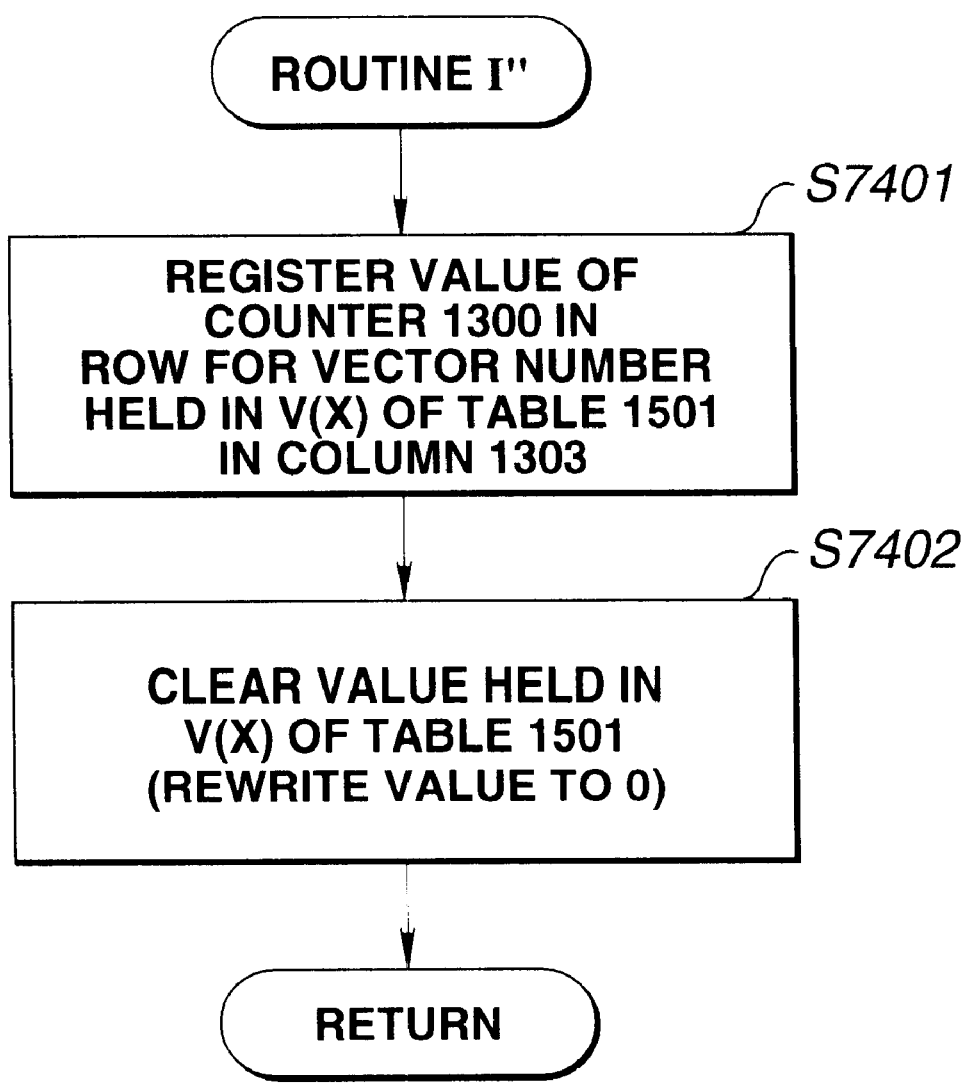
FIG. 74 is a flowchart illustrating processing steps for processing routine I"

Accordingly, in step S6401, routine I", depicted in the flowchart shown in FIG. 74 is called to clarify the connection relationship of the horizontal vector.

First, in step S7401, the vector number registered in v(x) of table 1501 is registered in a row indicated by counter 1300 in column 1303 of table 13000 shown in FIG. 57. It is thereby possible to determine a horizontal vector flowing out to the position of the start point of the target horizontal vector. In other words, a horizontal vector flowing into the target horizontal vector is determined.

In step S7402, the value registered in v(x) of the table shown in FIG. 59 is set to 0. Thus, the position of the start point of the horizontal vector, and a horizontal vector flowing into the start point are determined.

Since the terminal point of horizontal vector 1104 is a contour point which has already been scanned (in the present embodiment, the binary image is scanned in sequence from left to right, and upon completion of the scanning, the same scanning is performed while shifting the scanning line in the downward direction), the coordinate values of this vector are already held in the contour vector table shown in FIG. 57. Hence, in step S6402, the value of vector counter 1300 is incremented by one, and a vector number is generated for newly detected vector data.

Thus, processing of case 1 is terminated. The target region is then shifted to the next raster scanning position.

Case 2

FIG. 12 illustrates a state in which only a pixel at the upper right position of a 4-pixel region is a black pixel, and in which the remaining pixels are white pixels (case 2). In this case, target point Δ 1202, within region 1201, is a contour point, and the terminal point of a horizontal vector. In this case, processing is performed according to the flowchart shown in FIG. 65.

First, in step S6501, the coordinates (x,y) of the target point are designated as the terminal point of the horizontal vector, and the values x and y are registered in a row indicated by the vector number (the number of target horizontal vector 1203) held in vector counter 1300 in columns 1301 and 1302, respectively, of the table shown in FIG. 57. Since a horizontal vector flowing into target horizontal vector 1203 is undetermined (the start point of horizontal vector 1203 being undetermined at that time), the value of vector counter 1300 is not changed, and the process proceeds to step S6502.

Figure 75:
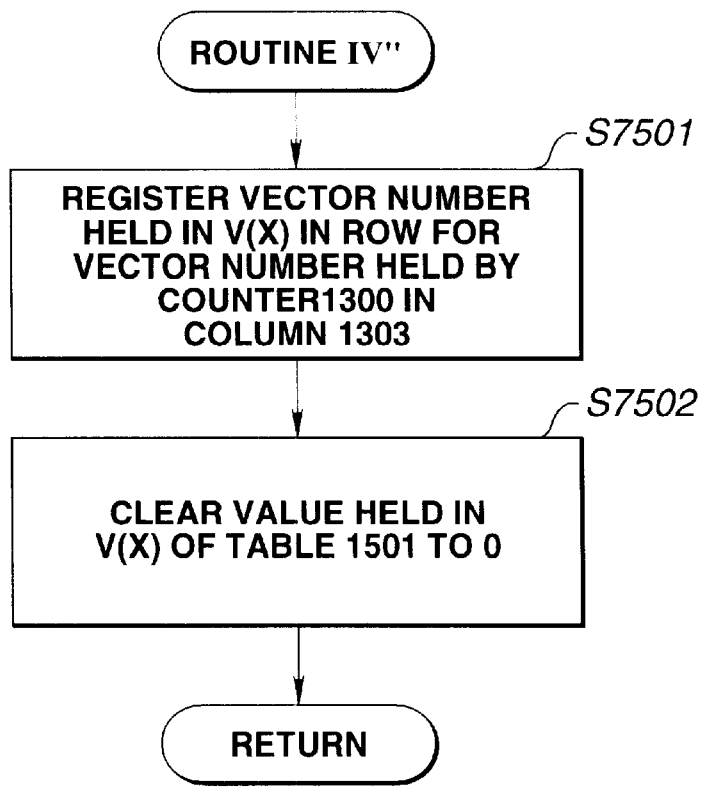
FIG. 75 is a flowchart illustrating processing steps for processing routine IV"

In step S6502, the start point of a horizontal vector from which a vector from the contour point flows out is retrieved. Since the start point of this horizontal vector is a contour point which has already been scanned, this horizontal vector is already registered in the x-th row v(x) of table 1501 for holding vectors having an undetermined vertical connection relationship. Hence, in step S6502, routine IV", indicated by the flowchart shown in FIG. 75 is called to clarify the connection relationship of the horizontal vector.

First, in step S7501 of routine IV", the vector number registered in v(x) is registered in a row corresponding to the vector number held in counter 1300 in column 1303 of the table shown in FIG. 57. Then, in step S7502, the value registered in v(x) is set to 0.

Figure 65:
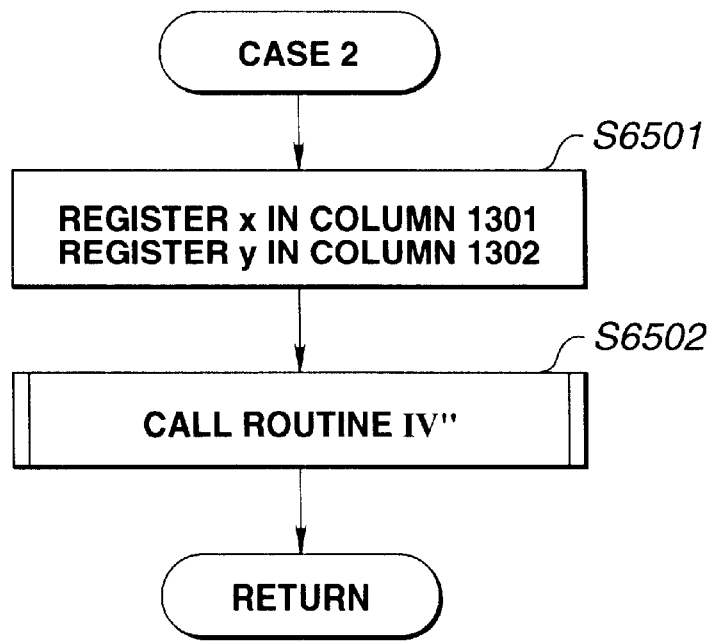
FIG. 65 is a flowchart illustrating processing steps for processing case 2 in the sixth embodiment.

Thus, processing of case 2, shown in FIG. 65, is terminated. The target region is then shifted to the next raster scanning position.

Case 3

FIG. 13 illustrates a state in which the two upper pixels in a target 4-pixel region are black pixels and in which the lower pixels are white pixels (case 3). In this case, since a target point is not a contour point (since the target point is a midpoint of a horizontal vector having an undetermined start point and terminal point, the target point need not be considered), processing is not performed, and the target region is shifted to the next raster scanning position.

Case 4

FIG. 14 illustrates a state in which only a pixel at the lower left position of a 4-pixel region is a black pixel, and in which the remaining pixels are white pixels (case 4). In this case, target point Δ 1402, within region 1401, is a contour point, and is the terminal point of a horizontal vector. In this case, processing is performed according to the flowchart shown in FIG. 66.

In step S6601, the coordinates (x,y) of the target point are designated as the terminal point of the horizontal vector, and the values x and y are registered in a row indicated by counter 1300 in columns 1301 and 1302, respectively, of the table shown in FIG. 57.

Figure 76:
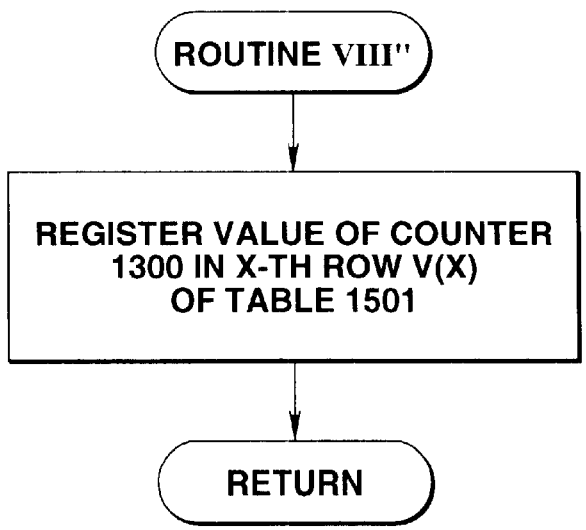
FIG. 76 is a flowchart illustrating processing steps for processing routine VIII"

Since the start point of a horizontal vector flowing out from this contour point is in an unscanned region, routine VIII", depicted in the flowchart shown in FIG. 76, is called in step S6602. In step S7601, the value of counter 1300 is registered in the x-th row v(x) of table 1501 shown in FIG. 59.

Figure 66:
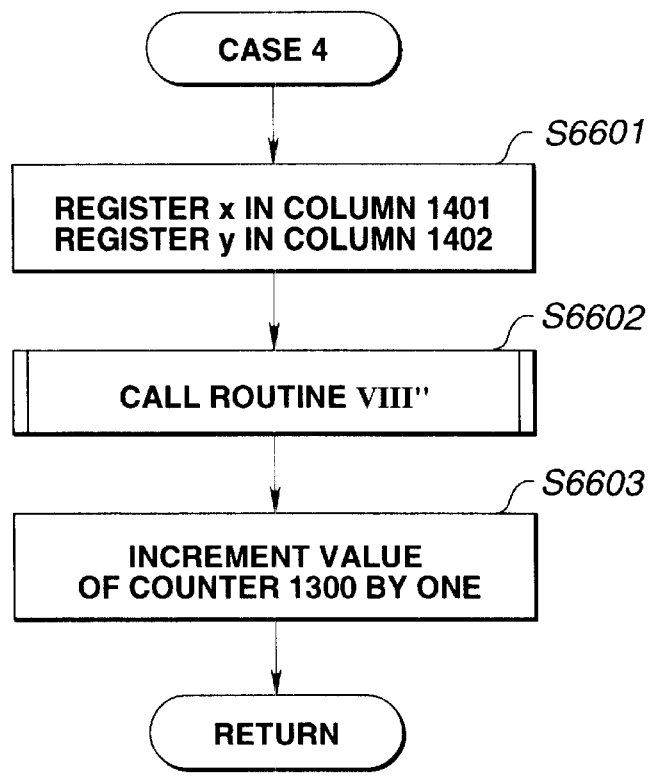
FIG. 66 is a flowchart illustrating processing steps for processing case 4 in the sixth embodiment.
Figure 67:
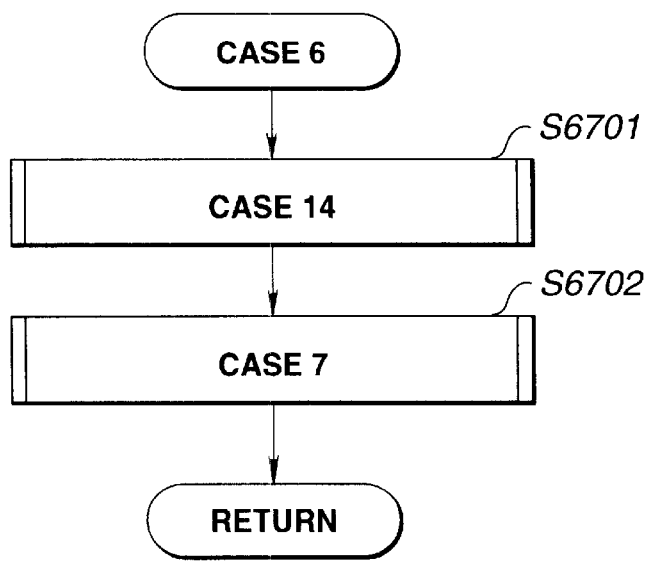
FIG. 67 is a flowchart illustrating processing steps for processing case 6 in the sixth embodiment.
Figure 68:
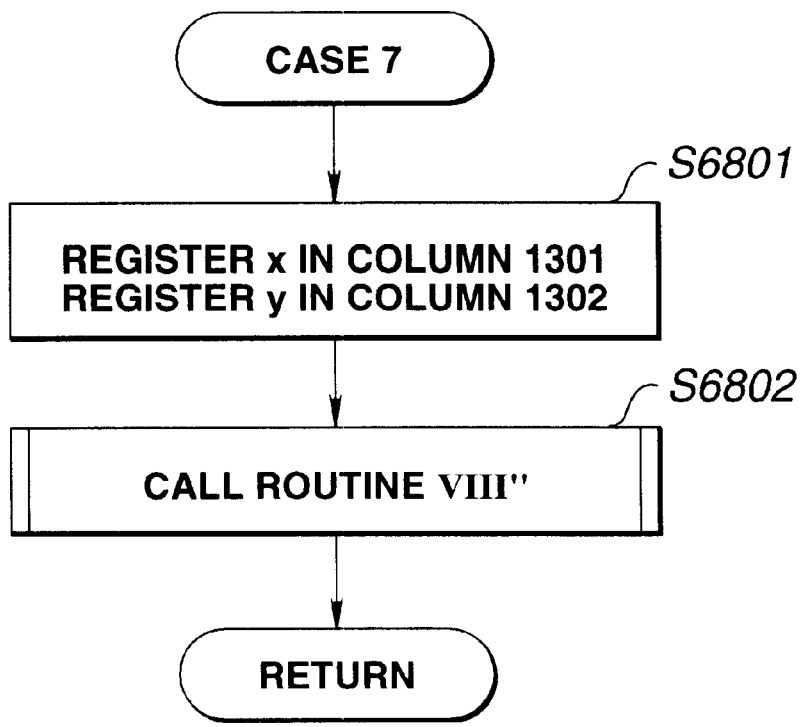
FIG. 68 is a flowchart illustrating processing steps for processing case 7 in the sixth embodiment.

In step S6603, shown in FIG. 66, the value of counter 1300 is incremented by one, and processing of case 4 is terminated. The target region is then shifted to the next raster scanning position.

Case 5

FIG. 15 illustrates a state in which pixels in the left half of a target 4-pixel region are black pixels and in which the right half of the 4-pixel region are white pixels (case 5). In this case, since a target point is not a contour point, processing is not performed and the target region is shifted to the next raster scanning position.

Case 6

FIG. 16 illustrates a state in which pixels at the upper right position and the lower left position of a target 4-pixel region are black pixels and in which the remaining pixels are white pixels (case 6). In this case, two contour points are present at a target point in region 1601, and each of the two contour points is considered to be the terminal point of a horizontal vector. Point 1602 is processed by the same routine as in case 14 (to be described later), and point 1603 is processed by the same routine as in case 7 (to be described later). Accordingly, processing of case 6 is depicted in the flowchart shown in FIG. 67. Then, the target region is shifted to the next raster scanning position.

Case 7

FIG. 17 illustrates a state in which only one pixel at the lower right position of a 4-pixel region is a white pixel, and in which the remaining pixels are black pixels (case 7). In this case, target point Δ 1702, within region 1701, is a contour point, and is the terminal point of a horizontal vector. In this case, processing is performed according to the flowchart shown in FIG. 68.

In step S6801, the coordinates (x,y) of the target point are designated as the terminal point of the horizontal vector, and the values x and y are registered in a row indicated by counter 1300 in columns 1301 and 1302, respectively, of the table shown in FIG. 57.

Since the start point of a horizontal vector where a vector from this contour point flows out is in an unscanned region, routine VIII" is called in step S6802.

After returning from routine VIII", processing of case 7 is terminated. The target region is then shifted to the next raster scanning position.

Case 8

Figure 69:
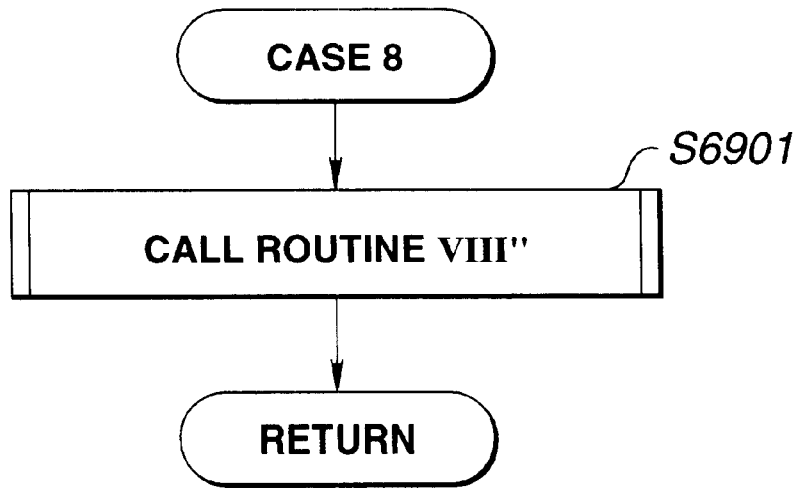
FIG. 69 is a flowchart illustrating processing steps for processing case 8 in the sixth embodiment.
Figure 70:
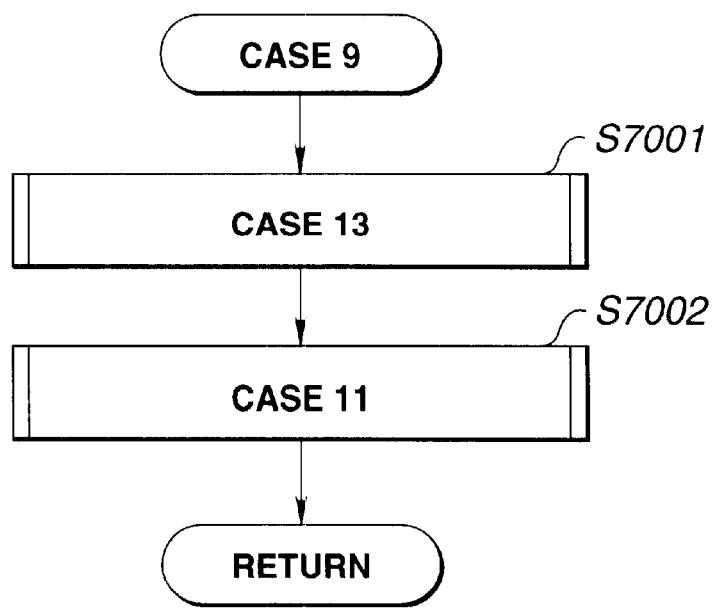
FIG. 70 is a flowchart illustrating processing steps for processing case 9 in the sixth embodiment.
Figure 71:
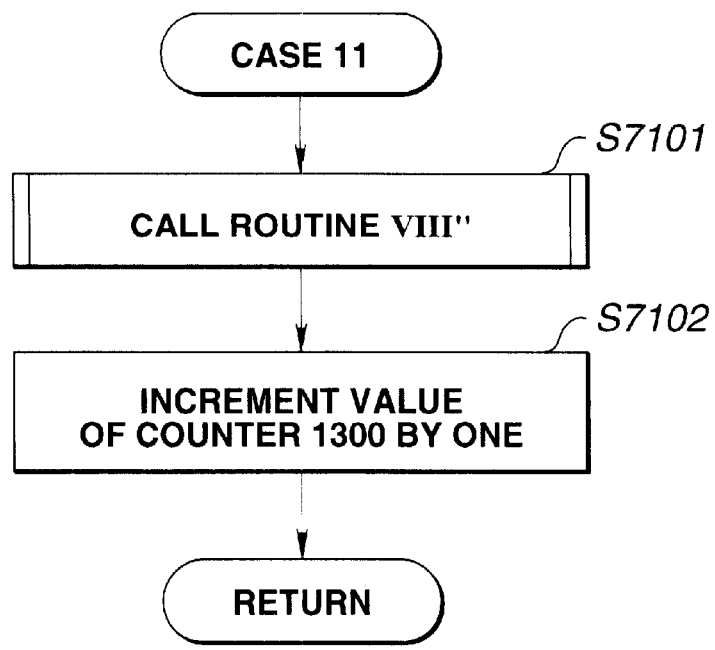
FIG. 71 is a flowchart illustrating processing steps for processing case 11 in the sixth embodiment.
Figure 72:
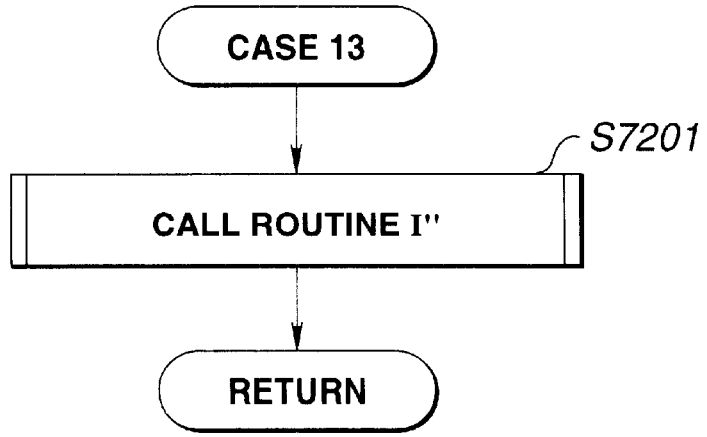
FIG. 72 is a flowchart illustrating processing steps for processing case 13 in the sixth embodiment.
Figure 73:
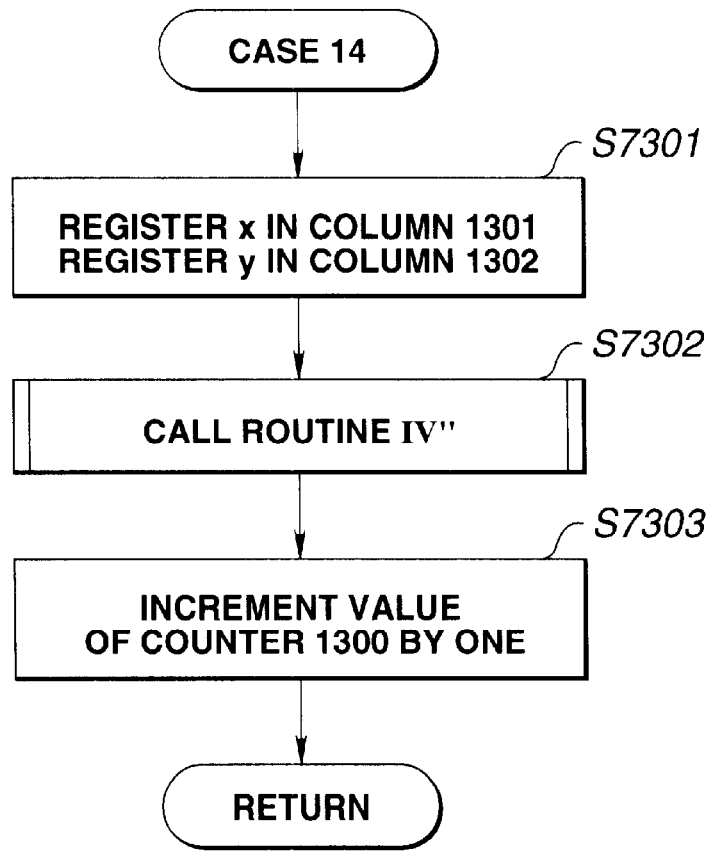
FIG. 73 is a flowchart illustrating processing steps for processing case 14 in the sixth embodiment.

FIG. 18 illustrates a state in which only one pixel at the lower right position of a 4-pixel region is a black pixel and the remaining pixels are white pixels (case 8). In this case, target point ○ 1802, within region 1801, is a contour point, and is the start point of a horizontal vector. FIG. 69 is a flowchart illustrating processing in this case.

Since the terminal point of a horizontal vector flowing into this contour point is within an unscanned region, routine VIII", depicted in the flowchart shown in FIG. 76, is called in step S6901, and the value of counter 1300 is registered in the x-th row v(x) of table 1501 shown in FIG. 59.

After returning from routine VIII", processing of case 8 is terminated. The target region is then shifted to the next raster scanning position.

Case 9

FIG. 19 illustrates a state in which pixels at the upper left position and the lower right position of a 4-pixel region are black pixels and in which the remaining pixels are white pixels (case 9). In this case, two contour points are present at a target point, and each of the two contour points is considered to be the start point of a horizontal vector. Point 1902 is processed by the same routine as in case 13 (to be described later), and point 1903 is processed by the same routine as in case 11 (to be described later). Accordingly, processing of case 9 is illustrated by the flowchart shown in FIG. 70. Then, the target region is shifted to the next raster scanning position.

Case 10

FIG. 20 illustrates a state in which the two pixels at the right half of a target 4-pixel region are black pixels and in which pixels of the left half of the 4-pixel region are white pixels (case 10). In this case, since a target point is not a contour point, processing is not performed and the target region is shifted to the next raster scanning position.

Case 11

FIG. 21 illustrates a state in which only one pixel at the lower left position of a 4-pixel region is a white pixel and in which the remaining pixels in the 4-pixel region are black pixels (case 11). In this case, target point ○ 2102, within region 2101, is a contour point, and is the start point of a horizontal vector. Processing, in this case, is performed according to the flowchart shown in FIG. 71.

Since the terminal point of a horizontal vector flowing into this contour point is present within an unscanned region, routine VIII" (described in the processing of case 4) is called in step S7101.

In step S7102, since the terminal point of horizontal vector 2104 is a contour point which has already been scanned, the value of counter 1300 is incremented by one, and processing of case 11 is terminated. The target region is then shifted to the next raster scanning position.

Case 12

FIG. 22 illustrates a state in which the two pixels at the lower half of a target 4-pixel region are black pixels, and in which the remaining pixels in the target 4-pixel region are white pixels (case 12). In this case, since a target point is not a contour point, processing is not performed and the target region is shifted to the next raster scanning position.

Case 13

FIG. 23 illustrates a state in which only one pixel at the upper right position of a target 4-pixel region is a white pixel, and in which the remaining pixels are black pixels (case 13). In this case, target point ○ 2302, within region 2301, is a contour point, and is the start point of a horizontal vector. The coordinates of the target point are represented by (x,y). Processing is performed according to the flowchart shown in FIG. 72.

Since the terminal point of a horizontal vector flowing into this contour point is a contour point which has already been scanned, routine I" (described in case 1) is called in step S7201.

After returning from routine I", processing of case 13 is terminated. The target region is then shifted to the next raster scanning position.

Case 14

FIG. 24 illustrates a state in which only one pixel at the upper left position of a target 4-pixel region is a white pixel, and in which the remaining pixels are black pixels (case 14). In this case, target point 4 2402, within-region 2401, is a contour point, and is the terminal point of a horizontal vector. Processing, in this case, is performed according to the flowchart shown in FIG. 73.

In step S7301, the coordinates (x,y) of the target point are designated as the terminal point of the horizontal vector, and the values x and y are registered in a row corresponding to the vector number held by vector counter 1300 in columns 1301 and 1302, respectively, of the table 13000 shown in FIG. 57.

Since the start point of a horizontal vector from which a vector from this contour point flows out is a contour point which has already been scanned, routine IV" (described in case 2) is called in step S7302.

In step S7303, thee value of counter 1300 is incremented by one, and processing of case 14 is terminated. The target region is then shifted to the next raster scanning position.

Case 15

FIG. 25 illustrates a state in which all pixels within a target 4-pixel region are black pixels (case 15). In this case, since a target point is not a contour point, processing is not performed, and the target region is shifted to the next raster scanning position.

Processing of one of the above-described cases 0–15 is performed for the target 4-pixel region described above. Processing for an entire input binary image is depicted in the flowchart shown in FIG. 48. Steps S4801–S4807, shown in FIG. 48, are repeated until the entire input binary image has been processed.

FIG. 44 is a block diagram illustrating the hardware for performing contour vector extraction according to the present embodiment. Programs corresponding to all of the above-described flowcharts are stored in memory 4414 and are executed by CPU 4413, both shown in FIG. 44.

Since the details of the configuration have already been described, a description thereof will be omitted.

Seventh Embodiment

In the sixth embodiment, the processing of case 6 is performed by combining the processing of case 14 and the processing of case 7, and the processing of case 9 is performed by combining the processing of case 13 and the processing of case 11. However, the present invention is not limited to such approaches. In a seventh embodiment of the present invention, processing is performed according to the flowchart shown in FIG. 40 for case 6, and processing is performed according to the flowchart shown in FIG. 41 for case 9.

Figure 77:
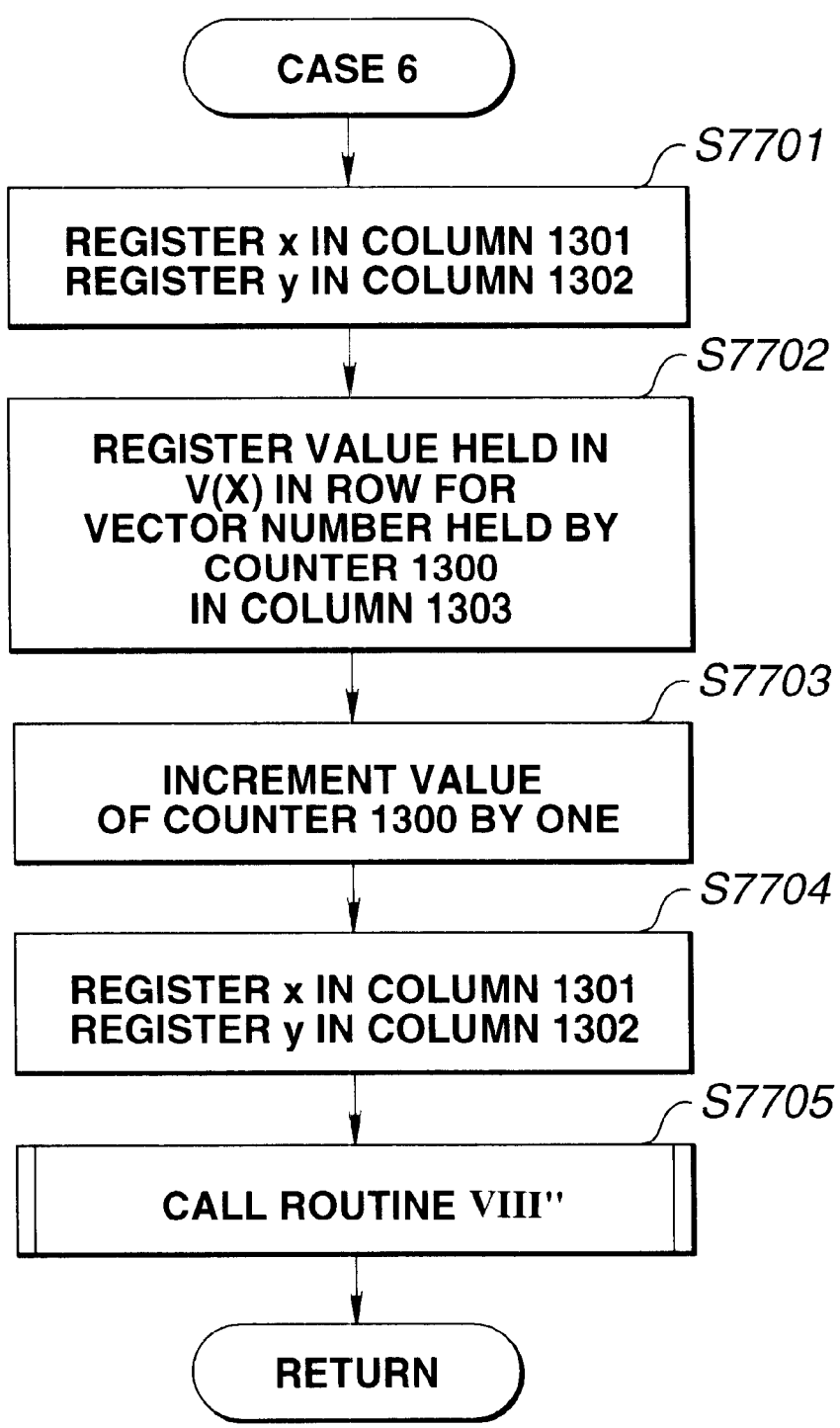
FIG. 77 is a flowchart illustrating processing steps for processing case 6 in a seventh embodiment of the present invention.

First, a description will be provided of processing for case 6 with reference to the flowchart shown in FIG. 77.

As shown in FIG. 16, case 6 is a case in which a target point is the terminal point of each of two horizontal vectors.

In step S7701, the coordinates (x,y) of the target point are designated as terminal point 1602 of a horizontal vector, and the values x and y are registered in a row indicated by vector counter 1300 in columns 1301 and 1302, respectively, of the table 13000 shown in FIG. 57.

In step S7702, since the start point of horizontal vector from which a vector from contour point 1602 flows out in within a region which has already been scanned, the value held in the row v(x) of table 1501 is registered in a row indicated by vector counter 1300 in column 1303 of table 13000 shown in FIG. 57. Since the start point of this horizontal vector is a contour point which has already been scanned, the value of counter 1300 is incremented by one in step S7703, and the process proceeds to step S7704.

In steps after step S7704, processing in which the coordinates (x,y) of the target point are made to be the terminal point of a horizontal vector 1603 is performed.

First, in step S7704, the values x and y are registered in a row corresponding to the vector number held by the vector counter 1300 in the columns 1301 and 1302 of the table 13000 shown in FIG. 57.

In the next step S7705, since the start point of a horizontal vector from which a vector from this contour point 1603 flows out is within an unscanned region, routine VIII" is called. When processing has returned from this routine, the target region is shifted to the next raster scanning position.

Figure 78:
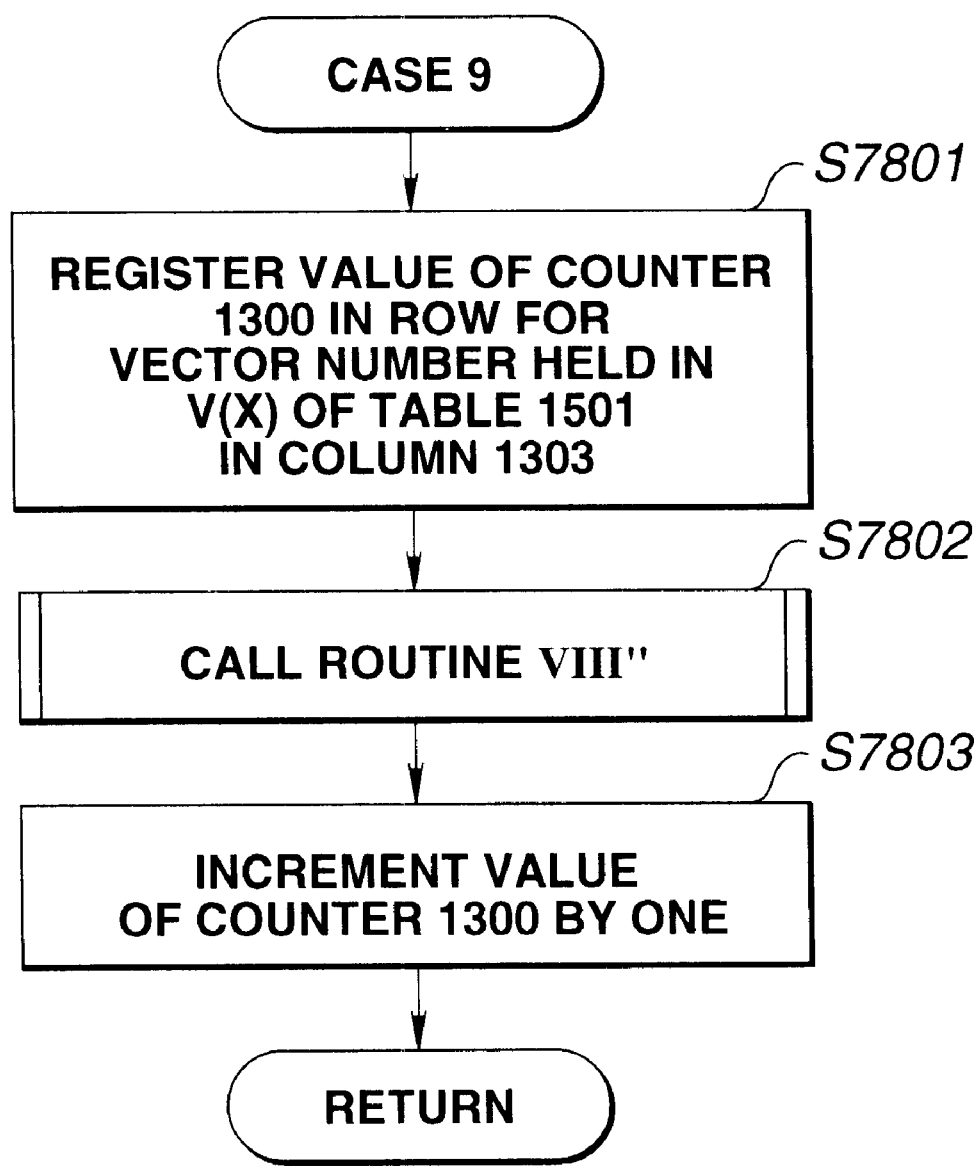
FIG. 78 is a flowchart illustrating processing steps for processing case 9 in the seventh embodiment.

Next, a description will be provided of processing for case 9 with reference to the flowchart shown in FIG. 78. As shown in FIG. 19, case 9 is a case in which a target point is the start point of each of two horizontal vectors. The coordinates of the target point are represented by (x,y).

First, processing when the target point is a point 1902 shown in FIG. 19 is performed. Target point 1902, within a region 1901, is the start point of a horizontal vector, and the terminal point of a horizontal vector flowing into this contour point is a contour point which has already been scanned. Accordingly, in step S7801, the value of counter 1300 is registered in a row having vector number v(x) in table 1501 in column 1303 of table 13000 shown in FIG. 57.

In step S7802, processing for start point 1903 of another horizontal vector present at the target point within region 1901 is performed. Since the terminal point of a horizontal vector flowing into this target point 1903 is in an unscanned region, routine VIII" is called. After returning from routine VIII", the process proceeds to step S7803. Since the terminal point of a horizontal vector having the start point 1903 is within a region which has already been processed, the x and y coordinate values of the terminal point of this horizontal vector have already been registered. Hence, in step S7803, the value of vector counter 1300 is incremented by one, and processing of case 9 is terminated. Then, the target point is shifted to the next raster scanning position.

As described above, in the processing of case 6 and case 9 in the seventh embodiment, the number of accessing operations to table 1501 can be reduced compared with the processing in the sixth embodiment, and therefore processing can be performed at a higher speed.

Eighth Embodiment

In the above-described embodiments, basically, when the terminal point of a horizontal vector has been detected, the coordinate data of the horizontal vector is registered. That is, the x coordinate value and the y coordinate value of the terminal point of a horizontal vector are registered in columns 1301 and 1302, respectively, of table 13000 shown in FIG. 57 only when the terminal point of the horizontal vector is present at a target point (i.e., case 2, case 4, case 6, case 7 and case 14). However, the present invention is not limited to such an approach.

In an eighth embodiment of the present invention, only a connection relationship between horizontal vectors is considered, as in the above-described embodiments, but the x coordinate value of the start point of a horizontal vector is adopted instead of the x coordinate value of the terminal point of the horizontal vector. That is, when the start point of a horizontal vector has been detected, the coordinate data of that horizontal vector is registered. In this case, the x coordinate value of the start point of the horizontal vector is registered in column 1301 of table 13000 shown in FIG. 57, and the same values as in the above-described embodiments are registered in other columns. Only when the start point of a horizontal vector is present at a target point, i.e., in case 1, case 8, case 9, case 11 and case 13, the coordinate values of the target point at that time are registered in columns 1301 and 1302 of table 13000 shown in FIG. 57. The configuration of table 1501, shown in FIG. 59, for holding vectors having an undetermined vertical connection relationship, and the procedures for registering, updating, referring, erasing, etc. of data in this table can be adopted, if the processing of each case in the above-described embodiments is performed without modification. That is, column 1303, in table 13000, may be used for storing the number of a vector from which a concerned vector flows out, and vector counter 1300, shown in FIG. 57, may be dealt with in the same manner as in the above-described embodiments.

It is also possible to register only the x coordinate value of the terminal point of a horizontal vector when the terminal point of the horizontal vector is present at a target point, and to register only the y coordinate value of a horizontal vector when the start point of the horizontal vector is present at a target point. Also in this case, connection information between vectors and control of vector numbers may be performed in the same manner as in the above-described embodiments.

Of course, it is also possible to register only the x coordinate value of the start point of a horizontal vector when the start point of the horizontal vector is present at a target point, and to register only the y coordinate value of a horizontal vector when the terminal point of the horizontal vector is present at a target point.

Ninth Embodiment

In the above-described embodiments, basically, a connection relationship between vectors is considered such that a vector flows out from the terminal point of a horizontal vector to the start point of another horizontal vector, and a vector from which a concerned vector flows out is specified as in the form of data stored in column 1303 of table 13000 shown in FIG. 57. However, the present invention is not limited to such an approach. That is, in a ninth embodiment of the present invention, it is considered that a vector flows into the start point of a horizontal vector from the terminal point of another horizontal vector. In this case, for example, vector numbers may be held in column 1303 of table 13000 shown in FIG. 57 as data for specifying a vector from into which a concerned vector flows. In the present embodiment, control of column 1303 of table 13000 in each case of the above-described embodiments is changed in the following manner. That is, instead of newly writing data in row v(x) of table 1501, shown in FIG. 59, data is read from row v(x) and is written in column 1303 of table 13000 shown in FIG. 57. Instead of reading data the row v(x) and writing the read data in column 1303 of table 13000, the number of the target vector at that time is newly written in the row v(x).

The present invention may be applied to a system comprising a plurality of apparatuses, or to an apparatus comprising a single unit. The present invention may, of course, employ computer programs to achieve the object of the invention.

Although, in the above-described embodiments, a description has been provided of only extraction of contour vectors from a binary image, input of the binary image may be obtained from any means, for example, from an image reader, from a medium, such as a floppy disk or the like, which stores the binary image, or from an image obtained via communication (for example, an image received from facsimile communication). It is also possible, according to the present invention, to reproduce a high-quality binary image having a desired magnification, for example, by subjecting the extracted contour vectors to rotation, and to output the image using a printer or the like.

Extracted vectors comprise only vertical vectors and horizontal vectors. Accordingly, when depicting a contour of a binary image within an image memory, by performing magnification-varying processing on obtained vector data and painting the interior of the contour, no problem arises when reducing the size of the vector data. However, when magnifying the size of the vector data, zigzag caused by the horizontal and vertical orientation of the extracted contour vectors, is magnified at the contour of the obtained binary image. In order to overcome this problem, data of several consecutive vectors from among the obtained vector data is smoothed to reduce the number of vectors and, thus, the number of projections and recesses. In this manner, the vector data is corrected. For example, when an oblique line is present in an original image, if vectors are extracted in the following sequence: rightward, upward, rightward, upward, rightward, etc., and the pattern of the vectors has a certain regularity, the extracted vectors are corrected as at least one vector in an oblique direction, whereby a smooth contour can be formed even after magnification-vaying processing.

That is, the feature of the present invention does not reside in forming a binary image, but in extracting contour vectors from an input binary image at high speed while reducing the capacity of a memory. The present invention, however, is not restricted to processing for this purpose.

As described above, according to the present embodiments, it is possible to provide a contour-information extraction apparatus in which the scale of processing circuitry is reduced and the production cost is thereby reduced, and in which processing speed is increased by reducing the number of unnecessary memory access operations.

It is also possible to reduce the capacity of a memory for holding extracted vector data which has been required in conventional apparatuses of this kind, and therefore to provide an inexpensive contour-information extraction apparatus.

Furthermore, since the contents of processing is simplified, and the number of unnecessary memory accessing operations is reduced, processing speed is increased.

In addition, since the memory capacity for holding extracted vector data which is required in the above-described embodiments is reduced, contour information can be extracted utilizing a less expensive apparatus.

According to the above-described embodiments, by reducing the scale of processing circuitry, which thereby reduces the production cost of the apparatus, and by reducing the number of unnecessary memory accessing operations, contour information of an image can be extracted with an increased processing speed.

The contour-information extraction apparatus and method described in the present embodiments may be applied to a facsimile apparatus, a printer, a digital copier, application software for performing image processing, or the like.

The individual components designated by blocks in the drawings are all well known in the contour-information extraction apparatus and method arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications, equivalent structures and functions.

What is claimed is:

1. An image processing apparatus comprising:
   detecting means for detecting a contour vector by scanning an input image in units of a region comprising 2×2 pixels in a main scanning direction;
   judgment means for judging whether a connection relationship of a contour vector detected by said detecting means and the contour vector which has been already detected can be determined;
   registration means for registering, if judging can be determined by said judgment means, a data indicating a connection relationship of a contour vector detected by said detecting means and the contour vector which has been already detected to a registration table; and
   holding means for holding, if judging cannot be determined, a data indicating a vertical contour vector having undetermined vertical connection relationship in a holding table and a data indicating a horizontal contour vector having undetermined horizontal connection relationship in a support buffer,
      wherein a size of said holding table is a size capable of storing pixels corresponding to the number of pixels in the main scanning direction of the input image, and said size of said support buffer is a size capable of storing one data.

2. An image processing apparatus according to claim 1, wherein, when the number of pixels in the main scanning direction of an image is m, said size of said holding table is a size capable of storing the number of m+1.

3. An image processing apparatus according to claim 1, wherein said holding means holds the data indicating the vertical contour vector at the position corresponding to the coordinate x of said vertical contour vector of said holding table.

4. An image processing apparatus according to claim 1, wherein the data registered by said registration means includes, an inflow vector number and an outflow vector number,
   the data indicating a vertical contour vector having an undetermined vertical connection relationship includes a vector number, and
   the data indicating horizontal contour vector having an undetermined horizontal connection relationship includes a vector number.

5. An image processing apparatus according to claim 1, wherein said detection means detects the contour vector by scanning the input image using the region comprising 2×2 pixels in the main scanning direction only once.

6. An image processing apparatus according to claim 1, further comprising:
   verification means for verifying the data registered by said registration means;
   reproduction means for reproducing the image on the basis of the data verified by the verification means; and
   output means for outputting the reproduced image.

7. An image processing method comprising the steps of:
   detecting contour vector by scanning an input image in units of a region comprising 2×2 pixels in a main scanning direction;
   judging whether a connection relationship of a contour vector detected by said detecting step and the contour vector which has been already detected can be determined;

registering, if judging can be determined by said judging steps, a data indicating a connection relationship of a contour vector detected by said detecting step and the contour vector which has been already detected to a registration table; and holding, if judging cannot be determined, a data indicating a vertical contour vector having undetermined vertical connection relationship in a holding table and a data indicating the horizontal contour vector having undetermined horizontal connection relationship in a support buffer, wherein a size of said holding table is a size capable of storing the number of data corresponding to the number of pixels in the main scanning direction of the input image, and said size of said support buffer is a size capable of storing one data.

8. An image processing method according to claim 7, wherein, when the number of pixels in the main scanning direction of an image is m, said size of said holding table is a size capable of storing the number of m+1.

9. An image processing method according to claim 7, wherein said holding step holds the data indicating the vertical contour vector at the position corresponding to the coordinate x of said vertical contour vector of said holding table.

10. An image processing method according to claim 7, wherein the data registered by said registration step includes an inflow vector number and an outflow vector number, the data indicating a vertical contour vector having undetermined vertical connection relationship includes a vector number, and the data indicating horizontal contour vector having undetermined horizontal connection relationship includes a vector number.

11. An image processing method according to claim 7, wherein said detection step detects the contour vector by scanning the input image using the region comprising 2×2 pixels in the main scanning direction only once.

12. An image processing method according to claim 7, further comprising the steps of:

verifying the data registered by said registering step;

reproducing the image on the basis of the data verified by the verifying step; and outputting the reproduced image.

13. A computer-readable memory medium which stores executable code for implementing a program for extracting a contour vector, the program comprising:

code for detecting a contour vector by scanning an input image using a 2×2 window in a main scanning direction;

code for judging whether a connection relationship of a contour vector detected by said detecting step can be determined;

code for registering, if judging can be determined by said judging step, the data indicating a connection relationship of a contour detected by said detecting step and the contour vector which has been already detected to a registration table, code for holding, if judging cannot be determined, the data indicating a vertical contour vector having undetermined vertical connection relationship in a holding table and the data indicating the horizontal contour vector having undetermined horizontal connection relationship in a support buffer, wherein a size of said holding table is a size capable of storing the number of data corresponding to the number of pixels in the main scanning direction of the input image, and said size of said support buffer is a size capable of storing one data.

14. A computer-readable memory medium storing computer-executable code according to claim 13, wherein, when the number of pixels in the main scanning direction of an image is m, said size of said holding table is a size capable of storing the number of m+1.

15. A computer-readable memory medium storing computer-executable code according to claim 13, wherein said holding step holds the data indicating the vertical contour vector at the position corresponding to the coordinates x of said vertical contour vector of said holding table.

16. A computer-readable memory medium storing computer-executable code according to claim 13, wherein the data registered by said registration step includes an inflow vector number and an outflow vector number, the data indicating a vertical contour vector having undetermined vertical connection relationship includes a vector number, and the data indicating horizontal contour vector having undetermined horizontal connection relationship includes a vector number.

17. A computer-readable memory medium storing computer-executable code according to claim 13, wherein said detecting step detects the contour vector by scanning the input image using the region comprising 2×2 pixels in the main scanning direction only once.

18. A computer-readable memory medium storing computer-executable code according to claim 13, further comprising code to perform the steps of:

verifying the data registered by said registering step;

reproducing the image on the basis of the data verified by the verifying step; and outputting the reproduced image.

* * * * *

UNITED STATES PATENT AND TRADEMARK OFFICE
CERTIFICATE OF CORRECTION

PATENT NO. : 6,356,656 B1
DATED : March 12, 2002
INVENTOR(S) : Takeshi Kawazome et al.

It is certified that error appears in the above-identified patent and that said Letters Patent is hereby corrected as shown below:

Column 8,
Line 32, "a 1202" should read -- $\Delta$ 1202 --.

Column 16,
Line 36, "V(n+) 2)" should read -- $V(n + 2)$ --.

Column 22,
Line 5, "4 2402," should read -- $\Delta$ 2402, --; and "within-region" should read -- within region --.

Column 26,
Line 40, "includes," should read -- includes --.

Signed and Sealed this

Twenty-eighth Day of January, 2003

JAMES E. ROGAN
*Director of the United States Patent and Trademark Office*